(12) United States Patent
Hasegawa et al.

(10) Patent No.: US 12,358,296 B2
(45) Date of Patent: Jul. 15, 2025

(54) INK JET SYSTEM

(71) Applicant: SEIKO EPSON CORPORATION, Tokyo (JP)

(72) Inventors: Tomonaga Hasegawa, Matsumoto (JP); Shunya Fukuda, Azumino (JP); Nobuaki Ito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 244 days.

(21) Appl. No.: 18/059,065

(22) Filed: Nov. 28, 2022

(65) Prior Publication Data

US 2023/0166523 A1 Jun. 1, 2023

(30) Foreign Application Priority Data

Nov. 29, 2021 (JP) ................. 2021-193074

(51) Int. Cl.
*B41J 29/38* (2006.01)
*B41J 2/175* (2006.01)
*B41J 2/21* (2006.01)
*H04N 1/00* (2006.01)
*H04N 1/23* (2006.01)

(52) U.S. Cl.
CPC ............. *B41J 2/17566* (2013.01); *B41J 2/21* (2013.01); *B41J 29/38* (2013.01); *H04N 1/00244* (2013.01); *H04N 1/00973* (2013.01); *H04N 1/2315* (2013.01); *B41J 2002/17569* (2013.01); *H04N 2201/0082* (2013.01)

(58) Field of Classification Search
CPC ..................... B41J 2/17566; B41J 2/21; B41J 2002/17569; B41J 29/38; H04N 2201/0082; H04N 1/00244; H04N 1/00973; H04N 1/2315
See application file for complete search history.

(56) References Cited

FOREIGN PATENT DOCUMENTS

| JP | 2004220470 A | * | 8/2004 | ............... B41J 29/38 |
| JP | 2019215601 A | * | 12/2019 | ............... B41J 29/38 |
| JP | 2021-084274 A | | 6/2021 | |

* cited by examiner

*Primary Examiner* — Yaovi M Ameh
(74) *Attorney, Agent, or Firm* — WORKMAN NYDEGGER

(57) ABSTRACT

An ink jet system includes a head unit that includes a nozzle discharging ink, a pressure chamber communicating with the nozzle, and a drive element applying pressure fluctuation to the ink in the pressure chamber by supplying a drive pulse, an acquisition portion that acquires output information including one or both of first output information regarding the head unit and second output information regarding the ink used for the head unit, a first coupling portion that is communicably network-coupled to a server, a first output portion that outputs the output information to the server via the first coupling portion, a first input portion to which input information is input from the server via the first coupling portion, and a determination portion that determines a content of image processing for image data based on the input information.

19 Claims, 28 Drawing Sheets

FIG. 8

| FIRST OUTPUT INFORMATION D1a | SECOND OUTPUT INFORMATION D1b | THIRD OUTPUT INFORMATION D1c | FIRST INPUT INFORMATION D2a |
|---|---|---|---|
| HIGH DISCHARGE PERFORMANCE | HIGH COLOR DEVELOPMENT | HIGH COLOR DEVELOPMENT | LUT_A |
| | | LOW COLOR DEVELOPMENT | LUT_B |
| | LOW COLOR DEVELOPMENT | HIGH COLOR DEVELOPMENT | LUT_C |
| | | LOW COLOR DEVELOPMENT | LUT_D |
| LOW DISCHARGE PERFORMANCE | HIGH COLOR DEVELOPMENT | HIGH COLOR DEVELOPMENT | LUT_E |
| | | LOW COLOR DEVELOPMENT | LUT_F |
| | LOW COLOR DEVELOPMENT | HIGH COLOR DEVELOPMENT | LUT_G |
| | | LOW COLOR DEVELOPMENT | LUT_H |

LUT_A

| INPUT VALUE | | | OUTPUT VALUE | | |
|---|---|---|---|---|---|
| R | G | B | C | M | Y |
| 0 | 0 | 0 | 200 | 200 | 200 |
| 1 | 0 | 1 | 199 | 200 | 199 |
| ... | ... | ... | ... | ... | ... |
| 126 | 0 | 126 | 101 | 200 | 62 |
| 127 | 0 | 127 | 100 | 200 | 60 |
| 128 | 0 | 128 | 99 | 200 | 58 |
| ... | ... | ... | ... | ... | ... |
| 254 | 0 | 254 | 1 | 200 | 0 |
| 255 | 0 | 255 | 0 | 200 | 0 |

LUT_E

| INPUT VALUE | | | OUTPUT VALUE | | |
|---|---|---|---|---|---|
| R | G | B | C | M | Y |
| 0 | 0 | 0 | 205 | 205 | 205 |
| 1 | 0 | 1 | 204 | 205 | 204 |
| ... | ... | ... | ... | ... | ... |
| 126 | 0 | 126 | 104 | 205 | 63 |
| 127 | 0 | 127 | 103 | 205 | 61 |
| 128 | 0 | 128 | 102 | 205 | 59 |
| ... | ... | ... | ... | ... | ... |
| 254 | 0 | 254 | 1 | 205 | 0 |
| 255 | 0 | 255 | 0 | 205 | 0 |

LUT_B

| INPUT VALUE | | | OUTPUT VALUE | | |
|---|---|---|---|---|---|
| R | G | B | C | M | Y |
| 0 | 0 | 0 | 220 | 220 | 220 |
| 1 | 0 | 1 | 219 | 220 | 219 |
| ... | ... | ... | ... | ... | ... |
| 126 | 0 | 126 | 111 | 220 | 68 |
| 127 | 0 | 127 | 110 | 220 | 68 |
| 128 | 0 | 128 | 109 | 220 | 64 |
| ... | ... | ... | ... | ... | ... |
| 254 | 0 | 254 | 1 | 220 | 0 |
| 255 | 0 | 255 | 0 | 220 | 0 |

LUT_C

| INPUT VALUE | | | OUTPUT VALUE | | |
|---|---|---|---|---|---|
| R | G | B | C | M | Y |
| 0 | 0 | 0 | 230 | 230 | 230 |
| 1 | 0 | 1 | 229 | 230 | 229 |
| ... | ... | ... | ... | ... | ... |
| 126 | 0 | 126 | 116 | 230 | 71 |
| 127 | 0 | 127 | 115 | 230 | 69 |
| 128 | 0 | 128 | 114 | 230 | 67 |
| ... | ... | ... | ... | ... | ... |
| 254 | 0 | 254 | 1 | 230 | 0 |
| 255 | 0 | 255 | 0 | 230 | 0 |

FIG. 14

| FIRST OUTPUT INFORMATION D1a | SECOND OUTPUT INFORMATION D1b | THIRD OUTPUT INFORMATION D1c | FOURTH INPUT INFORMATION D2d |
|---|---|---|---|
| HIGH DISCHARGE PERFORMANCE | HIGH COLOR DEVELOPMENT | HIGH COLOR DEVELOPMENT | MASK_A |
| | | LOW COLOR DEVELOPMENT | MASK_B |
| | LOW COLOR DEVELOPMENT | HIGH COLOR DEVELOPMENT | MASK_C |
| | | LOW COLOR DEVELOPMENT | MASK_D |
| LOW DISCHARGE PERFORMANCE | HIGH COLOR DEVELOPMENT | HIGH COLOR DEVELOPMENT | MASK_E |
| | | LOW COLOR DEVELOPMENT | MASK_F |
| | LOW COLOR DEVELOPMENT | HIGH COLOR DEVELOPMENT | MASK_G |
| | | LOW COLOR DEVELOPMENT | MASK_H |

D4d

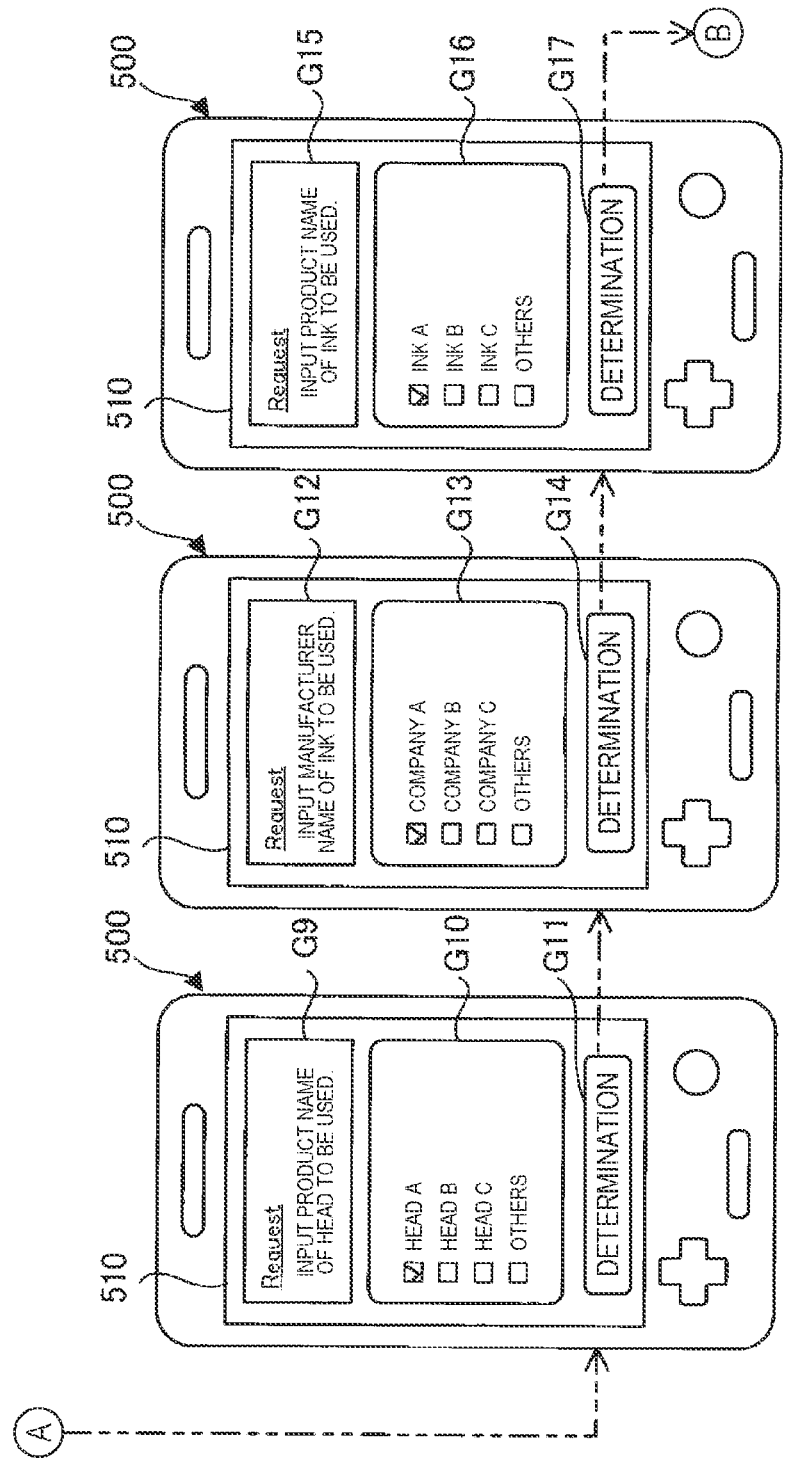

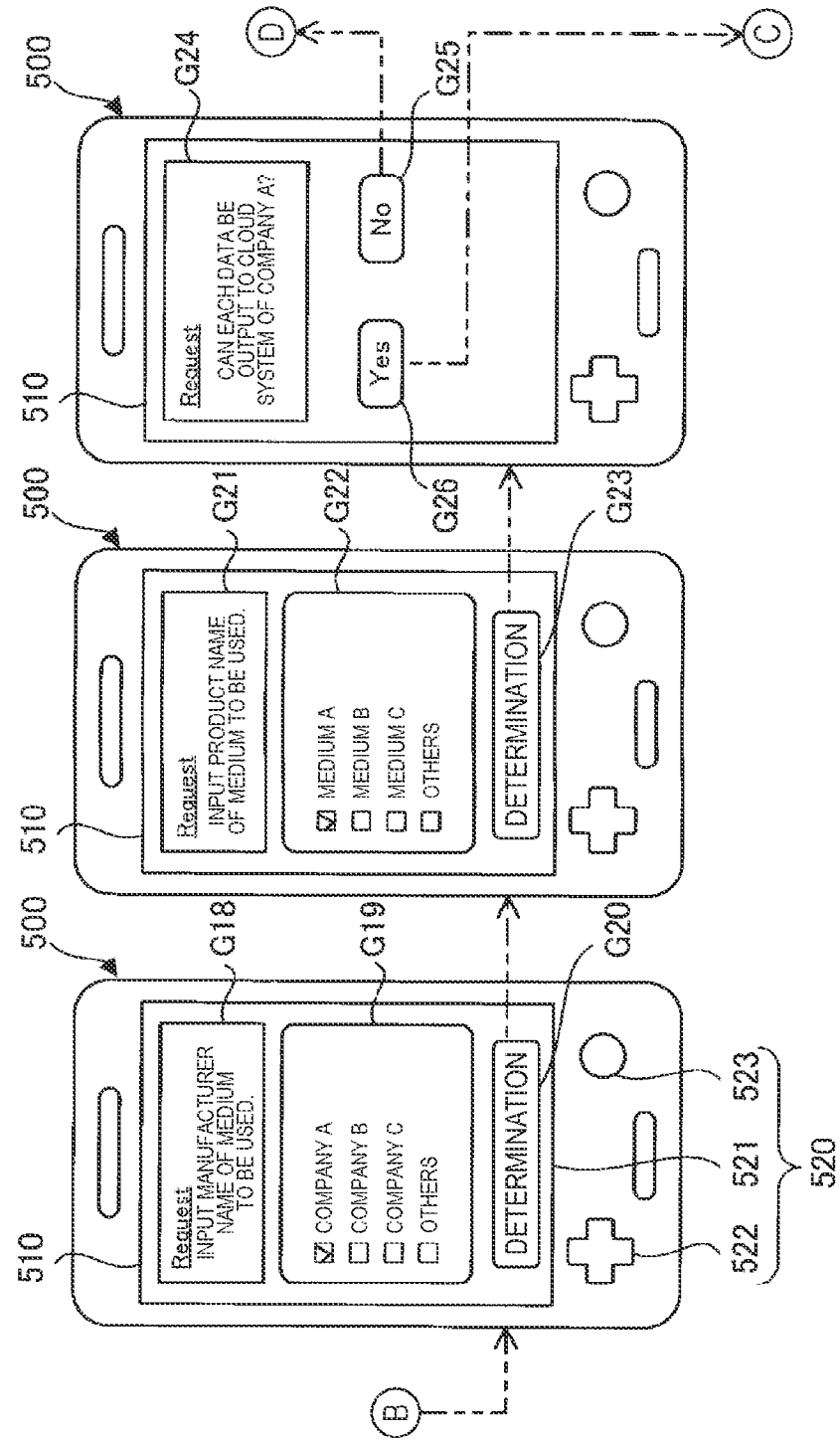

INK JET SYSTEM

The present application is based on, and claims priority from JP Application Serial Number 2021-193074, filed Nov. 29, 2021, the disclosure of which is hereby incorporated by reference herein in its entirety.

BACKGROUND

1. Technical Field

The present disclosure relates to an ink jet system.

2. Related Art

In an ink jet printer, ink is normally discharged from a head by driving a drive element such as a piezoelectric element based on recorded data obtained by converting image data by various image processing.

For example, in JP-A-2021-84274, image data is converted into recorded data by image processing including color conversion processing, gamma correction processing, quantization processing, and a mask processing in this order.

In recent years, there is a business model in which a head manufacturer manufactures and sells a head to a printer manufacturer. Printers have various applications and demands. In the above business model, the head manufacturer provides the head to the printer manufacturer in cooperation with the printer manufacturer who has specialized knowledge for each application and each demand. The printer manufacturer utilizes the above-described specialized knowledge to manufacture a printer incorporating the head of the head manufacturer. This is because there are cases where the above business model is more efficient in terms of comprehensively satisfying various applications and demands than the head manufacturer manufactures printers that satisfy various applications and demands one by one.

However, in the above business model, it is necessary for the printer manufacturer to search for and determine a content of an optimum image processing. Depending on the printer manufacturer, there are cases where there is specialized knowledge for each application and each demand, but there is not much knowledge about the printer itself, and in that case, this search and determination takes a huge amount of time and cost.

On the other hand, especially when the head manufacturer has knowledge about the printer, it is conceivable that the head manufacturer provides appropriate information on the image processing to the printer manufacturer. However, due to the nature of the above-described business model that the head manufacturer and the printer manufacturer are different, it is unclear on the head manufacturer side how the printer manufacturer sets the usage conditions of ink, medium, head, and the like. Since the optimum image processing differs according to these usage conditions, it was difficult for the head manufacturer to provide the appropriate information on the image processing. Therefore, the printer manufacturer is required to search for the information on the image processing by himself or herself according to each usage condition, and in some cases, the burden on the printer manufacturer may increase.

SUMMARY

According to an aspect of the present disclosure, there is provided an ink jet system including a head unit that includes a nozzle discharging ink, a pressure chamber communicating with the nozzle, and a drive element applying pressure fluctuation to the ink in the pressure chamber by supplying a drive pulse, an acquisition portion that acquires output information including one or both of first output information regarding the head unit and second output information regarding the ink used for the head unit, a first coupling portion that is communicably network-coupled to a server, a first output portion that outputs the output information to the server via the first coupling portion, a first input portion to which input information is input from the server via the first coupling portion, and a determination portion that determines a content of image processing for image data based on the input information.

BRIEF DESCRIPTION OF THE DRAWINGS

FIG. 8 is a table for describing information illustrating a correspondence relationship between output information and first input information of information included in correspondence information.

FIG. 9 is a table illustrating an example of a color conversion table used for the first input information.

FIG. 14 is a table for describing information illustrating a correspondence relationship between the output information and fourth input information of the information included in the correspondence information.

FIGS. 22A and 22B are diagrams for describing a transition of display of the second processing device.

FIGS. 23A and 23B are diagrams for describing a transition of display of the second processing device.

DESCRIPTION OF EXEMPLARY EMBODIMENTS

Figure 1:
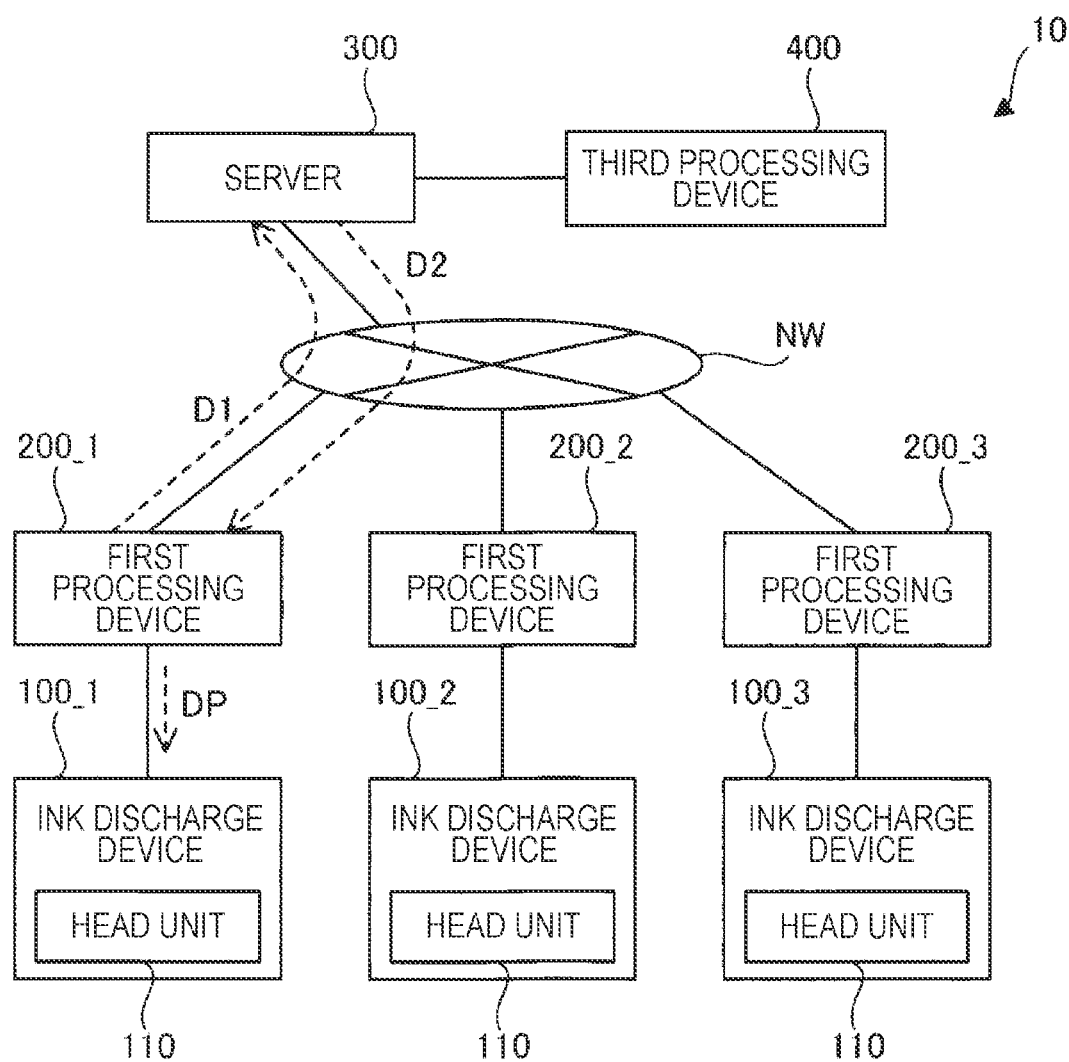
FIG. 1 is a schematic diagram illustrating a configuration example of an ink jet system according to a first embodiment.

Hereinafter, preferred embodiments according to the present disclosure will be described with reference to the accompanying drawings. In the drawings, the dimensions and scale of each part are appropriately different from the actual ones, and some parts are schematically illustrated for easy understanding. In addition, the scope of the present disclosure is not limited to these forms unless it is stated in the following description that the present disclosure is particularly limited.

1. First Embodiment 1-1. Overview of Ink Jet System

FIG. 1 is a schematic diagram illustrating a configuration example of an ink jet system 10 according to a first embodiment. The ink jet system 10 is a system that prints by an ink jet method. In particular, the ink jet system 10 has a function of determining a content of image processing for obtaining recorded data DP used for the printing. In the example illustrated in FIG. 1, the ink jet system 10 includes ink discharge devices 100_1 to 100_3, first processing devices 200_1 to 200_3, a server 300, and a third processing device 400.

Here, the ink discharge devices 100_1 to 100_3 are provided by the manufacturer of the printer main body, which will be described later. The ink discharge devices 100_1 to 100_3 may be provided by the same manufacturer or may be provided by different manufacturers. Each of the first processing devices 200_1 to 200_3 may be owned by the user or may be provided by the manufacturer of the printer main body. On the other hand, the head unit 110 incorporated in each of the ink discharge devices 100_1 to 100_3 is provided by a head manufacturer described later. Each of the server 300 and the third processing device 400 is owned by the head manufacturer. Maintenance and management of the server 300 are performed by the head manufacturer.

When the user uses the printer main body, the user owns the ink discharge device 100_1, the first processing device 200_1, and the head unit 110. On the other hand, although the user does not own the server 300, the first processing device 200_1 is communicably coupled to the server 300 via the communication network NW.

The user refers to a person who uses the ink discharge device 100_1. For example, when a manufacturer of the printer main body who purchased a head from a head manufacturer and manufactured the printer main body uses the printer main body, the manufacturer of the printer main body is the user. In addition, for example, when a manufacturer of the printer main body purchases a head from a head manufacturer and manufactures a printer main body, and a third party purchases and uses the printer main body from the manufacturer of the printer main body, the third party is a user.

The ink discharge device 100_1 is communicably coupled to the first processing device 200_1. The ink discharge device 100_2 is communicably coupled to the first processing device 200_2. The ink discharge device 100_3 is communicably coupled to the first processing device 200_3. As described above, the ink discharge devices 100_1 to 100_3 correspond to each of the first processing devices 200_1 to 200_3, and are communicably coupled to the first processing devices 200_1 to 200_3. In the following, each of the ink discharge devices 100_1 to 100_3 may be referred to as an ink discharge device 100, without distinguishing the ink discharge devices 100_1 to 100_3. Each of the first processing devices 200_1 to 200_3 may be referred to as a first processing device 200, without distinguishing the first processing devices 200_1 to 200_3.

In the example illustrated in FIG. 1, the number of each of the ink discharge device 100 and the first processing devices 200 included in the ink jet system 10 is three, but the number is not limited thereto, and may be one, two, or four or more. That is, the set of the ink discharge device 100 and the first processing device 200 is not limited to three sets, and may be one set, two sets, or four sets or more.

The ink discharge device 100 is a printer that prints an image based on the recorded data DP from the first processing device 200 on a medium by an ink jet method. The recorded data DP is image data in a format that can be processed by the ink discharge device 100. The medium may be any medium as long as the medium can be printed by the ink discharge device 100, and is not particularly limited. For example, various papers, various cloths, various films, and the like are included. The ink discharge device 100 may be a serial type printer or a line type printer.

The ink discharge device 100 includes a head unit 110. The head unit 110 is a module including an ink jet head. In the following, among the elements constituting the ink discharge device 100, the elements other than the head unit 110 may be referred to as a "printer main body". In addition, the head unit 110 or the ink discharge head 110a described later may be simply referred to as a "head". The configuration of the ink discharge device 100 will be described in detail later with reference to FIGS. 2 and 3.

The first processing device 200 is a computer such as a desktop type or a notebook type, and has a function of generating recorded data DP, a function of controlling printing by the ink discharge device 100, and has a function of determining the content of the image processing for generating the recorded data DP. The configuration of the first processing device 200 will be described in detail later with reference to FIG. 4.

The first processing device 200 is communicably coupled to the server 300 via a communication network NW including the Internet. The first processing device 200 outputs output information D1 to the server 300 and inputs input information D2 from the server 300. The output information D1 is information including one or both of the information regarding the head unit 110 described later and the information regarding the ink used for the head unit 110. The input information D2 is information regarding the content of the image processing for generating the recorded data DP. The first processing device 200 determines the content of the image processing based on the input information D2. In addition, the first processing device 200 generates recorded data DP by image processing, for example, image data D1 in a bitmap format such as JPEG or a vector system such as PostScript, portable document format (PDF), and XML paper specification (XPS). In the present embodiment, the image processing includes color conversion processing, density correction processing, quantization processing, and distribution processing. In addition to the above-described processing, the image processing may include, for example, raster image processor (RIP) processing or the like, if necessary.

The server 300 is a computer that functions as a cloud server, and has a function of inputting output information D1 from the first processing device 200, a function of generating input information D2 based on the output information D1, and a function of outputting the generated input information D2 to the first processing device 200. The configuration of the server 300 will be described in detail later with reference to FIG. 5.

In addition, the server 300 is communicably coupled to the third processing device 400, and appropriately transmits and receives information necessary for generating the input information D2. The third processing device 400 is a computer that inputs the output information D1 from the server 300, if necessary, and outputs the information necessary for generating the input information D2 to the server 300.

In the ink jet system 10 of the above outline, since the first processing device 200 outputs the output information D1 toward the server 300, the output information D1 can be provided to the head manufacturer. Therefore, by utilizing the knowledge of the head manufacturer in addition to the output information D1, the input information D2 can be efficiently obtained as the information necessary for determining the content of the image processing for obtaining the recorded data DP. Since the first processing device 200 determines the content of the image processing based on the input information D2 input from the server 300, the content of the image processing can be determined while reducing the burden on the printer manufacturer. Hereinafter, the ink jet system 10 will be described in detail.

1-2. Configuration of Ink Discharge Device

Figure 2:
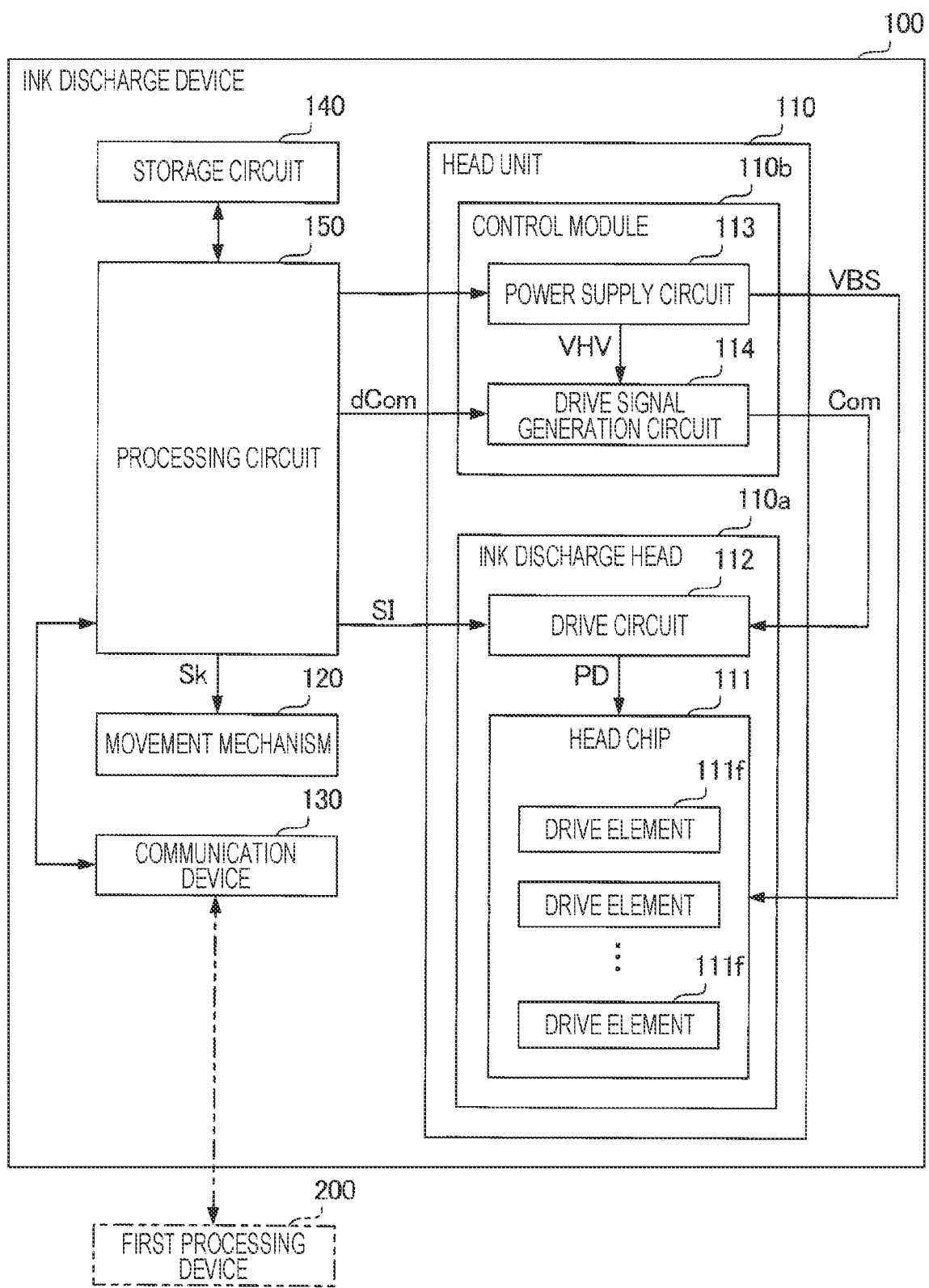
FIG. 2 is a schematic diagram illustrating a configuration example of an ink discharge device used in the ink jet system according to the first embodiment.

FIG. 2 is a schematic diagram illustrating a configuration example of the ink discharge device 100 used in the ink jet system 10 according to the first embodiment. As illustrated in FIG. 2, the ink discharge device 100 includes a head unit 110, a movement mechanism 120, a communication device 130, a storage circuit 140, and a processing circuit 150.

The head unit 110 is an assembly including a head chip 111, a drive circuit 112, a power supply circuit 113, and a drive signal generation circuit 114.

In the example illustrated in FIG. 2, the head unit 110 is divided into an ink discharge head 110a including the head chip 111 and the drive circuit 112, and a control module 110b including the power supply circuit 113 and the drive signal generation circuit 114. The head unit 110 is not limited to an aspect of being divided into the ink discharge head 110a and the control module 110b, and for example, a part or all of the control module 110b may be incorporated in the ink discharge head 110a.

The head chip 111 discharges ink toward the medium. In FIG. 2, among components of the head chip 111, a plurality of drive elements 111f are typically illustrated. A detailed example of the head chip 111 will be described later with reference to FIG. 3.

In the example illustrated in FIG. 2, the number of head chips 111 included in the head unit 110 is one, but the number may be two or more. When the ink discharge device 100 is a serial type, one or more head chips 111 are disposed so that a plurality of nozzles are distributed over a part of the medium in the width direction. In addition, when the ink discharge device 100 is a line type, two or more head chips 111 are disposed so that a plurality of nozzles are distributed over the entire medium in the width direction.

The drive circuit 112 switches whether or not to supply a drive signal Com output from the drive signal generation circuit 114 as a drive pulse PD for each of the plurality of drive elements 111f included in the head chip 111 under the control of the processing circuit 150. The drive circuit 112 includes, for example, a group of switches such as a transmission gate for the switching.

The power supply circuit 113 receives power from a commercial power source (not illustrated) and generates various predetermined potentials. The various generated potentials are appropriately supplied to each part of the ink discharge device 100. In the example illustrated in FIG. 2, the power supply circuit 113 generates a power supply potential VHV and an offset potential VBS. The offset potential VBS is supplied to the head chip 111 and the like. In addition, the power supply potential VHV is supplied to the drive signal generation circuit 114 and the like.

The drive signal generation circuit 114 is a circuit that generates the drive signal Com for driving each drive element 111f included the head chip 111. Specifically, the drive signal generation circuit 114 includes, for example, a DA conversion circuit and an amplifier circuit. In the drive signal generation circuit 114, the DA conversion circuit converts a waveform designation signal dCom described later from the processing circuit 150 from a digital signal to an analog signal, and the amplifier circuit generates a drive signal Com by amplifying the analog signal using the power supply potential VHV from the power supply circuit 113. Here, among the waveforms included in the drive signal Com, the signal of the waveform actually supplied to the drive element 111f is the drive pulse PD.

The movement mechanism 120 changes the relative position of the head unit 110 and the medium. More specifically, when the ink discharge device 100 is a serial type, the movement mechanism 120 includes a transport mechanism that transports the medium in a predetermined direction, and a movement mechanism that repeatedly moves the head unit 110 along an axis orthogonal to the transport direction of the medium. In addition, when the ink discharge device 100 is a line type, the movement mechanism 120 includes a transport mechanism that transports the medium in a direction intersecting the longitudinal direction of the elongated head unit 110.

The communication device 130 is a circuit capable of communicating with the first processing device 200. For example, the communication device 130 is an interface such as a wireless or wired local area network (LAN) or a universal serial bus (USB). USB is a registered trademark. The communication device 130 may be coupled to another first processing device 200 via another network such as the Internet. In addition, the communication device 130 may be integrated with the processing circuit 150.

The storage circuit 140 stores various programs executed by the processing circuit 150 and various data such as recorded data DP processed by the processing circuit 150. The storage circuit 140 includes, for example, one or both semiconductor memories of one or more volatile memories such as a random access memory (RAM) and one or more non-volatile memories such as a read only memory (ROM), an electrically erasable programmable read-only memory (EEPROM) or a programmable ROM (PROM). The recorded data DP is supplied from, for example, the first processing device 200. The storage circuit 140 may be configured as a part of the processing circuit 150.

The processing circuit 150 has a function of controlling the operation of each part of the ink discharge device 100 and a function of processing various data. The processing circuit 150 includes, for example, one or more processors such as a central processing unit (CPU). The processing circuit 150 may include a programmable logic device such as a field-programmable gate array (FPGA) in place of the CPU or in addition to the CPU.

The processing circuit 150 controls the operation of each part of the ink discharge device 100 by executing a program stored in the storage circuit 140. Here, the processing circuit 150 generates signals such as a control signal Sk, a print data signal SI, and a waveform designation signal dCom as signals for controlling the operation of each part of the ink discharge device 100.

The control signal Sk is a signal for controlling the drive of the movement mechanism 120. The print data signal SI is a signal for controlling the drive of the drive circuit 112. Specifically, the print data signal SI specifies whether or not the drive circuit 112 supplies the drive signal Com from the drive signal generation circuit 114 to the drive element 111*f* as a drive pulse PD for each predetermined unit period. By this designation, the amount of ink discharged from the head chip 111 and the like are designated. The waveform designation signal dCom is a digital signal for defining the waveform of the drive signal Com generated by the drive signal generation circuit 114.

Figure 3:
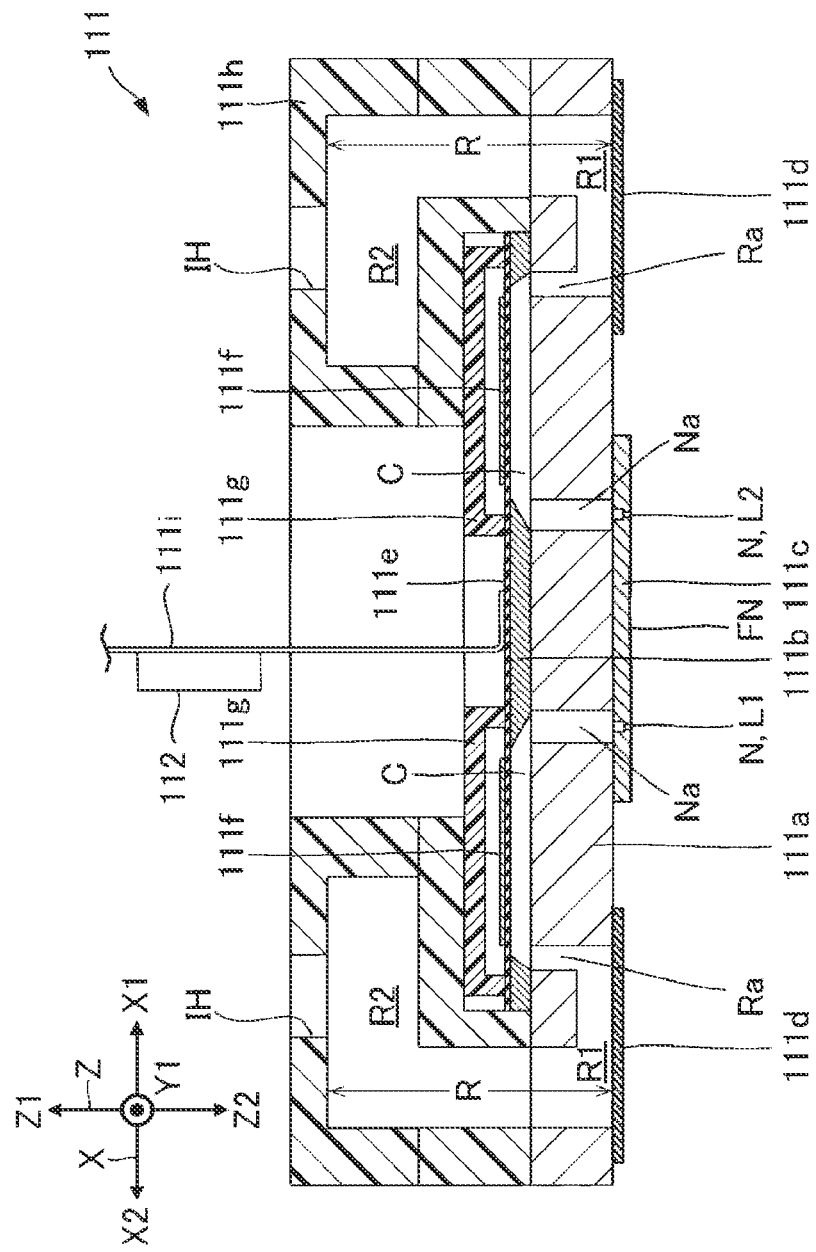
FIG. 3 is a cross-sectional view illustrating a configuration example of a head chip.

FIG. 3 is a cross-sectional view illustrating a configuration example of the head chip 111. In the following description, the X axis, Y axis, and Z axis that intersect each other are appropriately used. In the following, one direction along the X axis is the X1 direction, and the direction opposite to the X1 direction is the X2 direction. Similarly, the directions opposite to each other along the Y axis are the Y1 direction and the Y2 direction. The directions opposite to each other along the Z axis are the Z1 direction and the Z2 direction.

As illustrated in FIG. 3, the head chip 111 includes a plurality of nozzles N arranged in a direction along the Y axis. The plurality of nozzles N are divided into a first row L1 and a second row L2 which are arranged at gaps along the X axis. Each of the first row L1 and the second row L2 is a set of the plurality of nozzles N linearly arranged in the direction along the Y axis.

The head chip 111 has a configuration substantially symmetrical with each other in the direction along the X axis. However, the positions of the plurality of nozzles N in the first row L1 and the plurality of nozzles N in the second row L2 in the direction along the Y axis may be the same as or different from each other. FIG. 3 illustrates a configuration in which the positions of the plurality of nozzles N in the first row L1 and the plurality of nozzles N in the second row L2 in the direction along the Y axis coincide with each other.

As illustrated in FIG. 3, the head chip 111 includes a flow path substrate 111*a*, a pressure chamber substrate 111*b*, a nozzle plate 111*c*, a vibration absorber 111*d*, a diaphragm 111*e*, a plurality of drive elements 111*f*, a protective plate 111*g*, a case 111*h*, and a wiring substrate 111*i*.

The flow path substrate 111*a* and the pressure chamber substrate 111*b* are laminated in this order in the Z1 direction, and form a flow path for supplying ink to the plurality of nozzles N. The diaphragm 111*e*, a plurality of drive elements 111*f*, the protective plate 111*g*, the case 111*h*, and the wiring substrate 111*i* are installed in a region located in the Z1 direction with respect to a laminated body including the flow path substrate 111*a* and the pressure chamber substrate 111*b*. On the other hand, the nozzle plate 111*c* and the vibration absorber 111*d* are installed in the region located in the Z2 direction from the laminated body. Each element of the head chip 111 is approximately a plate-shaped member elongated in the Y direction, and is bonded to each other by, for example, an adhesive. Hereinafter, each element of the head chip 111 will be described in order.

The nozzle plate 111*c* is a plate-shaped member provided with the plurality of nozzles N in each of the first row L1 and the second row L2. Each of the plurality of nozzles N is a through-hole through which ink is passed. Here, the surface of the nozzle plate 111*c* facing the Z2 direction is a nozzle surface FN. The nozzle plate 111*c* is manufactured by processing a silicon single crystal substrate by a semiconductor manufacturing technique using a processing technique such as dry etching or wet etching, for example. However, other known methods and materials may be appropriately used for manufacturing the nozzle plate 111*c*. In addition, the cross-sectional shape of the nozzle is typically circular, but is not limited thereto, and may be a non-circular shape such as a polygon or an ellipse.

The flow path substrate 111*a* is provided with a space R1, a plurality of supply flow paths Ra, and a plurality of communication flow paths Na for each of the first row L1 and the second row L2. The space R1 is a long opening extending in the direction along the Y axis in a plan view in the direction along the Z axis. Each of the supply flow path Ra and the communication flow path Na is a through-hole formed for each nozzle N. Each supply flow path Ra communicates with the space R1.

The pressure chamber substrate 111*b* is a plate-shaped member provided with a plurality of pressure chambers C called cavities for each of the first row L1 and the second row L2. The plurality of pressure chambers C are arranged in the direction along the Y axis. Each pressure chamber C is a long space formed for each nozzle N and extending in a direction along the X axis in a plan view. Each of the flow path substrate 111*a* and the pressure chamber substrate 111*b* is manufactured by processing a silicon single crystal substrate by, for example, semiconductor manufacturing technique, in the same manner as the nozzle plate 111*c* described above. However, other known methods and materials may be appropriately used for the manufacture of each of the flow path substrate 111*a* and the pressure chamber substrate 111*b*.

The pressure chamber C is a space located between the flow path substrate 111*a* and the diaphragm 111*e*. For each of the first row L1 and the second row L2, the plurality of pressure chambers C are arranged in a direction along the Y axis. In addition, the pressure chamber C communicates with each of the communication flow path Na and the supply flow path Ra. Therefore, the pressure chamber C communicates with the nozzle N via the communication flow path Na and communicates with the space R1 via the supply flow path Ra.

The diaphragm 111*e* is disposed on the surface of the pressure chamber substrate 111*b* facing the Z1 direction. The diaphragm 111*e* is a plate-shaped member that can elastically vibrate. The diaphragm 111e includes, for example, a first layer and a second layer, which are laminated in the Z1 direction in this order. The first layer is, for example, an elastic film made of silicon oxide ($SiO_2$). The elastic film is formed, for example, by thermally oxidizing one surface of the silicon single crystal substrate. The second layer is, for example, an insulating film made of zirconium oxide ($ZrO_2$). The insulating film is formed by, for example, forming a zirconium layer by a sputtering method and thermally oxidizing the layer. The diaphragm 111e is not limited to the above-described configuration by laminating the first layer and the second layer, and may be configured to include, for example, a single layer or three or more layers.

On the surface of the diaphragm 111e facing the Z1 direction, the plurality of drive elements 111f corresponding to the nozzles N are disposed with each other for each of the first row L1 and the second row L2. Each drive element 111f is a passive element that is deformed by the supply of a drive signal. Each drive element 111f has a long shape extending in a direction along the X axis in a plan view. The plurality of drive elements 111f are arranged in a direction along the Y axis so as to correspond to the plurality of pressure chambers C. The drive element 111f overlaps the pressure chamber C in a plan view.

Each drive element 111f is a piezoelectric element, and although not illustrated, each drive element 111f includes a first electrode, a piezoelectric layer, and a second electrode, and these are laminated in the Z1 direction in this order. One electrode of the first electrode and the second electrode is an individual electrode disposed apart from each other for each drive element 111f, and the drive pulse PD is supplied to the one electrode. The other electrode of the first electrode and the second electrode is a band-shaped common electrode extending in the direction along the Y axis so as to be continuous over the plurality of drive elements 111f, and an offset potential VBS is supplied to the other electrode. Examples of the metal material of these electrodes include metal materials such as platinum (Pt), aluminum (Al), nickel (Ni), gold (Au), and copper (Cu), and among these metal materials, one type can be used alone or two or more types can be used in combination in an alloy or laminated manner. The piezoelectric layer is made of a piezoelectric material such as lead zirconate titanate ($Pb(Zr,Ti)O_3$), and forms, for example, a strip extending in the direction along the Y axis so as to be continuous over the plurality of drive elements 111f. However, the piezoelectric layer may be integrated over the plurality of drive elements 111f. In this case, the piezoelectric layer is provided with a through-hole penetrating the piezoelectric layer and extending in a direction along the X axis in a region corresponding to a gap between pressure chambers C adjacent to each other in a plan view. When the diaphragm 111e vibrates in conjunction with the above deformation of the drive element 111f, the pressure in the pressure chamber C fluctuates, so that ink is discharged from the nozzle N.

The protective plate 111g is a plate-shaped member installed on the surface of the diaphragm 111e facing the Z1 direction, protects the plurality of drive elements 111f, and reinforces the mechanical strength of the diaphragm 111e. Here, the plurality of drive elements 111f are accommodated between the protective plate 111g and the diaphragm 111e. The protective plate 111g is made of, for example, a resin material.

The case 111h is a member for storing ink supplied to the plurality of pressure chambers C. The case 111h is made of, for example, a resin material. The case 111h is provided with a space R2 for each of the first row L1 and the second row L2. The space R2 is a space communicating with the above-described space R1 and functions as a reservoir R for storing ink supplied to the plurality of pressure chambers C together with the space R1. The case 111h is provided with an inlet IH for supplying ink to each reservoir R. The ink in each reservoir R is supplied to the pressure chamber C via each supply flow path Ra.

The vibration absorber 111d, also referred to as a compliance substrate, is a flexible resin film constituting the wall surface of the reservoir R, and absorbs pressure fluctuations of ink in the reservoir R. The vibration absorber 111d may be a thin plate made of metal and having flexibility. The surface of the vibration absorber 111d facing the Z1 direction is bonded to the flow path substrate 111a with an adhesive or the like.

The wiring substrate 111i is mounted on the surface of the diaphragm 111e facing the Z1 direction, and is a mounting component for electrically coupling the head chip 111, the drive circuit 112, the control module 110b, and the like. The wiring substrate 111i is a flexible wiring substrate such as a chip on film (COF), a flexible printed circuit (FPC), or a flexible flat cable (FFC). The drive circuit 112 described above is mounted on the wiring substrate 111i of the present embodiment.

1-3. Configuration of First Processing Device

Figure 4:
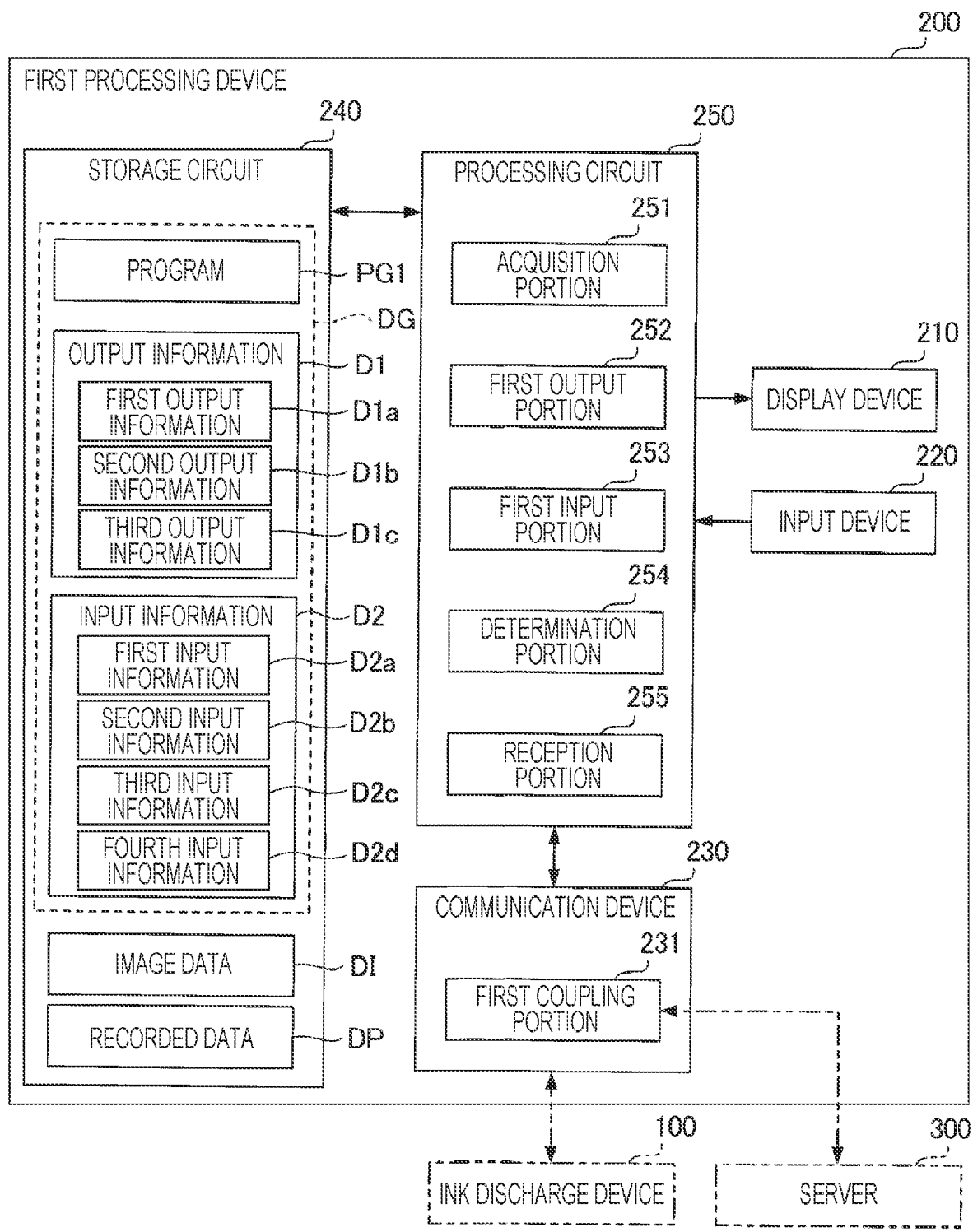
FIG. 4 is a schematic diagram illustrating a configuration example of a first processing device used in the ink jet system according to the first embodiment.

FIG. 4 is a schematic diagram illustrating a configuration example of the first processing device 200 used in the ink jet system 10 according to the first embodiment. As illustrated in FIG. 4, the first processing device 200 includes a display device 210, an input device 220, a communication device 230, a storage circuit 240, and a processing circuit 250. These components are communicably coupled to each other.

The display device 210 displays various images under the control of the processing circuit 250. Here, the display device 210 includes various display panels such as a liquid crystal display panel or an organic electro-luminescence (EL) display panel, for example. The display device 210 may be provided outside the first processing device 200. In addition, the display device 210 may be a component of the ink discharge device 100.

The input device 220 is a device that receives an operation from the user. For example, the input device 220 includes a pointing device such as a touch pad, a touch panel, or a mouse. Here, when the input device 220 includes the touch panel, the input device 220 may also serve as a display device 210. The input device 220 may be provided outside the first processing device 200. In addition, the input device 220 may be a component of the ink discharge device 100. In addition, the input device 220 may include an image pickup device having a charge coupled device (CCD) image sensor, a complementary MOS (CMOS) image sensor, or the like.

The communication device 230 is a circuit capable of communicating with each of the ink discharge device 100 and the server 300. For example, the communication device 230 is an interface such as a wireless or wired LAN or USB. The communication device 230 transmits the recorded data DP to the ink discharge device 100 by communicating with the ink discharge device 100. In addition, the communication device 230 transmits the output information D1 and receives the input information D2 by communicating with the server 300. That is, the communication device 230 functions as a first coupling portion 231 that is communicably coupled to the server 300. The communication device 230 may be integrated with the processing circuit 250.

The storage circuit 240 is a device that stores various programs executed by the processing circuit 250 and various data processed by the processing circuit 250. The storage circuit 240 includes, for example, a hard disk drive or a semiconductor memory. A part or all of the storage circuit 240 may be provided in a storage device or a server outside the first processing device 200.

The storage circuit 240 of the present embodiment stores a program PG1, the output information D1, the input information D2, the image data D1, and the recorded data DP. A part or all of the output information D1, the input information D2, the image data D1, and the recorded data DP may be stored in an external storage device or server of the first processing device 200. In addition, in the following, the program PG1, the output information D1, and the input information D2 may be collectively referred to as information DG.

The program PG1 is a program that enables a computer to realize various functions necessary for determining the content of the image processing based on the input information D2. The image processing is processing for converting the image data D1 into the recorded data DP. In the following, the processing for converting the image data D1 into the recorded data DP may be simply referred to as "image processing".

The output information D1 includes first output information D1$a$, second output information D1$b$, and third output information D1$c$. The third output information D1$c$ may be omitted. In addition, one of the first output information D1$a$ and the second output information D1$b$ may be omitted.

The first output information D1$a$ is information regarding the head unit 110, and in particular, information regarding the discharge characteristic of the head unit 110. The first output information D1$a$ may be any information as long as the information can identify the discharge characteristic of the head unit 110, and is, for example, identification information such as a serial number or a product name unique to the head unit 110. The first output information D1$a$ is not limited to the identification information, and may be, for example, measurement information obtained by measuring the discharge characteristic of the head unit 110.

The second output information D1$b$ is information regarding the ink used for the head unit 110, and in particular, information regarding the color development property of the ink. The second output information D1$b$ may be any information as long as the information can identify the color development property of the ink, and is, for example, identification information such as an ink product number or a product name. The second output information D1$b$ is not limited to the identification information, and may be, for example, measurement information obtained by measuring the color of an image such as a color patch formed by discharging ink to a predetermined medium.

The third output information D1$c$ is information regarding the color development property of the medium printed by the ink discharged from the head unit 110. The third output information D1$c$ may be any information as long as the information can identify the color development property of the medium, and is, for example, identification information such as a product number or a product name of the medium. The third output information D1$c$ is not limited to the identification information, and may be, for example, measurement information obtained by measuring the color of the medium. Here, the color patch described above may be formed on the medium, and in this case, the measurement information may also serve as the second output information D1$b$.

In addition to each information described above, information regarding other usage conditions of the head unit 110 may be added to the output information D1. Examples of the information regarding the other usage conditions include information regarding the temperature of the head unit 110 and the like. Examples of the information regarding the temperature of the head unit 110 include information regarding the measurement temperature of the temperature sensor provided in the vicinity of the head unit 110. In addition, the temperature of the ink in the vicinity of the pressure chamber C may be measured by using a part of the drive element 111$f$, and the information regarding the measurement temperature may be used as information regarding the temperature of the head unit 110.

The input information D2 is information regarding the image processing. The input information D2 is provided from the server 300 to the first processing device 200 as described above. In the example illustrated in FIG. 4, the input information D2 includes first input information D2$a$, second input information D2$b$, third input information D2$c$, and fourth input information D2$d$.

The first input information D2$a$ is information used in the color conversion processing of converting the image data D1 indicated by a luminance value into the ink color data indicated by the density value for each ink color. Specifically, the first input information D2$a$ is information regarding a color conversion table that defines the correspondence relationship between the luminance value and the density value. The luminance value is a coordinate value of a color space such as an RGB color space used to express the color indicated by the image data D1. The density value is a coordinate value of a color space such as a CMY color space used to express the color indicated by the recorded data DP. That is, the density value is a coordinate value of a coordinate system having a coordinate axis for each ink color used for the head unit 110. In the above color conversion table, by using the luminance value as the input value and the density value as the output value, the image data D1 is converted into the ink color data indicated by the density value for each ink color. The details of the color conversion processing and the first input information D2$a$ will be described later with reference to with reference to FIGS. 8 and 9.

The second input information D2$b$ is information used for the density correction processing of correcting the density of the ink color data indicated by the density value for each ink color. Specifically, the second input information D2$b$ is information regarding a density correction table that defines a correspondence relationship between before and after correction of the density value. The density value is a coordinate value of a color space such as a CMY color space used to express the color indicated by the recorded data DP, similarly to the density value of the color conversion table described above. In the above density correction table, the density value of the ink color data is corrected by using the density value of the ink color data before correction as an input value and the density value of the ink color data after correction as an output value. The details of the density correction processing and the second input information D2$b$ will be described later with reference to FIGS. 10 and 11.

The third input information D2$c$ is information used in the quantization processing of generating quantization data by quantizing the ink color data indicated by the density value for each ink color. Specifically, the third input information D2$c$ is information regarding a dither pattern that defines a threshold value for converting the gradation value of a pixel group configured to include a plurality of pixels into the gradation value of each of the plurality of pixels for each of the plurality of pixels. Here, the ink color data is N value data indicating the gradation value of the pixel group configured to include the plurality of pixels, N being a natural number. The quantization data is M value data indicating the gradation value of each of the plurality of pixels, M being a natural number satisfying 2≤M<N. The details of the quantization processing and the third input information D2c will be described later with reference to FIGS. 12 and 13.

When an image is recorded in a unit region on the medium by distributing and discharging the ink on the unit region in a plurality of scans, the fourth input information D2d is information used in the distribution processing of generating the recorded data DP by distributing the quantization data to the plurality of scans. Specifically, the fourth input information D2d is information regarding a mask pattern that defines whether or not the quantization data is distributed to each of the plurality of scans. The details of the distribution processing and the fourth input information D2d will be described later with reference to FIGS. 14 and 15.

The processing circuit 250 is a device having a function of controlling each part of the first processing device 200 and a function of processing various data. The processing circuit 250 includes, for example, a processor such as a central processing unit (CPU). The processing circuit 250 may be configured to include a single processor or may be configured to include a plurality of processors. In addition, a part or all of the functions of the processing circuit 250 may be realized by hardware such as a digital signal processor (DSP), an application specific integrated circuit (ASIC), a programmable logic device (PLD), and a field programmable gate array (FPGA).

The processing circuit 250 functions as an acquisition portion 251, a first output portion 252, a first input portion 253, a determination portion 254, and a reception portion 255 by reading and executing the program PG1 from the storage circuit 240.

The acquisition portion 251 acquires the output information D1. In the present embodiment, the acquisition portion 251 acquires the first output information D1a, the second output information D1b, and the third output information D1c. For example, the acquisition portion 251 has a function of receiving the output information D1 via the input device 220, and acquires the output information D1 by using the function. The acquired output information D1 is stored in the storage circuit 240 as described above. The acquisition portion 251 may acquire the first output information D1a from the ink discharge device 100.

The first output portion 252 outputs the output information D1 via the first coupling portion 231. For example, the first output portion 252 outputs the output information D1 to the server 300 via the first coupling portion 231 using an instruction or the like by a user using the input device 220 as a trigger.

The input information D2 is input to the first input portion 253 via the first coupling portion 231. For example, the input information D2 is input from the server 300 to the first input portion 253 via the first coupling portion 231 using an instruction or the like by the user using the input device 220 as a trigger.

The determination portion 254 determines the content of the image processing based on the input information D2. In addition, the determination portion 254 determines whether or not to execute the image processing based on the input information D2 based on the reception result in the reception portion 255. The details of the determination will be described later with reference to FIG. 6.

The reception portion 255 receives an instruction by the user whether or not to execute the image processing based on the input information D2. For example, the reception portion 255 receives the instruction via the input device 220.

1-4. Configuration of Server

Figure 5:
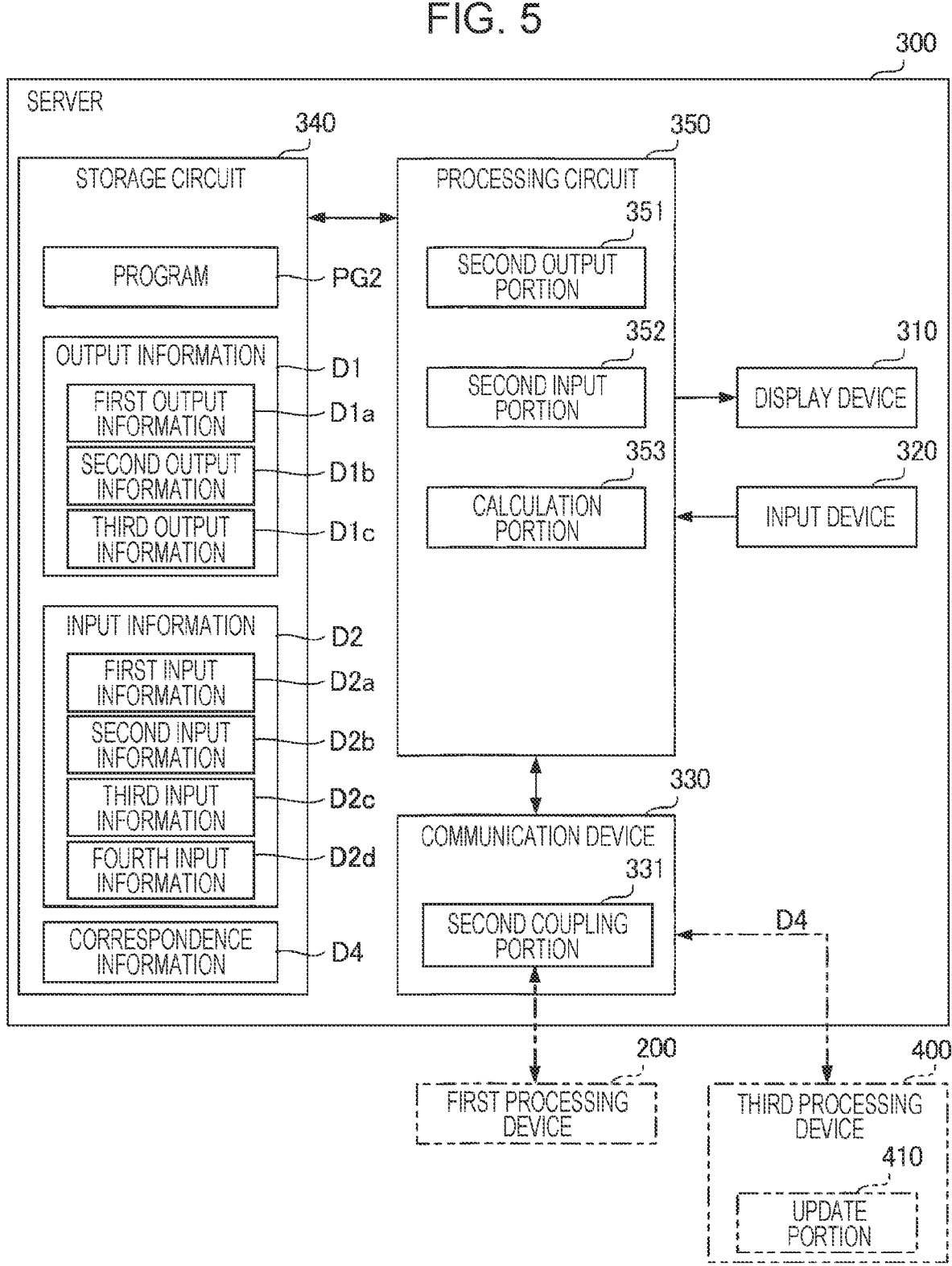
FIG. 5 is a schematic diagram illustrating a configuration example of a server used in the ink jet system according to the first embodiment.

FIG. 5 is a schematic diagram illustrating a configuration example of the server 300 used in the ink jet system 10 according to the first embodiment. As illustrated in FIG. 5, the server 300 includes a display device 310, an input device 320, a communication device 330, a storage circuit 340, and a processing circuit 350. These components are communicably coupled to each other. The storage circuit 340 is an example of a "storage portion".

The display device 310 is a device that displays various images under the control of the processing circuit 350, and is configured in the same manner as the display device 210 described above. The input device 320 is a device that receives an operation from the user, and is configured in the same manner as the input device 220 described above. The communication device 330 is a circuit capable of communicating with each first processing device 200, and is configured in the same manner as the communication device 230 described above. The communication device 330 may be integrated with the processing circuit 350.

Here, the communication device 330 receives the output information D1 and transmits the input information D2 by communicating with the first processing device 200. That is, the communication device 330 functions as a second coupling portion 331 that is communicably coupled to the first coupling portion 231. In addition, the communication device 330 transmits the output information D1 and receives the correspondence information D4 by communicating with the third processing device 400, if necessary.

The storage circuit 340 is a device that stores various programs executed by the processing circuit 350 and various data processed by the processing circuit 350, and is configured in the same manner as the storage circuit 240 described above. The storage circuit 340 stores the program PG2, the output information D1, the input information D2, and the correspondence information D4.

The program PG2 is a program that enables a computer to realize various functions necessary for generating the input information D2 based on the output information D1. The correspondence information D4 is information regarding the correspondence relationship between the output information D1 and the image processing to be executed. The details of the correspondence information D4 will be described later with reference to FIGS. 8 to 15.

The processing circuit 350 is a device having a function of controlling each part of the server 300 and a function of processing various data, and is configured in the same manner as the processing circuit 250 described above. The processing circuit 350 functions as a second output portion 351, a second input portion 352, and a calculation portion 353 by reading the program PG2 from the storage circuit 340 and executing the program PG2.

The second output portion 351 outputs the input information D2 via the second coupling portion 331. For example, the second output portion 351 outputs the input information D2 to the first processing device 200 via the second coupling portion 331 using an instruction or the like by the user using the input device 220 as a trigger.

The output information D1 is input to the second input portion 352 via the second coupling portion 331. For example, the output information D1 is input from the first processing device 200 to the second input portion 352 via the second coupling portion 331 using an instruction or the like by the user using the input device 220 as a trigger.

The calculation portion 353 performs a calculation to generate the input information D2 based on the output information D1 and the correspondence information D4. Here, the calculation portion 353 receives input of new correspondence information D4 from the third processing device 400 depending on the collation result of the output information D1 and the correspondence information D4, and generates the input information D2 by using the new correspondence information D4 from the third processing device 400.

More specifically, when the output information D1 from the second input portion 352 is included in the correspondence information D4, the calculation portion 353 generates the input information D2 based on the output information D1 and the correspondence information D4. On the other hand, when the second output information D1b, which has a greater influence on the image quality than the first output information D1a, is included in the correspondence information D4, even when a part of the output information D1 from the second input portion 352 is not included in the correspondence information D4, the calculation portion 353 generates information on the image processing corresponding to the information closest to the output information D1 from the second input portion 352 among the output information D1 indicated by the correspondence information D4 as the input information D2. In addition, when the second output information D1b from the second input portion 352 is not included in the correspondence information D4, the calculation portion 353 receives the input of the new correspondence information D4 from the third processing device 400, and generates the input information D2 using the new correspondence information D4 from the third processing device 400. The correspondence information D4 stored in the storage circuit 340 is rewritten into the new correspondence information D4.

Here, the third processing device 400 uses the output information D1 from the server 300 to generate new correspondence information D4. That is, the third processing device 400 includes an update portion 410 that updates the correspondence information D4. The update portion 410 updates the correspondence information D4 by appropriately using the information input from the operator of the third processing device 400 or the administrator of the ink jet system 10 in addition to the output information D1 and the correspondence information D4. In addition, the update portion 410 causes the server 300 to transmit the updated correspondence information D4. When the third processing device 400 does not have the original correspondence information D4, the third processing device 400 may update the correspondence information D4 after receiving the input of the correspondence information D4 in addition to the output information D1 from the server 300.

1-5. Ink Jet System Processing

Figure 6:
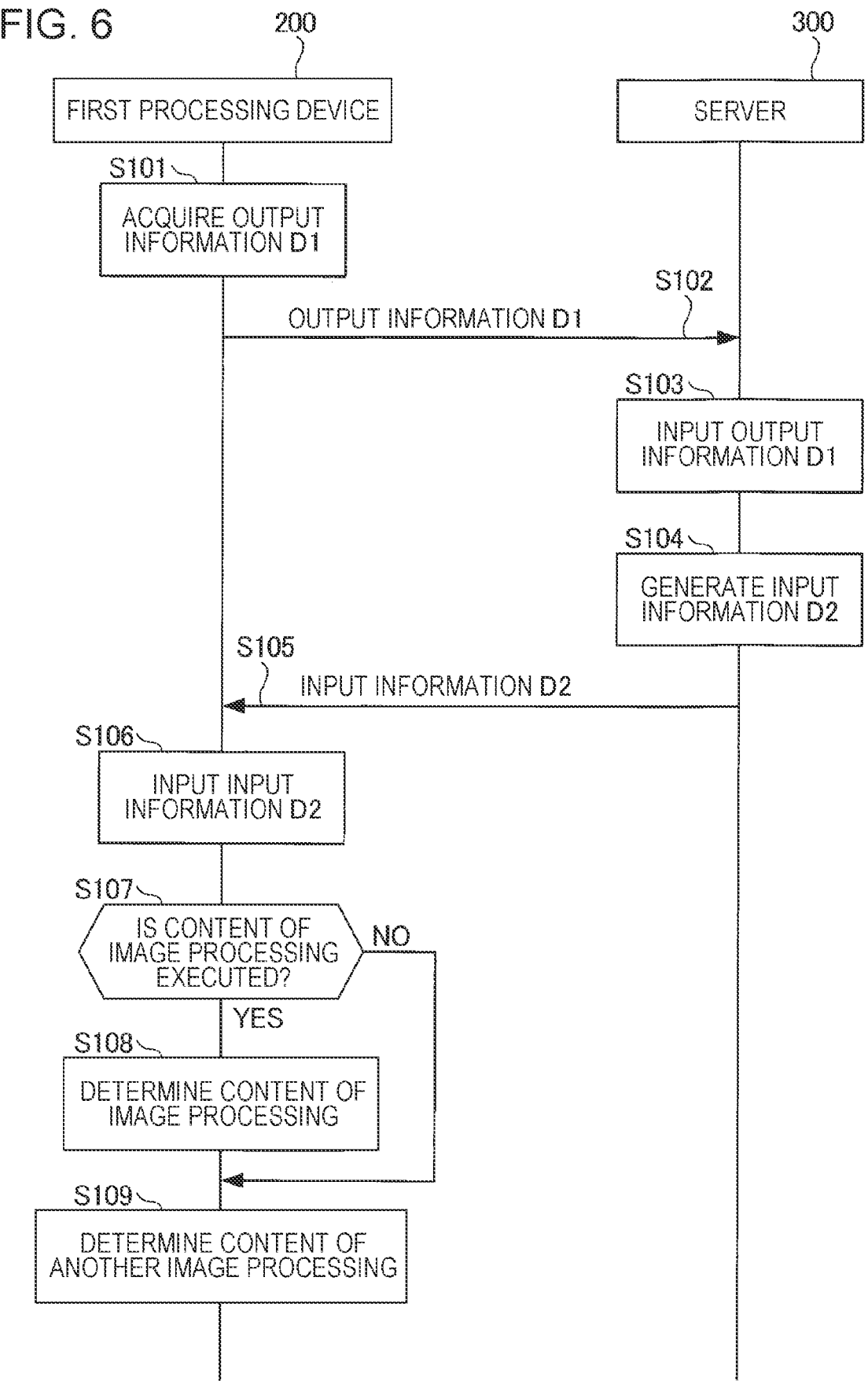
FIG. 6 is a flowchart illustrating processing of the ink jet system according to the first embodiment.

FIG. 6 is a flowchart illustrating the processing of the ink jet system 10 according to the first embodiment. In the ink jet system 10, first, as illustrated in FIG. 6, the first processing device 200 acquires the output information D1 in step S101.

Specifically, in step S101, for example, the acquisition portion 251 acquires the output information D1 by receiving the output information D1 via the input device 220. In step S101, the acquisition order of the first output information D1a, the second output information D1b, and the third output information D1c is not particularly limited and is optional. In addition, for example, the acquisition portion 251 may display an image for a graphical user interface (GUI) for inputting information necessary for acquiring the output information D1 on the display device 210 and appropriately receive information necessary for acquiring the output information D1 from the user using the image.

In step S102, the first processing device 200 outputs the output information D1 to the server 300.

Specifically, in step S102, the first output portion 252 outputs the output information D1 via the first coupling portion 231 with the acquisition of the output information D1 as a trigger. The timing at which the output information D1 is output to the first coupling portion 231 is not limited to the time when the output information D1 is acquired. For example, when the input using the GUI image described above is received, the first output portion 252 may transmit the authentication information such as the user's account information and password to the server 300, when the server 300 succeeds in the authentication using the authentication information, may send the output permission information from the server 300 to the first processing device 200, and when the first processing device 200 receives the output permission information, may output the output information D1 to the server 300.

Next, in step S103, the server 300 inputs the output information D1. In step S104, the server 300 generates the input information D2 based on the output information D1. More specifically, in step S104, the calculation portion 353 performs a calculation to generate the input information D2 based on the output information D1 and the correspondence information D4. The server 300 may inquire about the output information D1 with the predetermined inquiry information, and may cancel the processing after step S104 according to the inquiry result. In addition, the input information D2 indicating that the content information on the image processing is not provided may be output to the second output portion 351 according to the inquiry result.

Thereafter, in step S105, the server 300 outputs the input information D2 to the first processing device 200.

Next, in step S106, the first processing device 200 inputs the input information D2. Specifically, in step S106, the input information D2 from the server 300 is input to the first input portion 253 via the first coupling portion 231. The first input portion 253 notifies the user whether or not to input the input information D2 from the server 300 by using the display device 210 or the like, and the input information D2 from the server 300 may be input only when the user inputs an instruction for permitting input by the input device 220 or the like.

In step S107, it is determined whether or not the first processing device 200 executes the image processing based on the input information D2. Specifically, the display device 210 displays an image for receiving an instruction as to whether or not the reception portion 255 executes the image processing based on the input information D2. The reception portion 255 receives an instruction as to whether or not to execute the image processing based on the input information D2 via the input device 220.

When the instruction to execute the image processing based on the input information D2 is received, in step S108, the first processing device 200 determines the content of the image processing based on input information D2.

On the other hand, when the instruction not to execute the image processing based on the input information D2 is received, it is determined in step S109 that the first processing device 200 executes another image processing input by the user.

The determination portion 254 may determine the content of the image processing to be actually used after fine-tuning the content of the image processing based on the input information D2 by the user input using the input device 220.

1-6. Image Processing

Figure 7:
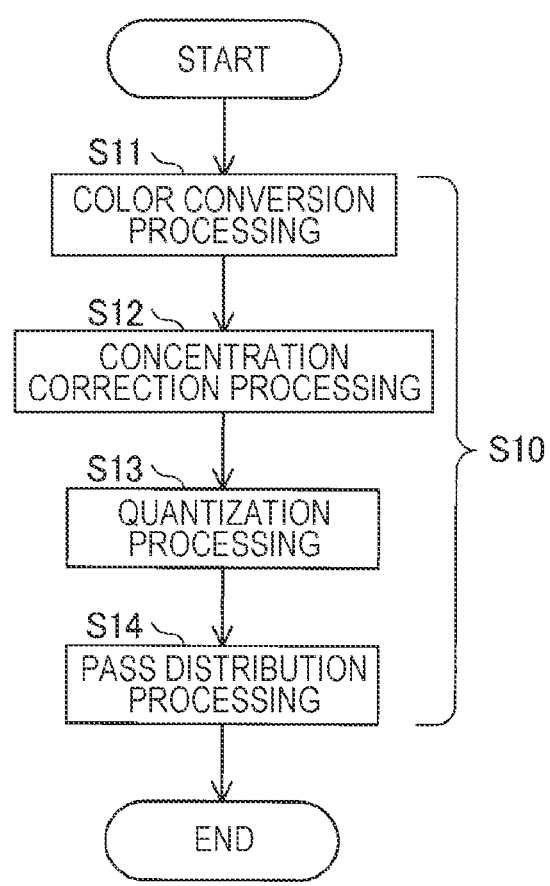
FIG. 7 is a flowchart illustrating image processing.

FIG. 7 is a flowchart illustrating image processing S10. The image processing S10 is processing for generating recorded data DP from the image data D1. As illustrated in FIG. 7, the image processing S10 includes color conversion processing S11, density correction processing S12, quantization processing S13, and distribution processing S14 in this order.

The content of these processing is determined in step S108 or step S109 described above. The determination in step S108 is performed based on the input information D2 as described above, and the input information D2 includes information regarding the content of these processing. That is, as described above, the input information D2 includes the first input information D2$a$ used for the color conversion processing, the second input information D2$b$ used for the density correction processing, the third input information D2$c$ used for the quantization processing, and the fourth input information D2$d$ used for the distribution processing.

The input information D2 is generated in step S104 as described above. In step S104, a calculation for generating the input information D2 is performed based on the output information D1. In the calculation, at least one of the first input information D2$a$, the second input information D2$b$, the third input information D2$c$, and the fourth input information D2$d$ is adjusted based on the correspondence information D4 so that the image processing S10 is optimized. Here, in the calculation, it is preferable that at least one of the first input information D2$a$, the second input information D2$b$, and the third input information D2$c$ is adjusted. From the viewpoint of ease of adjustment, it is preferable that any one of the first input information D2$a$, the second input information D2$b$, and the third input information D2$c$ is adjusted in the calculation. The adjustment of the fourth input information D2$d$ is performed, if necessary, and is preferably performed in combination with the adjustment of at least one of the first input information D2$a$, the second input information D2$b$, and the third input information D2$c$. Hereinafter, the adjustment of each information will be described.

1-7. Processing in Calculation Portion

Preferred image processing differs depending on the head, ink, and medium. Therefore, depending on the printer manufacturer or the printer user, image processing not expected by the head manufacturer may be performed, and the image quality may not be sufficiently obtained. For example, a case where a head manufacturer provides image processing information (color conversion table, density correction table, dither pattern, mask pattern, and the like which will be described later) designed to be an optimum color in the combination of the premises on the premise of a combination of a certain head, ink, and medium is considered as an example. For the sake of simplicity, the following description describes the case where the printer manufacturer and the printer user match, and the user who purchased the head manufactures the printer by himself or herself and further uses the printer, but it is basically the same even when the printer manufacturer and the printer user are different.

In particular, when the head manufacturer and the printer manufacturer are different, that is, the ink and medium recommended for use are determined by the printer manufacturer. At that time, a printer manufacturer who does not have much knowledge may not be able to determine what type of information on the image processing is optimal. It suffices when the head manufacturer can provide the information on the image processing in advance, but as described above, the ink and medium recommended for use differ depending on the printer manufacturer, and the information on the optimum image processing differs depending on the ink and medium. Therefore, in the past, even the head manufacturer could not determine what type of image processing is required to be performed.

For example, it is assumed that the printer manufacturer uses an ink having a lower brightness (L*) in the L*a*b* color space than the ink assumed by the head manufacturer. In this manner, even when the optimum information on the image processing is used for the ink that the head manufacturer has assumed in advance, since the brightness (L*) of the ink itself is low, the color of the actually recorded image is darker than the optimum color. Other than that, the same problem occurs when the printer manufacturer adopts ink that has different color development property when the ink is applied onto the medium compared to the ink expected by the head manufacturer.

In addition, as another example, it is assumed that the printer manufacturer uses a medium having a lower permeability than the medium assumed by the head manufacturer. Especially in dye ink, color is developed by fixing while penetrating the ink toward the inside of the medium, but when viewed from the surface of the medium, coloring material components fixed on the medium surface contribute mainly to color development, and coloring material components fixed in a deep part of the medium to some extent do not much contribute to color development. When a medium having low permeability is used, the coloring material component fixed in the vicinity of the surface of the medium is increased. In this manner, even when the optimum information on the image processing is used for the medium that the head manufacturer has assumed in advance, since the permeability of the medium is low, the amount of coloring material in the vicinity of the surface of the medium is increased than expected, and the color of the actually recorded image may be darker than the optimum color. Other than that, the same problem occurs when the printer manufacturer adopts a medium that has different color development property when ink is applied onto the medium compared to the medium expected by the head manufacturer.

As still another example, the printer manufacturer may have a plurality of types of heads manufactured by the head manufacturer and having different discharge characteristics from each other. In that case, when the printer manufacturer uses the optimum information on the image processing in another head B having a lower discharge characteristic (smaller discharge amount) than the head A while using one head A of a plurality of types of heads, the actually recorded image is darker than the optimum color.

As described above, the optimum information on the image processing differs depending on the combination of the head, ink, and medium adopted by the printer manufacturer. It may be difficult for printer manufacturers to find the optimum information. On the other hand, even when the head manufacturer tries to provide information on the image processing according to the head, ink, and medium in advance, since the information on the image processing can be optionally determined by the printer manufacturer, it is difficult to recognize the information on the image processing at the time of manufacturing and selling the head. Therefore, it was difficult for the head manufacturer to provide appropriate information on the image processing.

In view of this point, in the present embodiment, as described above, the first processing device 200_1 in the hand of the printer manufacturer and the server 300 provided, maintained, and managed by the head manufacturer can be coupled via the communication network NW, and the head, ink, and medium used by the printer manufacturer can be directly input to the server 300 of the head manufacturer. As a result, the appropriate information on the image processing according to the head, ink, and medium can be easily provided from the head manufacturer to the printer manufacturer, and the burden on the printer manufacturer can be reduced.

Specifically, in the present embodiment, the first processing device 200 outputs the first output information D1a regarding the head unit 110, the second output information D1b regarding the ink, and the third output information D1c regarding the medium toward the server 300. The server 300 uses the correspondence information D4 to calculate the input information D2 corresponding to the input first output information D1a, the second output information D1b, and the third output information D1c (including the first input information D2a, the second input information D2b, the third input information D2c, and the fourth input information D2d) and outputs the result to the first processing device 200.

1-7a. Adjustment of First Input Information D2a

Example 1

As Example 1 of the first embodiment, a case where the color conversion table LUT is varied according to the first output information D1a, the second output information D1b, and the third output information D1c will be described below.

FIG. 8 is a table for describing information D4a illustrating a correspondence relationship between the output information D1 and the first input information D2a of information included in the correspondence information D4. The information D4a is used when the first input information D2a is adjusted based on the output information D1 in the above-described step S104. In FIG. 8, the correspondence relationship between the first output information D1a, the second output information D1b, the third output information D1c, and the first input information D2a is exemplified. In FIG. 8, for convenience of description, the information D4a is illustrated in a simplified manner, and in reality, the information D4a is different from the example illustrated in FIG. 8 depending on the situation of the assumed printer manufacturer and the like.

In FIG. 8, each of "high discharge performance" and "low discharge performance" in the first column from the left is the discharge characteristic indicated by the first output information D1a, and it indicates that "high discharge performance" has a higher discharge characteristic than "low discharge performance". That is, when the head unit 110 indicated by the first output information D1a is a head unit having high discharge performance, in FIG. 8, it means that the "first output information D1a" uses any one of the first input information D2a corresponding to the "high discharge performance". In addition, when the head unit 110 indicated by the first output information D1a is a head unit having a low discharge performance, in FIG. 8, it means that the "first output information D1a" uses any one of the first input information D2a corresponding to the "low discharge performance". Of the two discharge characteristics that are different from each other, the discharge characteristic is higher when the maximum discharge amount per pixel from the nozzle is higher than when the maximum discharge amount is low. For example, the average discharge amount may be used instead of the maximum discharge amount. In addition, whether the discharge performance of the head unit 110 is high or low may be determined by the discharge characteristics, specifically, whether the maximum or average discharge amount is equal to or more than or less than a predetermined threshold value. In addition, the discharge performance may not be classified into two stages of "high discharge performance" and "low discharge performance", and may be classified into three or more stages in more detail.

In FIG. 8, each of "high color development" and "low color development" in the second column from the left is the color development property indicated by the second output information D1b, and "high color development" has higher color development property than "low color development". That is, when the ink indicated by the second output information D1b is an ink having high color development property, in FIG. 8, it means that "second output information D1b" uses any one of the first input information D2a corresponding to "high color development". In addition, when the ink indicated by the second output information D1b is an ink having low color development property, in FIG. 8, it means that "second output information D1b" uses any one of the first input information D2a corresponding to "low color development". Of the two color development properties that are different from each other, the color development property is higher when the color is likely to be expressed on the medium than when the color is unlikely to be expressed. Here, in the present embodiment, the color intensity when the target ink on a predetermined medium is applied and the image is observed is referred to as a "color development property" of the target ink. There are a plurality of indexes for evaluating the color intensity, and for example, it may be evaluated that the lower the brightness value (L*) in the L*a*b* color space, the darker the color (higher color development property). In addition, it may be evaluated that the lower the brightness value (V) in the HSV color space, the darker the color (higher color development property). In addition, it may be evaluated more directly that the larger the amount of the coloring material contained in the ink, the darker the color (higher color development property). In addition, whether the color development property of the ink is high or low may be specifically determined by whether the value corresponding to the color development property of the ink obtained as described above is equal to or more than or less than a predetermined threshold value. In addition, the color development property may not be classified into two stages of "high color development" and "low color development", and may be classified into three or more stages in more detail. The color development property of the dye ink is often higher than the color development property of the pigment ink.

In FIG. 8, each of "high color development" and "low color development" in the third column from the left is the color development property indicated by the third output information D1c, and "high color development" has higher color development property than "low color development".

That is, when the medium indicated by the third output information D1c is a medium having high color development property, in FIG. 8, it means that "third output information D1c" uses any one of the first input information D2a corresponding to "high color development". In addition, when the medium indicated by the third output information D1c is a medium having low color development property, in FIG. 8, it means that "third output information D1c" uses any one of the first input information D2a corresponding to "low color development". Of the two color development properties that are different from each other, the color development property is higher when the color is likely to be expressed on the medium than when the color is unlikely to be expressed. Here, in the present embodiment, the color intensity when a predetermined ink is applied onto the target medium and the image is observed is referred to as a "color development property" of the target medium. In order to evaluate the color intensity, the brightness value (L*) or the brightness value (V) may be used for evaluation in the same manner as the ink. In addition, it may be evaluated more directly that the lower the permeability of the medium, the darker the color (higher color development property). In addition, whether the color development property of the medium is high or low may be specifically determined by whether the value corresponding to the color development property of the medium obtained as described above is equal to or more than or less than a predetermined threshold value. In addition, the color development property may not be classified into two stages of "high color development" and "low color development", and may be classified into three or more stages in more detail. The color development property of glossy ink jet paper is often higher than that of plain paper.

In FIG. 8, each of "LUT_A" to "LUT_H" in the fourth column from the left is a color conversion table that defines the correspondence relationship between the luminance value and the density value. Details of these color conversion tables will be described later with reference to FIG. 9, using the color conversion tables LUT_A, LUT_B, LUT_C, and LUT_E as examples.

In step S104 described above, the calculation portion 353 of the server 300 generates the first input information D2a by selecting one of the color conversion tables LUT_A to LUT_H using the information D4a as illustrated in FIG. 8 based on the first output information D1a, the second output information D1b, and the third output information D1c from the second input portion 352.

Specifically, when the discharge characteristic indicated by the first output information D1a is "high discharge performance", the color development property indicated by the second output information D1b is "high color development", and the color development property indicated by the third output information D1c is "high color development", the color conversion table LUT_A is selected. When the discharge characteristic indicated by the first output information D1a is "high discharge performance", the color development property indicated by the second output information D1b is "high color development", and the color development property indicated by the third output information D1c is "low color development", the color conversion table LUT_B is selected. When the discharge characteristic indicated by the first output information D1a is "high discharge performance", the color development property indicated by the second output information D1b is "low color development", and the color development property indicated by the third output information D1c is "high color development", the color conversion table LUT_C is selected. When the discharge characteristic indicated by the first output information D1a is "high discharge performance", the color development property indicated by the second output information D1b is "low color development", and the color development property indicated by the third output information D1c is "low color development", the color conversion table LUT_D is selected. When the discharge characteristic indicated by the first output information D1a is "low discharge performance", the color development property indicated by the second output information D1b is "high color development", and the color development property indicated by the third output information D1c is "high color development", the color conversion table LUT_E is selected. When the discharge characteristic indicated by the first output information D1a is "low discharge performance", the color development property indicated by the second output information D1b is "high color development", and the color development property indicated by the third output information D1c is "low color development", the color conversion table LUT_F is selected. When the discharge characteristic indicated by the first output information D1a is "low discharge performance", the color development property indicated by the second output information D1b is "low color development", and the color development property indicated by the third output information D1c is "high color development", the color conversion table LUT G is selected. When the discharge characteristic indicated by the first output information D1a is "low discharge performance", the color development property indicated by the second output information D1b is "low color development", and the color development property indicated by the third output information D1c is "low color development", the color conversion table LUT_H is selected.

FIG. 9 is a table illustrating an example of the color conversion tables LUT_A, LUT_B, LUT_C, and LUT_E used for the first input information D2a. In FIG. 9, for each of the color conversion tables LUT_A, LUT_B, LUT_C, and LUT_E, the relationship between the input value and the output value when the color value (luminance value) in the RGB color space is set as the input value and the color value (density value) in the CMY color space is set as the output value is exemplified.

When the color conversion table LUT_E is selected, as described above, compared with the case where the color conversion table LUT_A is selected, the color development property indicated by the second output information D1b and the color development property indicated by the third output information D1c are the same as each other, but the discharge characteristics indicated by the first output information D1a are different from each other. Specifically, the discharge characteristic indicated by the first output information D1a when the color conversion table LUT_A is selected is higher than the discharge characteristic indicated by the first output information D1a when the color conversion table LUT_E is selected. Here, the color conversion table LUT_E is an example of the "first color conversion table", and the color conversion table LUT_A is an example of the "second color conversion table". In addition, the discharge characteristic indicated by the first output information D1a when the color conversion table LUT_A is selected is an example of the "first discharge characteristic", and the discharge characteristic indicated by the first output information D1a when the color conversion table LUT_E is selected is an example of the "second discharge characteristic".

In such a color conversion table LUT_A and a color conversion table LUT_E, when the input values are equal to each other, the output value by the color conversion table LUT_A is smaller than the output value by the color conversion table LUT_E. For example, when the input value is (126, 0, 126), the output value by the color conversion table LUT_E is (104, 205, 63), whereas the output value by the color conversion table LUT_A is (101, 200, 62). As can be understood from the above, the first input information D2a can be generated so as to reduce the fluctuation of the image quality due to the difference in the discharge characteristics.

When the color conversion table LUT_C is selected, as described above, compared with the case where the color conversion table LUT_A is selected, the discharge characteristic indicated by the first output information D1a and the color development property indicated by the third output information D1c are the same as each other, but the color development properties indicated by the second output information D1b are different from each other. Specifically, the color development property indicated by the second output information D1b when the color conversion table LUT_A is selected is higher than the color development property indicated by the second output information D1b when the color conversion table LUT_C is selected. Here, the color conversion table LUT_C is an example of the "third color conversion table", and the color conversion table LUT_A is an example of the "fourth color conversion table". In addition, the color development property indicated by the second output information D1b when the color conversion table LUT_A is selected is an example of the "first color development property", and the color development property indicated by the second output information D1b when the color conversion table LUT_C is selected is an example of the "second color development property".

In such a color conversion table LUT_A and a color conversion table LUT_C, when the input values are equal to each other, the output value by the color conversion table LUT_A is smaller than the output value by the color conversion table LUT_C. For example, when the input value is (126, 0, 126), the output value by the color conversion table LUT_C is (116, 230, 71), whereas the output value by the color conversion table LUT_A is (101, 200, 62). As can be understood from the above, the first input information D2a can be generated so as to reduce the fluctuation of the image quality due to the difference in the color development property of the ink.

When the color conversion table LUT_B is selected, as described above, compared with the case where the color conversion table LUT_A is selected, the discharge characteristic indicated by the first output information D1a and the color development property indicated by the second output information D1b are the same as each other, but the color development properties indicated by the third output information D1c are different from each other. Specifically, the color development property indicated by the third output information D1c when the color conversion table LUT_A is selected is higher than the color development property indicated by the third output information D1c when the color conversion table LUT_B is selected. Here, the color conversion table LUT_B is an example of the "fifth color conversion table", and the color conversion table LUT_A is an example of the "sixth color conversion table". In addition, the color development property indicated by the third output information D1c when the color conversion table LUT_A is selected is an example of the "third color development property", and the color development property indicated by the third output information D1c when the color conversion table LUT_B is selected is an example of the "fourth color development property".

In such a color conversion table LUT_A and a color conversion table LUT_B, when the input values are equal to each other, the output value by the color conversion table LUT_A is smaller than the output value by the color conversion table LUT_B. For example, when the input value is (126, 0, 126), the output value by the color conversion table LUT_B is (111, 220, 68), whereas the output value by the color conversion table LUT_A is (101, 200, 62). As can be understood from the above, the first input information D2a can be generated so as to reduce the fluctuation of the image quality due to the difference in the color development property of the medium.

In general, the influence of the color development property of ink on the image quality is larger than the discharge characteristic or the color development property of medium. Therefore, in the color conversion table LUT_B, the color conversion table LUT_C, and the color conversion table LUT_E, when the input values are equal to each other, the output value by the color conversion table LUT_C is larger than the output value by the color conversion table LUT_B or the color conversion table LUT_E.

In the example illustrated in FIG. 9, in the color conversion table LUT_B and the color conversion table LUT_E, when the input values are equal to each other, the output value by the color conversion table LUT_B is larger than the output value by the color conversion table LUT_E. Since the magnitude relation of the output values by the color conversion table LUT_B and the color conversion table LUT_E differs depending on the type of head and the like, the magnitude relation is not limited to the magnitude relation illustrated in FIG. 9.

1-7b. Adjustment of Second Input Information D2b

Example 2

As Example 2 of the first embodiment, a case where the density correction table GANMA is varied according to the first output information D1a, the second output information D1b, and the third output information D1c will be described below.

Figure 10:
FIG. 10 is a table for describing information illustrating a correspondence relationship between the output information and second input information of the information included in the correspondence information.

FIG. 10 is a table for describing information D4b illustrating a correspondence relationship between the output information D1 and the second input information D2b of the information included in the correspondence information D4. The information D4b is used when the second input information D2b is adjusted based on the output information D1 in the above-described step S104. In FIG. 10, the correspondence relationship between the first output information D1a, the second output information D1b, the third output information D1c, and the second input information D2b is exemplified. In FIG. 10, for convenience of description, the information D4b is illustrated in a simplified manner, and in reality, the information D4b is different from the example illustrated in FIG. 10 depending on the situation of the assumed printer manufacturer and the like.

In FIG. 10, the description in the first to third columns from the left is the same as in FIG. 8 described above. In FIG. 10, each of "GANMA_A" to "GANMA_H" in the fourth column from the left is a density correction table that defines the correspondence relationship between before and after correction of the density value. Details of these density correction tables will be described later with reference to FIG. 11, using the density correction tables GANMA_A, GANMA_B, GANMA_C, and GANMA_E as examples.

In step S104 described above, the calculation portion 353 of the server 300 generates the second input information D2b by selecting one of the density correction tables GANMA_A to GANMA_H using the information D4b as illustrated in FIG. 10 based on the first output information D1a, the second output information D1b, and the third output information D1c from the second input portion 352.

Specifically, when the discharge characteristic indicated by the first output information D1a is "high discharge performance", the color development property indicated by the second output information D1b is "high color development", and the color development property indicated by the third output information D1c is "high color development", the density correction table GANMA_A is selected. When the discharge characteristic indicated by the first output information D1a is "high discharge performance", the color development property indicated by the second output information D1b is "high color development", and the color development property indicated by the third output information D1c is "low color development", the density correction table GANMA_B is selected. When the discharge characteristic indicated by the first output information D1a is "high discharge performance", the color development property indicated by the second output information D1b is "low color development", and the color development property indicated by the third output information D1c is "high color development", the density correction table GANMA_C is selected. When the discharge characteristic indicated by the first output information D1a is "high discharge performance", the color development property indicated by the second output information D1b is "low color development", and the color development property indicated by the third output information D1c is "low color development", the density correction table GANMA_D is selected. When the discharge characteristic indicated by the first output information D1a is "low discharge performance", the color development property indicated by the second output information D1b is "high color development", and the color development property indicated by the third output information D1c is "high color development", the density correction table GANMA_E is selected. When the discharge characteristic indicated by the first output information D1a is "low discharge performance", the color development property indicated by the second output information D1b is "high color development", and the color development property indicated by the third output information D1c is "low color development", the density correction table GANMA_F is selected. When the discharge characteristic indicated by the first output information D1a is "low discharge performance", the color development property indicated by the second output information D1b is "low color development", and the color development property indicated by the third output information D1c is "high color development", the density correction table GANMA_G is selected. When the discharge characteristic indicated by the first output information D1a is "low discharge performance", the color development property indicated by the second output information D1b is "low color development", and the color development property indicated by the third output information D1c is "low color development", the density correction table GANMA_H is selected.

Figure 11:
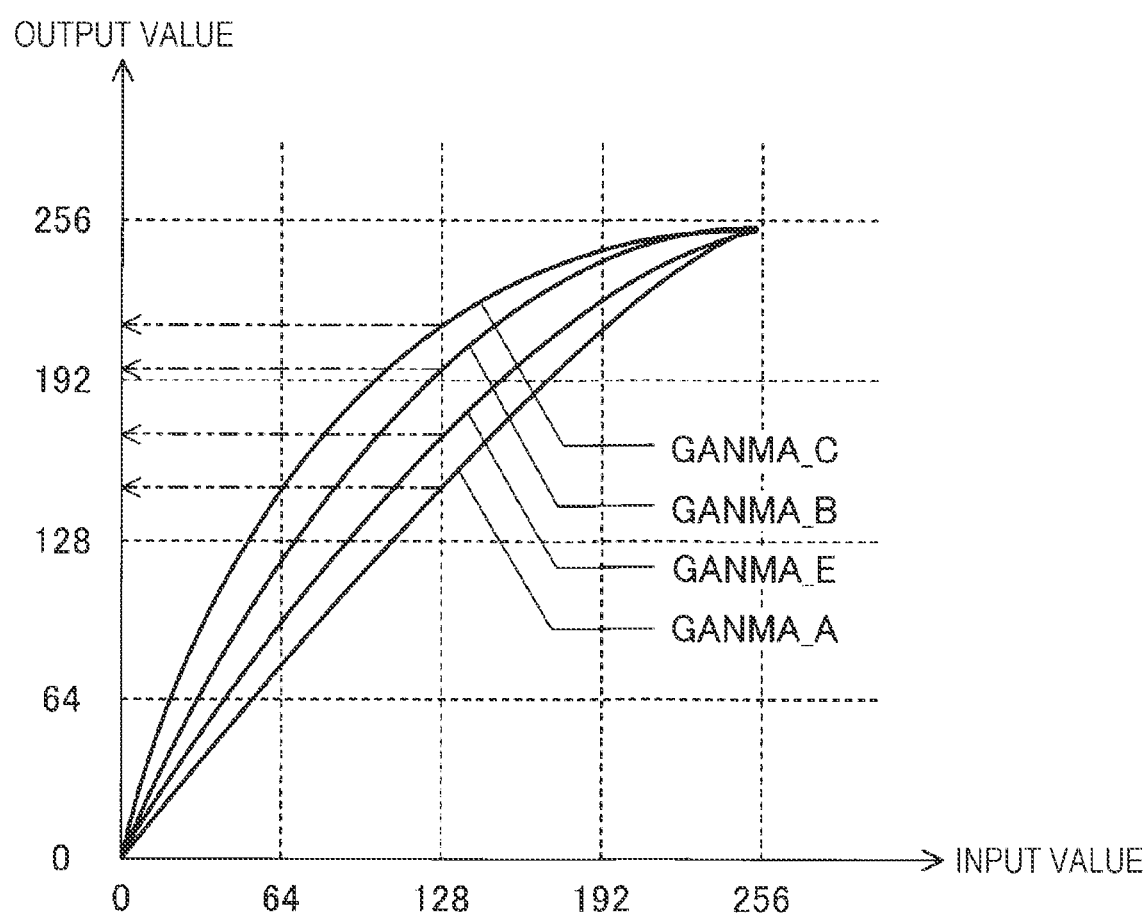
FIG. 11 is a graph illustrating an example of a density correction table used for the second input information.

FIG. 11 is a graph illustrating an example of the density correction tables GANMA_A, GANMA_B, GANMA_C, and GANMA_E used for the second input information D2b. In FIG. 11, for each of the density correction tables GANMA_A, GANMA_B, GANMA_C, and GANMA_E, the relationship between the input value and the output value when the density value before correction is set as the input value and the density value after correction is set as the output value is exemplified.

When the density correction table GANMA_E is selected, as described above, compared with the case where the density correction table GANMA_A is selected, the color development property indicated by the second output information D1b and the color development property indicated by the third output information D1c are the same as each other, but the discharge characteristics indicated by the first output information D1a are different from each other. Specifically, the discharge characteristic indicated by the first output information D1a when the density correction table GANMA_A is selected is higher than the discharge characteristic indicated by the first output information D1a when the density correction table GANMA_E is selected. Here, the density correction table GANMA_E is an example of the "first density correction table", and the density correction table GANMA_A is an example of the "second density correction table". In addition, the discharge characteristic indicated by the first output information D1a when the density correction table GANMA_A is selected is an example of the "first discharge characteristic", and the discharge characteristic indicated by the first output information D1a when the density correction table GANMA_E is selected is an example of the "second discharge characteristic".

In such a density correction table GANMA_A and a density correction table GANMA_E, when the input values are equal to each other, the output value by the density correction table GANMA_A is smaller than the output value by the density correction table GANMA_E. For example, when the input value is 128, the output value by the density correction table GANMA_E is approximately 160, while the output value by the density correction table GANMA_A is approximately 140. As can be understood from the above, the second input information D2b can be generated so as to reduce the fluctuation of the image quality due to the difference in the discharge characteristics.

When the density correction table GANMA_C is selected, as described above, compared with the case where the density correction table GANMA_A is selected, the discharge characteristics indicated by the first output information D1a and the color development property indicated by the third output information D1c are the same as each other, but the color development properties indicated by the second output information D1b are different from each other. Specifically, the color development property of the second output information D1b when the density correction table GANMA_A is selected is higher than the color development property of the second output information D1b when the density correction table GANMA_C is selected. Here, the density correction table GANMA_C is an example of the "third density correction table", and the density correction table GANMA_A is an example of the "fourth density correction table". In addition, the color development property indicated by the second output information D1b when the density correction table GANMA_A is selected is an example of the "first color development property", and the color development property indicated by the second output information D1b when the density correction table GANMA_C is selected is an example of the "second color development property".

In such a density correction table GANMA_A and a density correction table GANMA_C, when the input values are equal to each other, the output value by the density correction table GANMA_A is smaller than the output value by the density correction table GANMA_C. For example, when the input value is 128, the output value by the density correction table GANMA_C is approximately 220, while the output value by the density correction table GANMA_A is approximately 140. As can be understood from the above, the second input information D2$b$ can be generated so as to reduce the fluctuation of the image quality due to the difference in the color development property of the ink.

When the density correction table GANMA_B is selected, as described above, compared with the case where the density correction table GANMA_A is selected, the discharge characteristic indicated by the first output information D1$a$ and the color development property indicated by the second output information D1$b$ are the same as each other, but the color development properties indicated by the third output information D1$c$ are different from each other. Specifically, the color development property indicated by the third output information D1$c$ when the density correction table GANMA_A is selected is higher than the color development property indicated by the third output information D1$c$ when the density correction table GANMA_B is selected. Here, the density correction table GANMA_B is an example of the "fifth density correction table", and the density correction table GANMA_A is an example of the "sixth density correction table". In addition, the color development property indicated by the third output information D1$c$ when the density correction table GANMA_A is selected is an example of the "third color development property", and the color development property indicated by the third output information D1$c$ when the density correction table GANMA_B is selected is an example of the "fourth color development property".

In such a density correction table GANMA_A and a density correction table GANMA_B, when the input values are equal to each other, the output value by the density correction table GANMA_A is smaller than the output value by the density correction table GANMA_B. For example, when the input value is 128, the output value by the density correction table GANMA_B is approximately 190, while the output value by the density correction table GANMA_A is approximately 140. As can be understood from the above, the second input information D2$b$ can be generated so as to reduce the fluctuation of the image quality due to the difference in the color development property of the medium.

In general, the influence of the color development property of ink on the image quality is larger than the discharge characteristic or the color development property of medium. Therefore, in the density correction table GANMA_B, the density correction table GANMA_C, and the density correction table GANMA_E, when the input values are equal to each other, the output value by the density correction table GANMA_C is larger than the output value by the density correction table GANMA_B or the density correction table GANMA_E.

In the example illustrated in FIG. 11, in the density correction table GANMA_B and the density correction table GANMA_E, when the input values are equal to each other, the output value by the density correction table GANMA_B is larger than the output value by the density correction table GANMA_E. Since the magnitude relation of the output values by the density correction table GANMA_B and the density correction table GANMA_E differs depending on the type of the head and the like, the magnitude relation is not limited to the magnitude relation illustrated in FIG. 11.

1-7c. Adjustment of Third Input Information D2$c$

Example 3

As Example 3 of the first embodiment, a case where the dither pattern DITHER is varied according to the first output information D1$a$, the second output information D1$b$, and the third output information D1$c$ will be described below.

Figure 12:
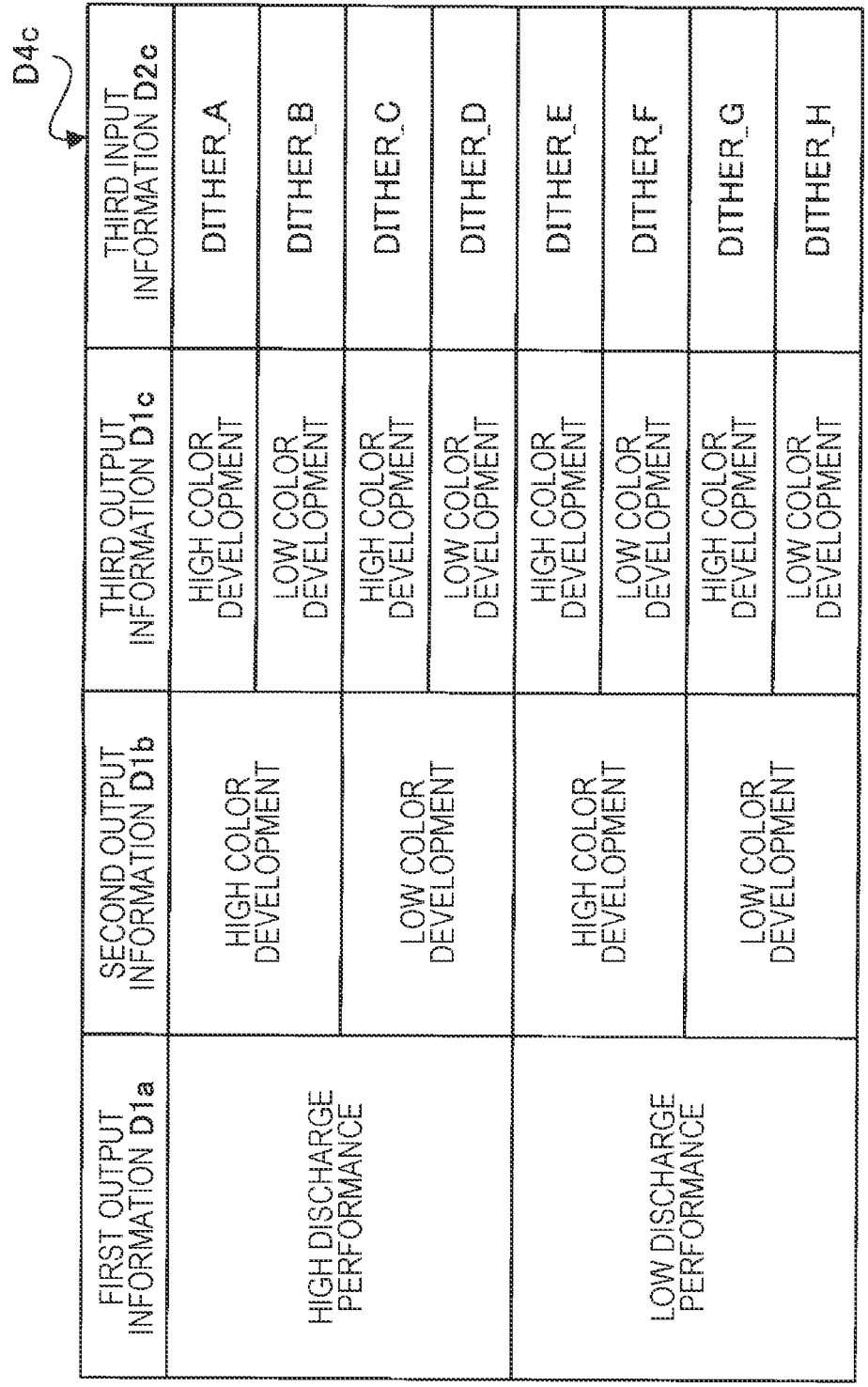
FIG. 12 is a table for describing information illustrating a correspondence relationship between the output information and third input information of the information included in the correspondence information.

FIG. 12 is a table for describing information D4$c$ illustrating a correspondence relationship between the output information D1 and the third input information D2$c$ of the information included in the correspondence information D4. The information D4$c$ is used when the third input information D2$c$ is adjusted based on the output information D1 in the above-described step S104. In FIG. 12, the correspondence relationship between the first output information D1$a$, the second output information D1$b$, the third output information D1$c$, and the third input information D2$c$ is exemplified. In FIG. 12, for convenience of description, the information D4$c$ is illustrated in a simplified manner, and in reality, the information D4$c$ is different from the example illustrated in FIG. 12 depending on the situation of the assumed printer manufacturer and the like.

In FIG. 12, the description in the first to third columns from the left is the same as that in FIG. 8 described above. In FIG. 12, each of "DITHER_A" to "DITHER_H" in the fourth column from the left is a dither pattern that defines a threshold value for converting the gradation value of a pixel group configured to include a plurality of pixels into the gradation value of each of the plurality of pixels for each of the plurality of pixels. Details of these dither patterns will be described later with reference to FIG. 13, using the dither patterns DITHER_A, DITHER_B, DITHER_C, and DITHER_E as examples.

In step S104 described above, the calculation portion 353 of the server 300 generates the third input information D2$c$ by selecting one of the dither patterns DITHER_A to DITHER_H using the information D4$c$ as illustrated in FIG. 12 based on the first output information D1$a$, the second output information D1$b$, and the third output information D1$c$ from the second input portion 352.

Specifically, when the discharge characteristic indicated by the first output information D1$a$ is "high discharge performance", the color development property indicated by the second output information D1$b$ is "high color development", and the color development property indicated by the third output information D1$c$ is "high color development", the dither pattern DITHER_A is selected. When the discharge characteristic indicated by the first output information D1$a$ is "high discharge performance", the color development property indicated by the second output information D1$b$ is "high color development", and the color development property indicated by the third output information D1$c$ is "low color development", the dither pattern DITHER_B is selected. When the discharge characteristic indicated by the first output information D1$a$ is "high discharge performance", the color development property indicated by the second output information D1$b$ is "low color development", and the color development property indicated by the third output information D1$c$ is "high color development", the dither pattern DITHER_C is selected. When the discharge characteristic indicated by the first output information D1$a$ is "high discharge performance", the color development property indicated by the second output information D1$b$ is "low color development", and the color development property indicated by the third output information D1c is "low color development", the dither pattern DITHER_D is selected. When the discharge characteristic indicated by the first output information D1a is "low discharge performance", the color development property indicated by the second output information D1b is "high color development", and the color development property indicated by the third output information D1c is "high color development", the dither pattern DITHER_E is selected. When the discharge characteristic indicated by the first output information D1a is "low discharge performance", the color development property indicated by the second output information D1b is "high color development", and the color development property indicated by the third output information D1c is "low color development", the dither pattern DITHER_F is selected. When the discharge characteristic indicated by the first output information D1a is "low discharge performance", the color development property indicated by the second output information D1b is "low color development", and the color development property indicated by the third output information D1c is "high color development", the dither pattern DITHER_G is selected. When the discharge characteristic indicated by the first output information D1a is "low discharge performance", the color development property indicated by the second output information D1b is "low color development", and the color development property indicated by the third output information D1c is "low color development", the dither pattern DITHER_H is selected.

Figure 13:
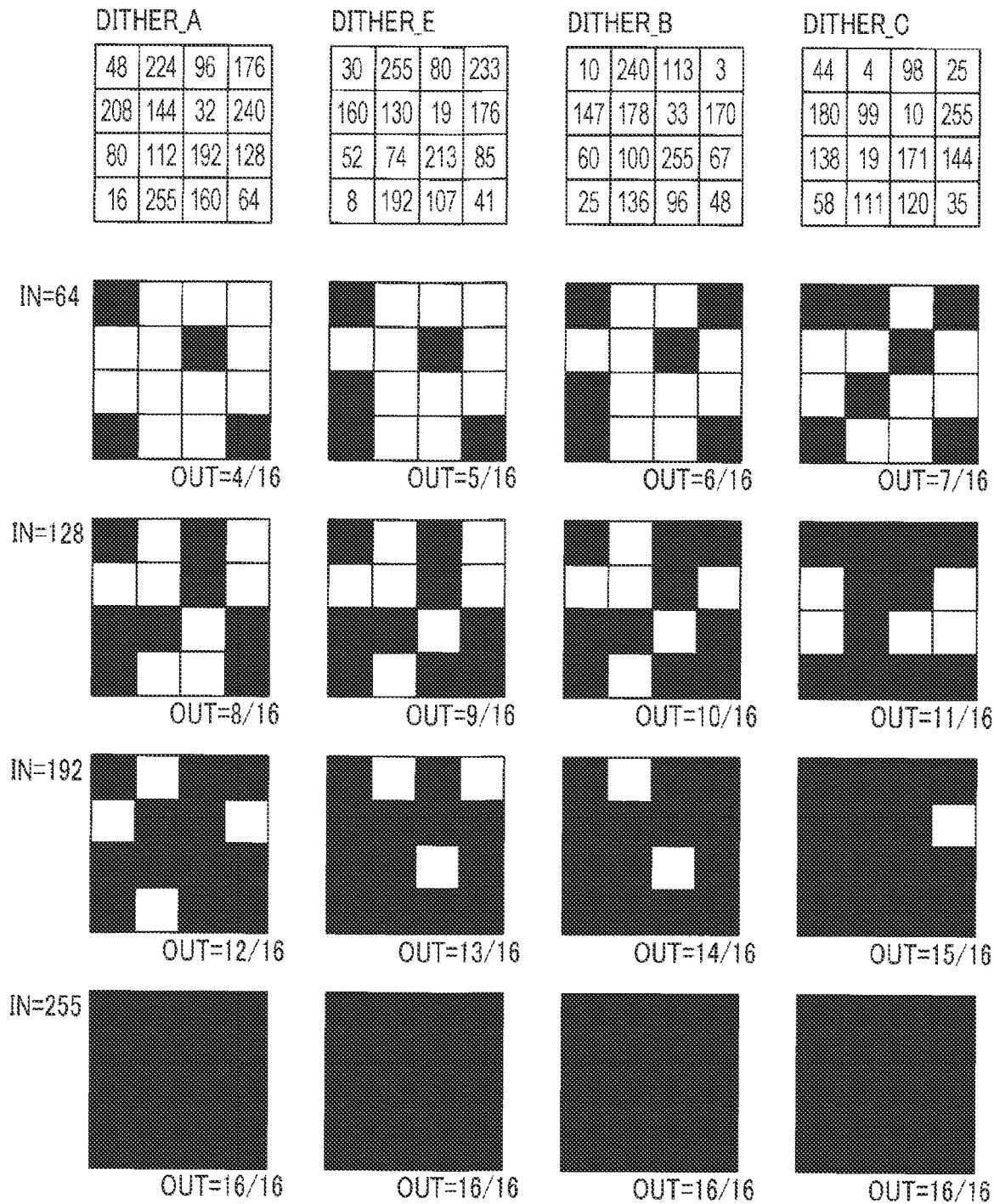
FIG. 13 is a diagram illustrating an example of a dither pattern used for the third input information.

FIG. 13 is a diagram illustrating an example of dither patterns DITHER_A, DITHER_B, DITHER_C, and DITHER_E used for the third input information D2c. In FIG. 13, the relationship between the input value (IN) and the output value (OUT) is exemplified for each of the dither patterns DITHER_A, DITHER_B, DITHER_C, and DITHER_E. The output value corresponds to a threshold value for converting the gradation value of a pixel group configured to include a plurality of pixels into the gradation value of each of the plurality of pixels. In FIG. 13, for convenience of description, a case where the input values are 64, 128, 192, and 255 is typically illustrated. In addition, in FIG. 13, for convenience of description, the case where the quantization is binarization is exemplified, but quantization of ternary or more may be used.

When the dither pattern DITHER_E is selected, as described above, compared with the case where the dither pattern DITHER_A is selected, the color development property indicated by the second output information D1b and the color development property indicated by the third output information D1c are the same as each other, but the discharge characteristics indicated by the first output information D1a are different from each other. Specifically, the discharge characteristic indicated by the first output information D1a when the dither pattern DITHER_A is selected is higher than the discharge characteristic indicated by the first output information D1a when the dither pattern DITHER_E is selected. Here, the dither pattern DITHER_E is an example of the "first dither pattern", and the dither pattern DITHER_A is an example of the "second dither pattern". In addition, the discharge characteristic indicated by the first output information D1a when the dither pattern DITHER_A is selected is an example of the "first discharge characteristic", and the discharge characteristic indicated by the first output information D1a when the dither pattern DITHER_E is selected is an example of the "second discharge characteristic".

In such dither pattern DITHER_A and dither pattern DITHER_E, when the input values are equal to each other, the output value by the dither pattern DITHER_A is smaller than the output value by the dither pattern DITHER_E. For example, when the input value is 128, the output value by the dither pattern DITHER_E is 9/16, while the output value by the dither pattern DITHER_A is 8/16. As can be understood from the above, the third input information D2c can be generated so as to reduce the fluctuation of the image quality due to the difference in the discharge characteristics.

When the dither pattern DITHER_C is selected, as described above, compared with the case where the dither pattern DITHER_A is selected, the discharge characteristic indicated by the first output information D1a and the color development property indicated by the third output information D1c are the same as each other, but the color development properties indicated by the second output information D1b are different from each other. Specifically, the color development property of the second output information D1b when the dither pattern DITHER_A is selected is higher than the color development property of the second output information D1b when the dither pattern DITHER_C is selected. Here, the dither pattern DITHER_C is an example of the "third dither pattern", and the dither pattern DITHER_A is an example of the "fourth dither pattern". In addition, the color development property indicated by the second output information D1b when the dither pattern DITHER_A is selected is an example of the "first color development property", and the color development property indicated by the second output information D1b when the dither pattern DITHER_C is selected is an example of the "second color development property".

In such dither pattern DITHER_A and dither pattern DITHER_C, when the input values are equal to each other, the output value by the dither pattern DITHER_A is smaller than the output value by the dither pattern DITHER_C. For example, when the input value is 128, the output value by the dither pattern DITHER_C is 11/16, while the output value by the dither pattern DITHER_A is 8/16. As can be understood from the above, the third input information D2c can be generated so as to reduce the fluctuation of the image quality due to the difference in the color development property of the ink.

When the dither pattern DITHER_B is selected, as described above, compared with the case where the dither pattern DITHER_A is selected, the discharge characteristic indicated by the first output information D1a and the color development property indicated by the second output information D1b are the same as each other, but the color development properties indicated by the third output information D1c are different from each other. Specifically, the color development property of the third output information D1c when the dither pattern DITHER_A is selected is higher than the color development property of the third output information D1c when the dither pattern DITHER_B is selected. Here, the dither pattern DITHER_B is an example of the "fifth dither pattern", and the dither pattern DITHER_A is an example of the "sixth dither pattern". In addition, the color development property indicated by the third output information D1c when the dither pattern DITHER_A is selected is an example of the "third color development property", and the color development property indicated by the third output information D1c when the dither pattern DITHER_B is selected is an example of the "fourth color development property".

In such dither pattern DITHER_A and dither pattern DITHER_B, when the input values are equal to each other, the output value by the dither pattern DITHER_A is smaller than the output value by the dither pattern DITHER_B. For example, when the input value is 128, the output value by the dither pattern DITHER_B is 10/16, while the output value by the dither pattern DITHER_A is 8/16. As can be understood from the above, the third input information D2c can be generated so as to reduce the fluctuation of the image quality due to the difference in the color development property of the medium.

In general, the influence of the color development property of ink on the image quality is larger than the discharge characteristic or the color development property of medium. Therefore, in the dither pattern DITHER_B, the dither pattern DITHER_C, and the dither pattern DITHER_E, when the input values are equal to each other, the output value by the dither pattern DITHER_C is larger than the output value by the dither pattern DITHER_B or the dither pattern DITHER_E.

1-7d. Adjustment of Fourth Input Information D2d

Example 4

As Example 4 of the first embodiment, a case where the mask pattern MASK is varied according to the first output information D1a, the second output information D1b, and the third output information D1c will be described below.

FIG. 14 is a table for describing information D4d illustrating a correspondence relationship between the output information D1 and the fourth input information D2d of the information included in the correspondence information D4. The information D4d is used when the fourth input information D2d is adjusted based on the output information D1 in the above-described step S104. In FIG. 14, the correspondence relationship between the first output information D1a, the second output information D1b, the third output information D1c, and the fourth input information D2d is exemplified. In FIG. 14, for convenience of description, the information D4d is illustrated in a simplified manner, and in reality, the information D4d is different from the example illustrated in FIG. 14 depending on the situation of the assumed printer manufacturer and the like.

In FIG. 14, the description in the first to third columns from the left is the same as in FIG. 8 described above. In FIG. 14, each of "MASK_A" to "MASK_H" in the fourth column from the left is a mask pattern that defines whether or not to distribute the quantization data to each of a plurality of scans. Details of these mask patterns will be described later with reference to FIG. 15, using the mask patterns MASK_A, MASK_B, MASK_C, and MASK_E as examples.

In step S104 described above, the calculation portion 353 of the server 300 generates the fourth input information D2d by selecting one of the mask patterns MASK_A to MASK_H using the information D4d as illustrated in FIG. 14 based on the first output information D1a, the second output information D1b, and the third output information D1c from the second input portion 352.

Specifically, when the discharge characteristic indicated by the first output information D1a is "high discharge performance", the color development property indicated by the second output information D1b is "high color development", and the color development property indicated by the third output information D1c is "high color development", the mask pattern MASK_A is selected. When the discharge characteristic indicated by the first output information D1a is "high discharge performance", the color development property indicated by the second output information D1b is "high color development", and the color development property indicated by the third output information D1c is "low color development", the mask pattern MASK_B is selected. When the discharge characteristic indicated by the first output information D1a is "high discharge performance", the color development property indicated by the second output information D1b is "low color development", and the color development property indicated by the third output information D1c is "high color development", the mask pattern MASK_C is selected. When the discharge characteristic indicated by the first output information D1a is "high discharge performance", the color development property indicated by the second output information D1b is "low color development", and the color development property indicated by the third output information D1c is "low color development", the mask pattern MASK_D is selected. When the discharge characteristic indicated by the first output information D1a is "low discharge performance", the color development property indicated by the second output information D1b is "high color development", and the color development property indicated by the third output information D1c is "high color development", the mask pattern MASK_E is selected. When the discharge characteristic indicated by the first output information D1a is "low discharge performance", the color development property indicated by the second output information D1b is "high color development", and the color development property indicated by the third output information D1c is "low color development", the mask pattern MASK_F is selected. When the discharge characteristic indicated by the first output information D1a is "low discharge performance", the color development property indicated by the second output information D1b is "low color development", and the color development property indicated by the third output information D1c is "high color development", the mask pattern MASK_G is selected. When the discharge characteristic indicated by the first output information D1a is "low discharge performance", the color development property indicated by the second output information D1b is "low color development", and the color development property indicated by the third output information D1c is "low color development", the mask pattern MASK_H is selected.

Figure 15:
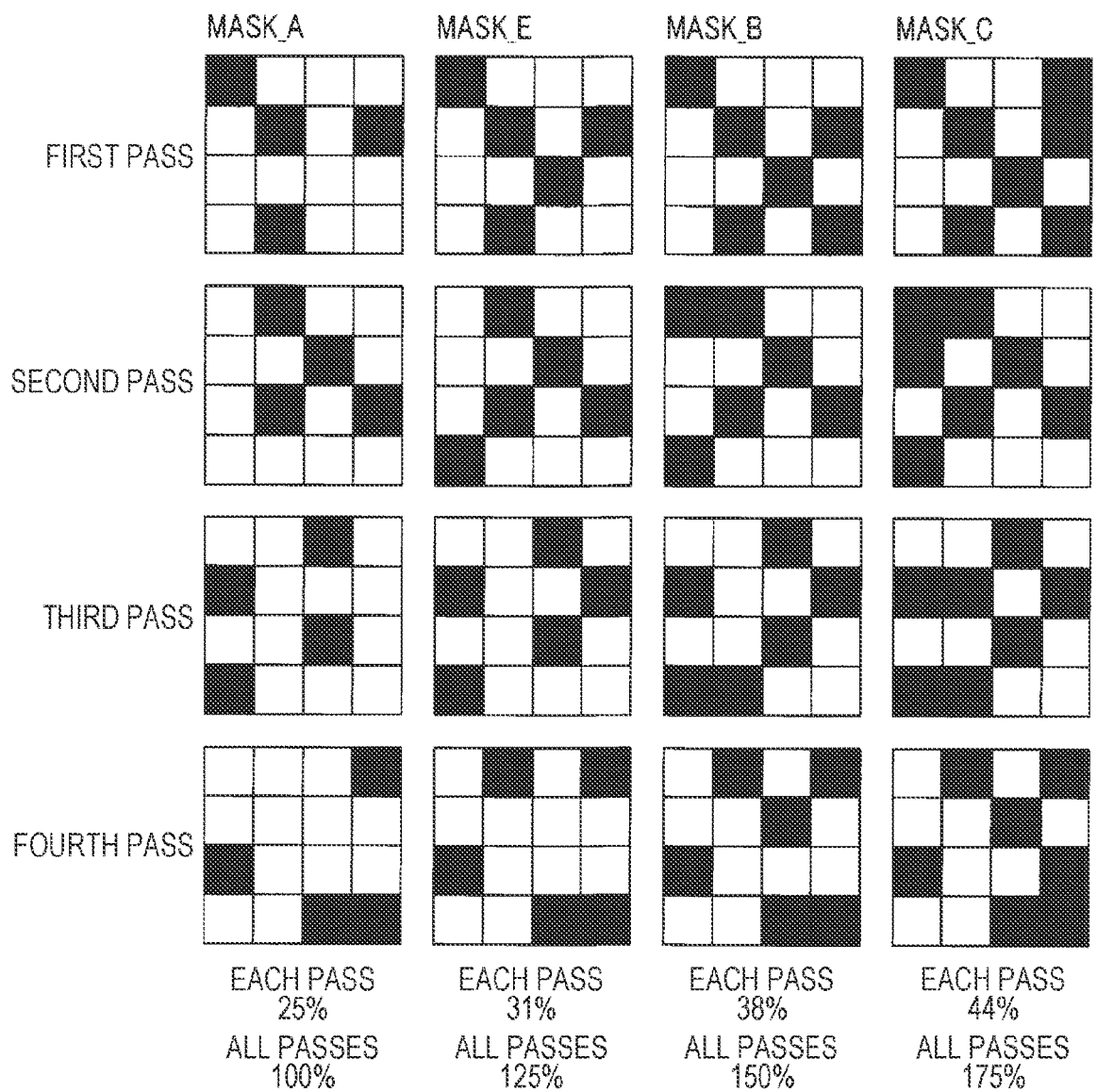
FIG. 15 is a diagram illustrating an example of a mask pattern used for the fourth input information.

FIG. 15 is a diagram illustrating an example of mask patterns MASK_A, MASK_B, MASK_C, and MASK_E used for the fourth input information D2d. In FIG. 15, a mask shape when the number of times of scanning (number of passes) is four for each of the mask patterns MASK_A, MASK_B, MASK_C, and MASK_E is exemplified. Here, the mask shape is configured to include 16 pixels, and in FIG. 15, the pixels that allow ink discharge are illustrated as black pixels, and the pixels that do not allow ink discharge are illustrated as white pixels. The number of passes is not limited to four, and may be three or less, or may be five or more.

When the mask pattern MASK_E is selected, as described above, compared with the case where the mask pattern MASK_A is selected, the color development property indicated by the second output information D1b and the color development property indicated by the third output information D1c are the same as each other, but the discharge characteristics indicated by the first output information D1a are different from each other. Specifically, the discharge characteristic indicated by the first output information D1a when the mask pattern MASK_A is selected is higher than the discharge characteristic indicated by the first output information D1a when the mask pattern MASK_E is selected. Here, the mask pattern MASK_E is an example of the "first mask pattern", and the mask pattern MASK_A is an example of the "second mask pattern". In addition, the discharge characteristic indicated by the first output information D1a when the mask pattern MASK_A is selected is an example of the "first discharge characteristic", and the discharge characteristic indicated by the first output information D1a when the mask pattern MASK_E is selected is an example of the "second discharge characteristic".

In such mask pattern MASK_A and mask pattern MASK_E, when the gradation values indicated by the quantization data are equal to each other, a sum of distribution ratios by the mask pattern MASK_A is smaller than a sum of distribution ratios by the mask pattern MASK_E. For example, when the gradation value indicated by the quantization data is 255, that is, when the quantization data indicates a solid image, a sum of distribution ratios by the mask pattern MASK_E is 125%, whereas a sum of distribution ratios by the mask pattern MASK_A is 100%. As can be understood from the above, the fourth input information D2d can be generated so as to reduce the fluctuation of the image quality due to the difference in the discharge characteristics.

When the mask pattern MASK_C is selected, as described above, compared with the case where the mask pattern MASK_A is selected, the discharge characteristic indicated by the first output information D1a and the color development property indicated by the third output information D1c are the same as each other, but the color development properties indicated by the second output information D1b are different from each other. Specifically, the color development property of the second output information D1b when the mask pattern MASK_A is selected is higher than the color development property indicated by the second output information D1b when the mask pattern MASK_C is selected. Here, the mask pattern MASK_C is an example of the "third mask pattern", and the mask pattern MASK_A is an example of the "fourth mask pattern". In addition, the color development property indicated by the second output information D1b when the mask pattern MASK_A is selected is an example of the "first color development property", and the color development property indicated by the second output information D1b when the mask pattern MASK_C is selected is an example of the "second color development property".

In such mask pattern MASK_A and mask pattern MASK_C, when the gradation values indicated by the quantization data are equal to each other, a sum of distribution ratios by the mask pattern MASK_A is smaller than a sum of distribution ratios by the mask pattern MASK_C. For example, when the gradation value indicated by the quantization data is 255, that is, when the quantization data indicates a solid image, a sum of distribution ratios by the mask pattern MASK_C is 175%, whereas a sum of distribution ratios by the mask pattern MASK_A is 100%. As can be understood from the above, the fourth input information D2d can be generated so as to reduce the fluctuation of the image quality due to the difference in the color development property of the ink.

When the mask pattern MASK_B is selected, as described above, compared with the case where the mask pattern MASK_A is selected, the discharge characteristic indicated by the first output information D1a and the color development property indicated by the second output information D1b are the same as each other, but the color development properties indicated by the third output information D1c are different from each other. Specifically, the color development property of the third output information D1c when the mask pattern MASK_A is selected is higher than the color development property indicated by the third output information D1c when the mask pattern MASK_B is selected. Here, the mask pattern MASK_B is an example of the "fifth mask pattern", and the mask pattern MASK_A is an example of the "sixth mask pattern". In addition, the color development property indicated by the third output information D1c when the mask pattern MASK_A is selected is an example of the "third color development property", and the color development property indicated by the third output information D1c when the mask pattern MASK_B is selected is an example of the "fourth color development property".

In such mask pattern MASK_A and mask pattern MASK_B, when the gradation values indicated by the quantization data are equal to each other, a sum of distribution ratios by the mask pattern MASK_A is smaller than a sum of distribution ratios by the mask pattern MASK_B. For example, when the gradation value indicated by the quantization data is 255, that is, when the quantization data indicates a solid image, a sum of distribution ratios by the mask pattern MASK_B is 150%, whereas a sum of distribution ratios by the mask pattern MASK_A is 100%. As can be understood from the above, the fourth input information D2d can be generated so as to reduce the fluctuation of the image quality due to the difference in the color development property of the medium.

In general, the influence of the color development property of ink on the image quality is larger than the discharge characteristic or the color development property of medium. Therefore, in the mask pattern MASK_B, the mask pattern MASK_C, and the mask pattern MASK_E, when the gradation values indicated by the quantization data are equal to each other, a sum of distribution ratios by the mask pattern MASK_C is greater than a sum of distribution ratios by the mask pattern MASK_B or the mask pattern MASK_E.

1-8. Summary of First Embodiment

As described above, the ink jet system 10 includes the head unit 110, the acquisition portion 251, the first output portion 252, the first input portion 253, and the determination portion 254. The head unit 110 includes the nozzle N for discharging ink, the pressure chamber C communicating with the nozzle N, and the drive element 111f for applying pressure fluctuation to the ink in the pressure chamber C by supplying the drive pulse PD. The acquisition portion 251 acquires the output information D1 including one or both of the first output information D1a regarding the head unit 110 and the second output information D1b regarding the ink used for the head unit 110. The first coupling portion 231 is communicably network-coupled to the server 300. The first output portion 252 outputs the output information D1 toward the server 300 via the first coupling portion 231. The input information D2 is input to the first input portion 253 from the server 300 via the first coupling portion 231. The determination portion 254 determines the content of the image processing S10 for the image data D1 based on the input information D2.

In the above ink jet system 10, since the first output portion 252 outputs the output information D1 toward the server 300 via the first coupling portion 231, the output information D1 can be provided to the head manufacturer. Therefore, by utilizing the knowledge of the head manufacturer in addition to the output information D1, the input information D2 can be efficiently obtained as the information necessary for determining the content of the image processing S10 for obtaining the recorded data. Since the determination portion 254 determines the content of the image processing S10 for the image data D1 based on the input information D2 input from the server 300 to the first input portion 253 via the first coupling portion 231, the content of the image processing S10 can be determined while reducing the burden on the printer manufacturer.

In the present embodiment, the output information D1 includes the first output information D1a which is information regarding the discharge characteristic of the head unit 110, the second output information D1b which is information regarding the color development property of the ink, and the third output information D1c regarding the color development property of the medium printed by the ink discharged from the head unit 110. The output information D1 may include one or both of the first output information D1a and the second output information D1b, and may not include the third output information D1c.

In the present embodiment, in each of Examples 1 to 4, although the case where any one of the color conversion table LUT, the density correction table GANMA, the dither pattern DITHER, and the mask pattern MASK is varied according to the first output information D1a, the second output information D1b, and the third output information D1c is described, a plurality of Examples 1 to 4 may be combined. For example, the two combinations of the color conversion table LUT and the density correction table GANMA may be varied according to the first output information D1a, the second output information D1b, and the third output information D1c. In addition, for example, the four combinations of the color conversion table LUT, the density correction table GANMA, the dither pattern DITHER, and the mask pattern MASK may be varied according to the first output information D1a, the second output information D1b, and the third output information D1c.

As described above, the image processing S10 includes the color conversion processing S11 that converts the image data D1 indicated by the luminance value into the ink color data indicated by the density value for each ink color. The input information D2 includes the first input information D2a used for the color conversion processing S11. Here, the first input information D2a is information regarding the color conversion table that defines the correspondence relationship between the luminance value and the density value. Therefore, the fluctuation of the image quality can be reduced by the color conversion processing S11 based on the first input information D2a.

In addition, as described above, when the color conversion table in the case where the discharge characteristic indicated by the first output information D1a is the first discharge characteristic is set as the first color conversion table, and the color conversion table in the case where the discharge characteristic indicated by the first output information D1a is the second discharge characteristic higher than the first discharge characteristic is set as the second color conversion table, in a case in which the input values input to the first color conversion table and the second color conversion table as the luminance values are equal to each other, it is preferable that the output value output as the density value by the second color conversion table is smaller than the output value output as the density value by the first color conversion table. In this case, it is possible to reduce the fluctuation of the image quality due to the difference in discharge characteristics.

Furthermore, as described above, when the color conversion table in the case where the color development property indicated by the second output information D1b is the first color development property is set as the third color conversion table, and the color conversion table in the case where the color development property indicated by the second output information D1b is the second color development property higher than the first color development property is set as the fourth color conversion table, in a case in which the input values input to the third color conversion table and the fourth color conversion table as the luminance values are equal to each other, it is preferable that the output value output as the density value by the fourth color conversion table is smaller than the output value output as the density value by the third color conversion table. In this case, it is possible to reduce the fluctuation of the image quality due to the difference in the color development property of the ink.

In addition, as described above, when the color conversion table in the case where the color development property indicated by the third output information D1c is the third color development property is set as the fifth color conversion table, and the color conversion table in the case where the color development property indicated by the third output information D1c is the fourth color development property higher than the third color development property is set as the sixth color conversion table, in a case in which the input values input to the fifth color conversion table and the sixth color conversion table as the luminance values are equal to each other, it is preferable that the output value output as the density value by the sixth color conversion table is smaller than the output value output as the density value by the fifth color conversion table. In this case, it is possible to reduce fluctuation of the image quality due to difference in the color development property of the medium.

As described above, the image processing S10 includes the density correction processing S12 of correcting the density of the ink color data indicated by the density value for each ink color. The input information D2 includes the second input information D2b used for the density correction processing S12. Here, the second input information D2b is information regarding the density correction table that defines the correspondence relationship between before and after correction of the density value. Therefore, the fluctuation of the image quality can be reduced by the density correction processing S12 based on the second input information D2b.

In addition, as described above, when the density correction table in the case where the discharge characteristic indicated by the first output information D1a is the first discharge characteristic is set as the first density correction table, and the density correction table in the case where the discharge characteristic indicated by the first output information D1a is the second discharge characteristic higher than the first discharge characteristic is set as the second density correction table, in a case in which the input values input to the first density correction table and the second density correction table as the density values before correction are equal to each other, it is preferable that the output value output as the density value after correction by the second density correction table is smaller than the output value output as the density value after correction by the first density correction table. In this case, it is possible to reduce the fluctuation of the image quality due to the difference in discharge characteristics.

In addition, as described above, when the density correction table in the case where the color development property indicated by the second output information D1b is the first color development property is set as the third density correction table, and the density correction table in the case where the color development property indicated by the second output information D1$b$ is the second color development property higher than the first color development property is set as the fourth density correction table, in a case in which the input values input to the third density correction table and the fourth density correction table as the density values before correction are equal to each other, it is preferable that the output value output as the density value after correction by the fourth density correction table is smaller than the output value output as the density value after correction by the third density correction table. In this case, it is possible to reduce the fluctuation of the image quality due to the difference in the color development property of the ink.

In addition, as described above, when the density correction table in the case where the color development property indicated by the third output information D1$c$ is the third color development property is set as the fifth density correction table, and the density correction table in the case where the color development property indicated by the third output information D1$c$ is the fourth color development property higher than the third color development property is set as the sixth density correction table, in a case in which the input values input to the fifth density correction table and the sixth density correction table as the density values before correction are equal to each other, it is preferable that the output value output as the density value after correction by the sixth density correction table is smaller than the output value output as the density value after correction by the fifth density correction table. In this case, it is possible to reduce fluctuation of the image quality due to difference in the color development property of the medium.

As described above, the image processing S10 includes the quantization processing S13 that generates the quantization data by quantizing the ink color data indicated by the density value for each ink color. The ink color data is N value data indicating the gradation value of the pixel group configured to include the plurality of pixels, N being a natural number. The quantization data is M value data indicating the gradation value of each of the plurality of pixels, M being a natural number satisfying 2≤M<N. The input information D2 includes the third input information D2$c$ used in the quantization processing S13. Here, the third input information D2$c$ is information regarding a dither pattern that defines a threshold value for converting the gradation value of the pixel group into the gradation value of each of the plurality of pixels for each of the plurality of pixels. Therefore, the fluctuation of the image quality can be reduced by the quantization processing based on the third input information D2$c$.

In addition, as described above, when the dither pattern in the case where the discharge characteristic indicated by the first output information D1$a$ is the first discharge characteristic is set as the first dither pattern, and the dither pattern in the case where the discharge characteristic indicated by the first output information D1$a$ is the second discharge characteristic higher than the first discharge characteristic is set as the second dither pattern, in a case in which the gradation values of the pixel groups indicated by the ink color data used for the first dither pattern and the second dither pattern are equal to each other, it is preferable that a sum of the gradation values of each of the plurality of pixels indicated by the quantization data generated by the second dither pattern is smaller than a sum of the gradation values of each of the plurality of pixels indicated by the quantization data generated by the first dither pattern. In this case, it is possible to reduce the fluctuation of the image quality due to the difference in discharge characteristics.

Furthermore, as described above, when the dither pattern in the case where the color development property indicated by the second output information D1$b$ is the first color development property is set as the third dither pattern, and the dither pattern in the case where the color development property indicated by the second output information D1$b$ is the second color development property higher than the first color development property is set as the fourth dither pattern, in a case in which the gradation values of the pixel groups indicated by the ink color data used for the third dither pattern and the fourth dither pattern are equal to each other, it is preferable that a sum of the gradation values of each of the plurality of pixels indicated by the quantization data generated by the fourth dither pattern is smaller than a sum of the gradation values of each of the plurality of pixels indicated by the quantization data generated by the third dither pattern. In this case, it is possible to reduce the fluctuation of the image quality due to the difference in the color development property of the ink.

In addition, as described above, when the dither pattern in the case where the color development property indicated by the third output information D1$c$ is the third color development property is set as the fifth dither pattern, and the dither pattern in the case where the color development property indicated by the third output information D1$c$ is the fourth color development property higher than the third color development property is set as the sixth dither pattern, in a case in which the gradation values of the pixel groups indicated by the ink color data used for the fifth dither pattern and the sixth dither pattern are equal to each other, it is preferable that a sum of the gradation values of each of the plurality of pixels indicated by the quantization data generated by the sixth dither pattern is smaller than a sum of the gradation values of each of the plurality of pixels indicated by the quantization data generated by the fifth dither pattern. In this case, it is possible to reduce fluctuation of the image quality due to difference in the color development property of the medium.

As described above, when the head unit 110 distributes the ink to the unit region on the medium in a plurality of scans and discharges the ink to record an image on the unit region, the image processing S10 includes the distribution processing S14 that generates the recorded data DP by distributing the quantization data to the plurality of scans. The input information D2 includes the fourth input information D2$d$ used for the distribution processing S14. Here, the fourth input information D2$d$ is information regarding the mask pattern that defines whether or not the quantization data is distributed to each of the plurality of scans. Therefore, the fluctuation of the image quality can be reduced by the distribution processing based on the fourth input information D2$d$.

In addition, as described above, when the mask pattern in the case where the discharge characteristic indicated by the first output information D1$a$ is the first discharge characteristic is set as the first mask pattern, and the mask pattern in the case where the discharge characteristic indicated by the first output information D1$a$ is the second discharge characteristic higher than the first discharge characteristic is set as the second mask pattern, in a case in which the gradation values indicated by the quantization data used for the first mask pattern and the second mask pattern are equal to each other, it is preferable that a sum of distribution ratios for each of the plurality of scans by the second mask pattern is smaller than a sum of distribution ratios for each of the plurality of scans by the first mask pattern. In this case, it is possible to reduce the fluctuation of the image quality due to the difference in discharge characteristics.

Furthermore, as described above, when the mask pattern in the case where the color development property indicated by the second output information D1$b$ is the first color development property is set as the third mask pattern, and the mask pattern in the case where the color development property indicated by the second output information D1$b$ is the second color development property higher than the first color development property is set as the fourth mask pattern, in a case in which the gradation values indicated by the quantization data used for the third mask pattern and the fourth mask pattern are equal to each other, it is preferable that a sum of distribution ratios for each of the plurality of scans by the fourth mask pattern is smaller than a sum of distribution ratios for each of the plurality of scans by the third mask pattern. In this case, it is possible to reduce the fluctuation of the image quality due to the difference in the color development property of the ink.

In addition, as described above, when the mask pattern in the case where the color development property indicated by the third output information D1$c$ is the third color development property is set as the fifth mask pattern, and the mask pattern in the case where the color development property indicated by the third output information D1$c$ is the fourth color development property higher than the third color development property is set as the sixth mask pattern, in a case in which the gradation values indicated by the quantization data used for the fifth mask pattern and the sixth mask pattern are equal to each other, it is preferable that a sum of distribution ratios for each of the plurality of scans by the sixth mask pattern is smaller than a sum of distribution ratios for each of the plurality of scans by the fifth mask pattern. In this case, it is possible to reduce fluctuation of the image quality due to difference in the color development property of the medium.

Furthermore, as described above, the ink jet system 10 further includes a reception portion 255 that receives an instruction by the user as to whether or not to execute the image processing S10 based on the input information D2. When the reception portion 255 receives an instruction to execute the image processing S10 based on the input information D2, the determination portion 254 determines to execute the image processing S10 based on the input information D2. On the other hand, when the reception portion receives an instruction not to execute the image processing S10 based on the input information D2, the determination portion 254 determines to execute another image processing S10 input by the user. As described above, by making the determination of the determination portion 254 based on the instruction received by the reception portion 255, the convenience of the printer manufacturer can be enhanced.

In addition, as described above, the ink jet system 10 includes the ink discharge device 100, the first processing device 200, and the server 300. The ink discharge device 100 is provided with the head unit 110. The first processing device 200 is coupled to the ink discharge device 100 and includes the display device 210 which is an example of a "display portion" that displays information regarding the ink discharge device 100. Therefore, printing based on the recorded data DP from the first processing device 200 can be performed by the ink discharge device 100. In addition, various information can be communicated between the ink discharge device 100 and the first processing device 200.

Furthermore, various information necessary for the user of the ink discharge device 100 can be notified via the display device 210.

Here, as described above, the server 300 includes the storage circuit 340, which is an example of a "storage portion", and the calculation portion 353. The storage circuit 340 stores in advance the correspondence information D4 regarding the correspondence relationship between the output information D1 and the image processing S10 to be executed. The calculation portion 353 performs a calculation to generate the input information D2 based on the output information D1 and the correspondence information D4. In such a configuration in which the input information D2 is generated using the correspondence information D4, the input information D2 can be rapidly generated.

2. Second Embodiment

Hereinafter, the second embodiment of the present disclosure will be described. For the elements whose actions or functions are the same as those of the first embodiment in the aspects exemplified below, the reference numerals used in the description of the first embodiment will be diverted and detailed description of each will be omitted as appropriate.

Figure 16:
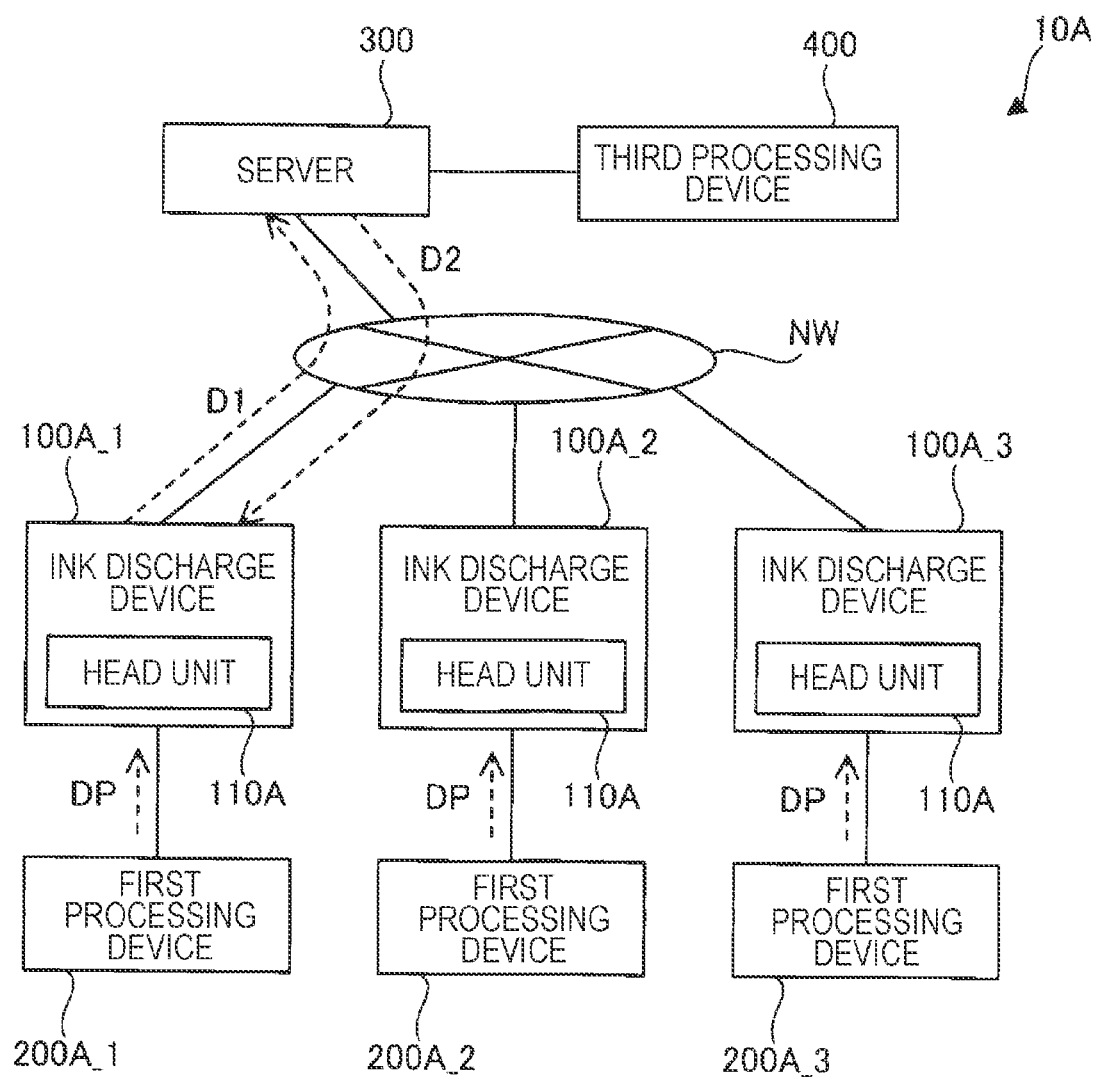
FIG. 16 is a schematic diagram illustrating a configuration example of an ink jet system according to a second embodiment.

FIG. 16 is a schematic diagram illustrating a configuration example of an ink jet system 10A according to a second embodiment. The ink jet system 10A is configured in the same manner as the above-described first embodiment except that the ink discharge devices 100A_1 to 100A_3 and the first processing devices 200A_1 to 200A_3 are provided in place of the ink discharge devices 100_1 to 100_3 and the first processing devices 200_1 to 200_3.

The ink discharge device 100A_1 is communicably coupled to the first processing device 200A_1 and is communicably coupled to the server 300 via the communication network NW. The ink discharge device 100A_2 is communicably coupled to the first processing device 200A_2 and is communicably coupled to the server 300 via the communication network NW. The ink discharge device 100A_3 is communicably coupled to the first processing device 200A_3 and is communicably coupled to the server 300 via the communication network NW. As described above, the ink discharge devices 100A_1 to 100A_3 correspond to each of the first processing devices 200A_1 to 200A_3, are communicably coupled to the first processing devices 200A_1 to 200A_3, and are communicably coupled to the server 300 via the communication network NW. In the following, each of the ink discharge devices 100A_1 to 100A_3 may be referred to as an ink discharge device 100A, without distinguishing the ink discharge devices 100A_1 to 100A_3. Each of the first processing devices 200A_1 to 200A_3 may be referred to as a first processing device 200A, without distinguishing the first processing devices 200A_1 to 200A_3.

In the example illustrated in FIG. 16, the number of each of the ink discharge device 100A and the first processing device 200A included in the ink jet system 10A is three, but the number is not limited thereto, and may be one, two, or four or more. That is, the set of the ink discharge device 100A and the first processing device 200A is not limited to three sets, and may be one set, two sets, or four sets or more.

The ink discharge device 100A is configured in the same manner as the ink discharge device 100 of the first embodiment described above, except that the head unit 110A is provided in place of the head unit 110. The head unit 110 is the same head unit 110 except that a function for determining the content of the image processing S10 is added. The details of the ink discharge device 100A will be described later with reference to FIG. 17.

The ink discharge device 100A outputs the output information D1 to the server 300 and inputs the input information D2 from the server 300. The ink discharge device 100A determines the content of the image processing S10 based on the input information D2.

The first processing device 200A is configured in the same manner as the first processing device 200 of the first embodiment described above, except that the function of determining the content of the image processing S10 is omitted.

Figure 17:
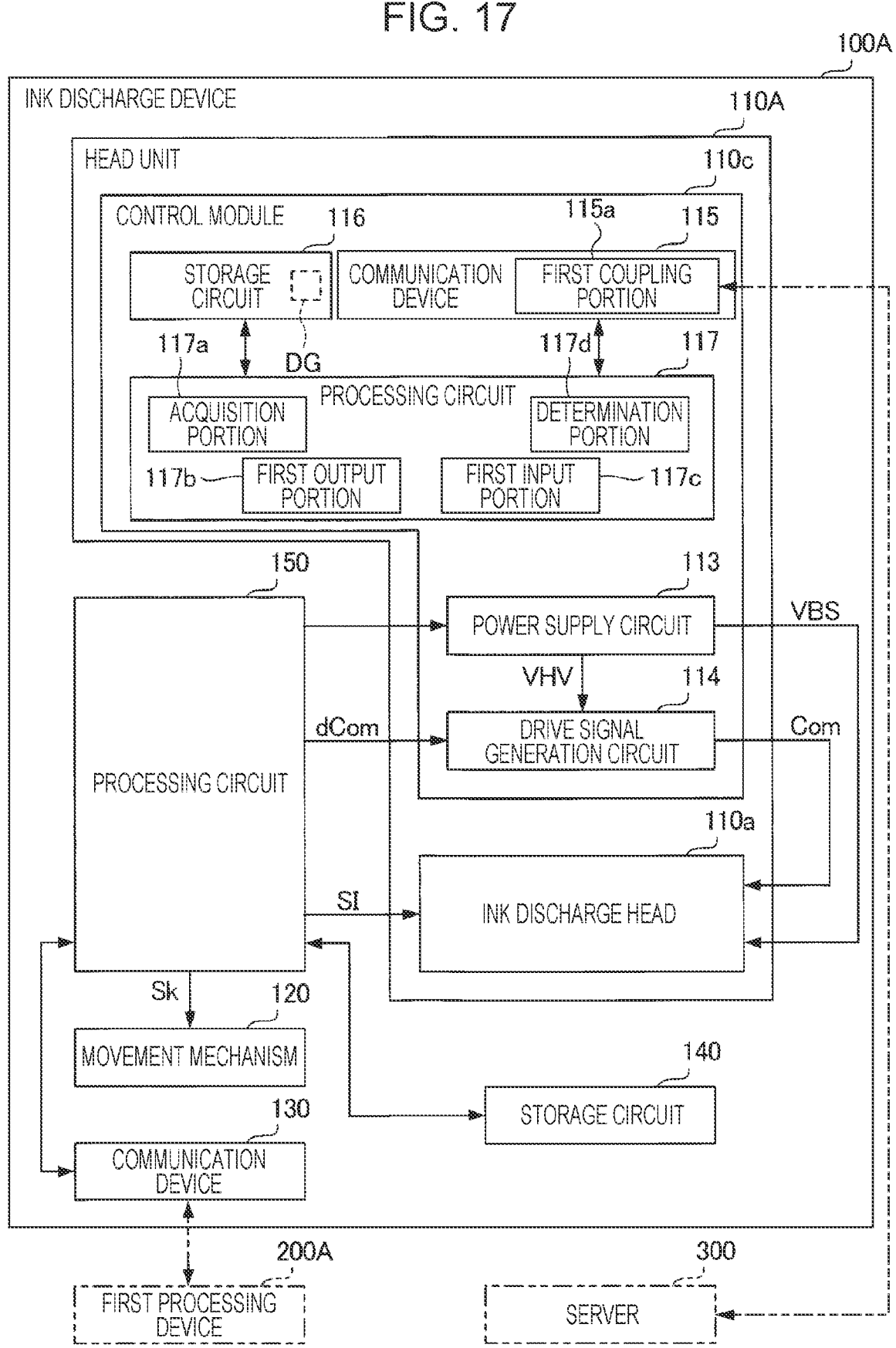
FIG. 17 is a schematic diagram illustrating a configuration example of an ink discharge device used in the ink jet system according to the second embodiment.

FIG. 17 is a schematic diagram illustrating a configuration example of the ink discharge device 100A used in the ink jet system 10A according to the second embodiment. As illustrated in FIG. 17, the head unit 110A included in the ink discharge device 100A is configured in the same manner as the head unit 110 of the first embodiment except that the control module 110c is provided in place of the control module 110b. The control module 110c is configured in the same manner as the control module 110b except that the communication device 115, the storage circuit 116, and the processing circuit 117 are added.

The communication device 115 is a circuit capable of communicating with the server 300. For example, the communication device 115 is an interface such as a wireless or wired LAN or USB. The communication device 115 transmits the output information D1 and receives the input information D2 by communicating with the server 300. That is, the communication device 115 functions as the first coupling portion 115a that is communicably coupled to the server 300, similar to the first coupling portion 231 of the first embodiment.

The storage circuit 116 is a device that stores various programs executed by the processing circuit 117 and various data processed by the processing circuit 117. The storage circuit 116 has, for example, a semiconductor memory.

The storage circuit 116 stores the same information DG as in FIG. 4 described above. That is, the program PG1, the output information D1, and the input information D2 are stored in the storage circuit 116.

The processing circuit 117 is a device having a function of controlling each part of the control module 110c and a function of processing various data. The processing circuit 117 includes, for example, one or more processors such as a CPU. The processing circuit 117 may be integrally configured with the storage circuit 116, and may be configured to include hardware such as a DSP, an ASIC, a PLD, or an FPGA, for example.

The processing circuit 117 functions as an acquisition portion 117a, a first output portion 117b, a first input portion 117c, and a determination portion 117d by reading the program PG1 from the storage circuit 116 and executing the program PG1.

The acquisition portion 117a acquires the output information D1, similarly to in the acquisition portion 251 of the first embodiment. The first output portion 117b outputs the output information D1 via the first coupling portion 115a, similarly to the first output portion 252 of the first embodiment. The input information D2 is input to the first input portion 117c via the first coupling portion 115a, similarly to the first input portion 253 of the first embodiment. The determination portion 117d determines the content of the image processing S10 based on the input information D2, similarly to the determination portion 254 of the first embodiment.

Figure 18:
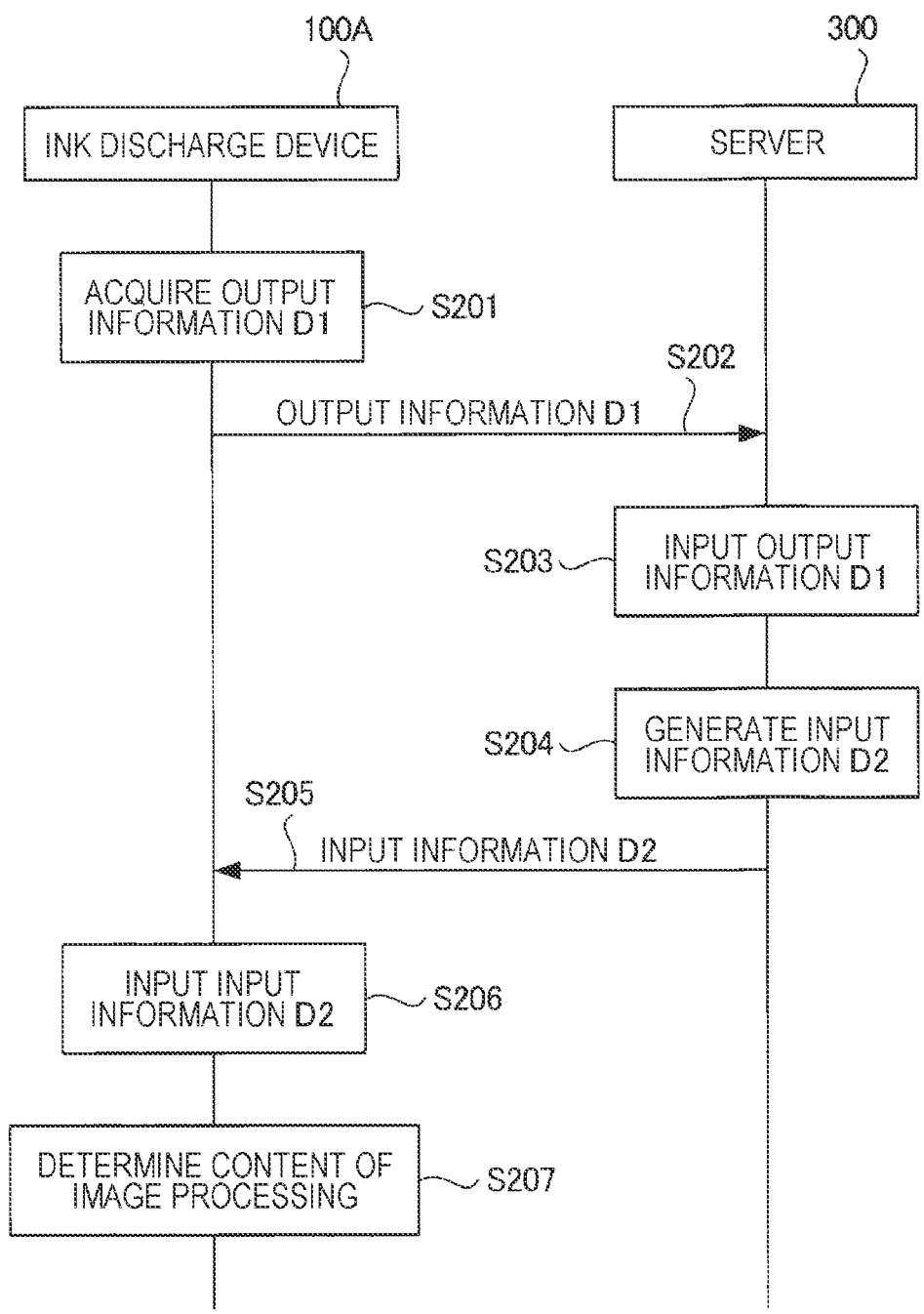
FIG. 18 is a flowchart illustrating processing of the ink jet system according to the second embodiment.

FIG. 18 is a flowchart illustrating the processing of the ink jet system 10A according to the second embodiment. In the ink jet system 10A, first, as illustrated in FIG. 18, in step S201, the ink discharge device 100A acquires the output information D1. In step S202, the ink discharge device 100A outputs the output information D1 to the server 300.

Next, in step S203, the server 300 inputs the output information D1. In step S204, the server 300 generates the input information D2 based on the output information D1. Thereafter, in step S205, the server 300 outputs the input information D2 to the ink discharge device 100A.

Next, in step S206, the ink discharge device 100A inputs the input information D2. In step S207, the ink discharge device 100A determines the content of the image processing S10 based on the input information D2.

According to the second embodiment as described above, the content of the image processing S10 can be determined while reducing the burden on the printer manufacturer, similarly to the first embodiment. In the present embodiment, as described above, each of the first input portion 117c and the first coupling portion 115a is provided in the ink discharge device 100A. Therefore, the input information D2 from the server 300 can be input to the ink discharge device 100A. Therefore, by providing the determination portion 117d in the ink discharge device 100A, the information regarding the content of the image processing S10 determined by the determination portion 117d can be used in the ink discharge device 100A. In addition, since it is not necessary to incorporate the program for determining the content of the image processing S10 into the first processing device 200A, the burden on the manufacturer or the user of the printer main body can be reduced in this respect as well.

3. Third Embodiment

Hereinafter, the third embodiment of the present disclosure will be described. For the elements whose actions or functions are the same as those of the first embodiment in the aspects exemplified below, the reference numerals used in the description of the first embodiment will be diverted and detailed description of each will be omitted as appropriate.

Figure 19:
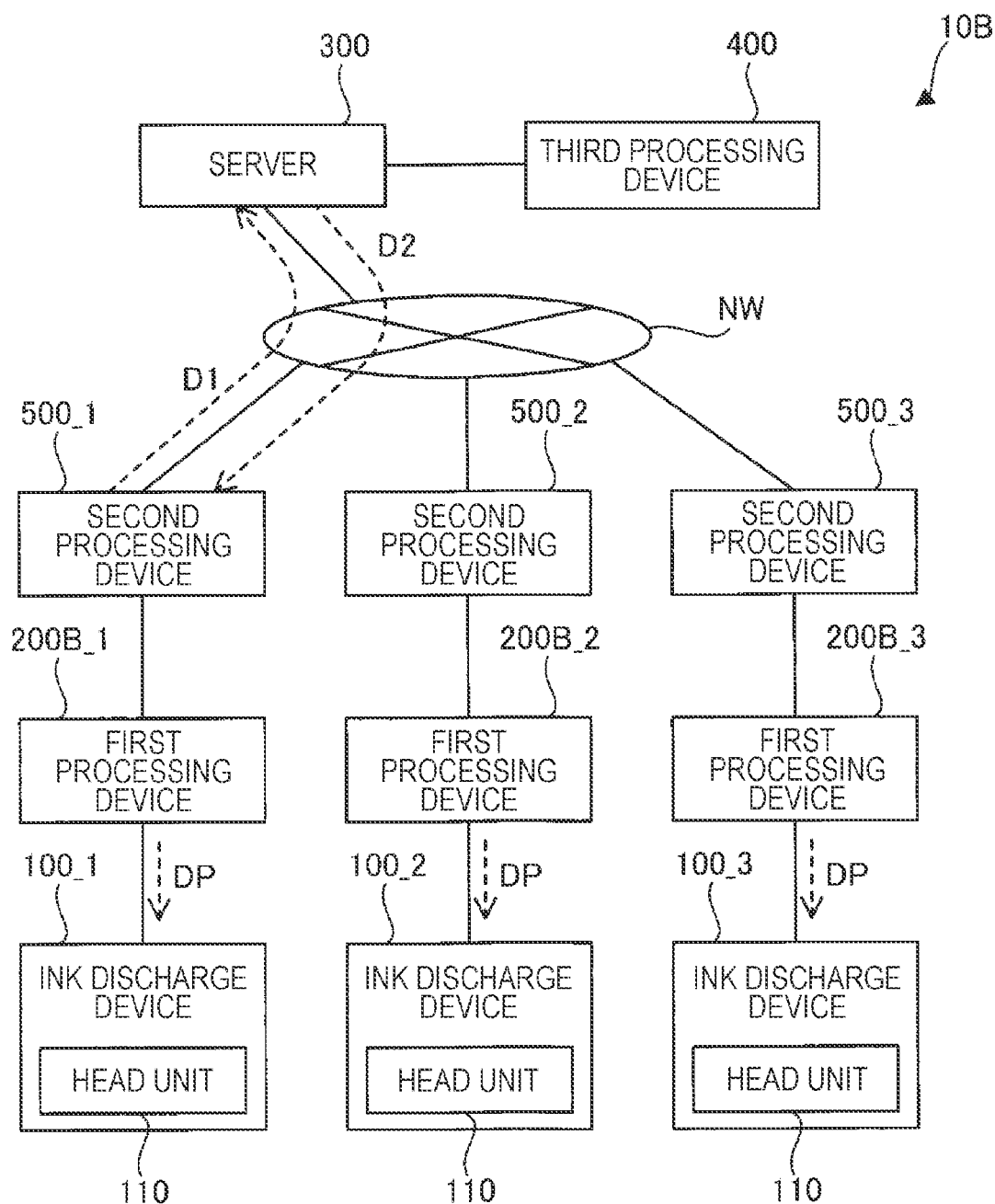
FIG. 19 is a schematic diagram illustrating a configuration example of an ink jet system according to a third embodiment.

FIG. 19 is a schematic diagram illustrating a configuration example of an ink jet system 10B according to a third embodiment. The ink jet system 10B is configured in the same manner as the above-described first embodiment except that the first processing devices 200B_1 to 200B_3 are provided in place of the first processing devices 200_1 to 200_3 and the second processing devices 500_1 to 500_3 are added.

The second processing device 500_1 is communicably coupled to the first processing device 200B_1 and is communicably coupled to the server 300 via the communication network NW. The second processing device 500_2 is communicably coupled to the first processing device 200B_2 and is communicably coupled to the server 300 via the communication network NW. The second processing device 500_3 is communicably coupled to the first processing device 200B_3 and is communicably coupled to the server 300 via the communication network NW. As described above, the second processing devices 500_1 to 500_3 correspond to each of the first processing devices 200B_1 to 200B_3, are communicably coupled to the first processing devices 200B_1 to 200B_3, and are communicably coupled to the server 300 via the communication network NW. In the following, each of the second processing devices 500_1 to 500_3 may be referred to as a second processing device 500, without distinguishing the second processing devices 500_1 to 500_3. Each of the first processing devices 200B_1 to 200B_3 may be referred to as a first processing device 200B, without distinguishing the first processing devices 200B_1 to 200B_3.

In the example illustrated in FIG. 19, the number of each of the second processing device 500, the ink discharge device 100, and the first processing device 200B included in the ink jet system 10B is three, but the number is not limited thereto, and may be one, two, or four or more. That is, the set of the second processing device 500, the ink discharge device 100, and the first processing device 200B is not limited to three sets, and may be one set, two sets, or four sets or more.

The first processing device 200B is configured in the same manner as the first processing device 200 of the first embodiment except that the first processing device 200B is communicably coupled to each of the second processing device 500 and the ink discharge device 100.

The second processing device 500 is a mobile terminal such as a smart phone or a tablet terminal, and is configured to be able to communicate with each of the server 300 and the first processing device 200B. The second processing device 500 acquires the output information D1, outputs the output information D1 to the server 300, and inputs the input information D2 from the server 300.

The first processing device 200B is configured in the same manner as the first processing device 200 of the first embodiment. However, the first processing device 200B uses the determination portion 254 without using the acquisition portion 251, the first output portion 252, and the first input portion 253 of the acquisition portion 251, the first output portion 252, the first input portion 253, and the determination portion 254. Therefore, in the first processing device 200B, at least one of the acquisition portion 251, the first output portion 252, and the first input portion 253 may be omitted.

Figure 20:
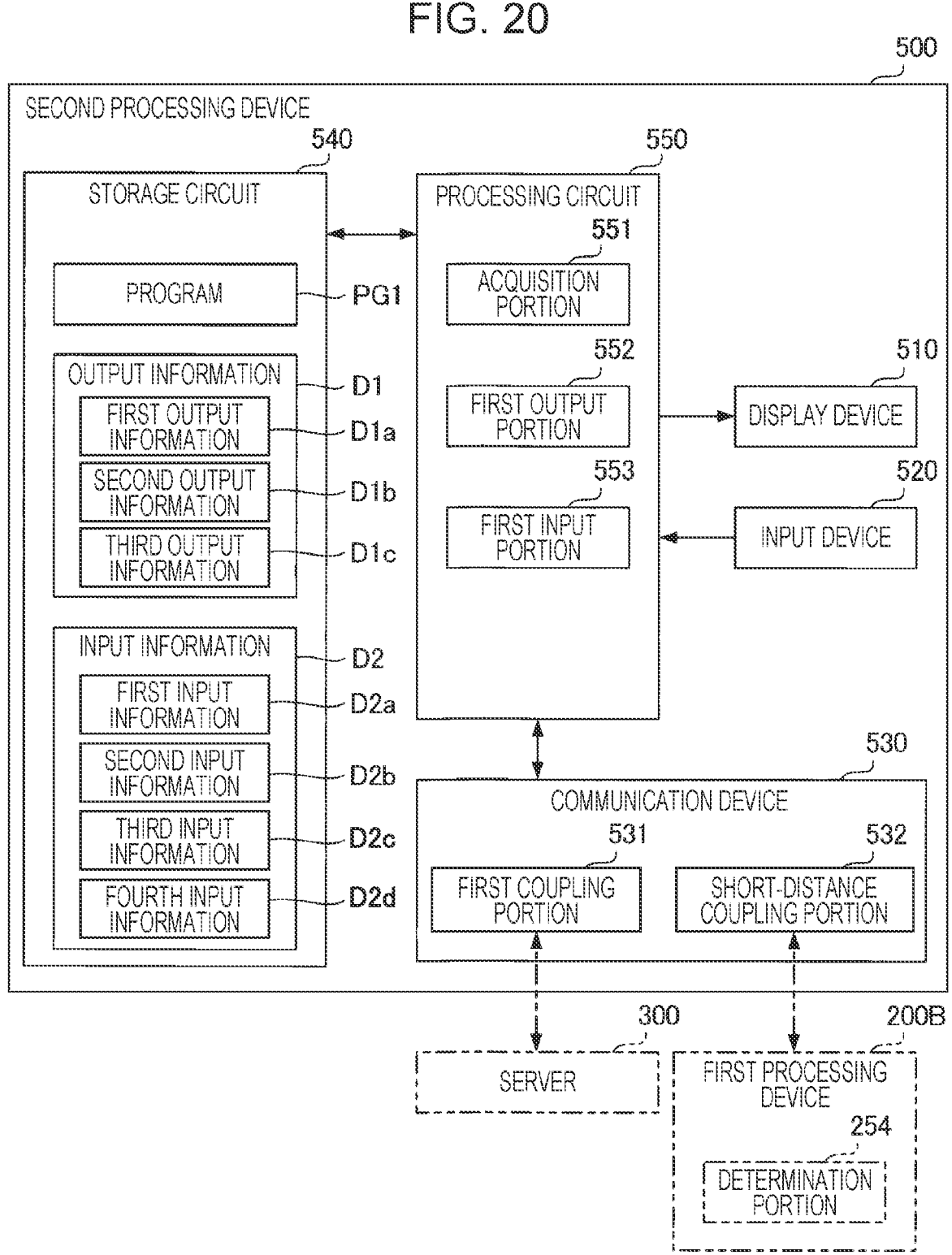
FIG. 20 is a schematic diagram illustrating a configuration example of a second processing device used in the ink jet system according to the third embodiment.

FIG. 20 is a schematic diagram illustrating a configuration example of a second processing device 500 used in the ink jet system 10B according to the third embodiment. The second processing device 500 includes a display device 510, an input device 520, a communication device 530, a storage circuit 540, and a processing circuit 550. These components are communicably coupled to each other.

The display device 510 displays various images under the control of the processing circuit 550. Here, the display device 510 includes various display panels such as a liquid crystal display panel or an organic electro-luminescence (EL) display panel, for example.

The input device 520 is a device that receives an operation from the user. For example, the input device 520 includes a pointing device such as a touch panel. Here, when the input device 520 includes a touch panel, the input device 520 is integrally configured with the display device 510.

The communication device 530 is a circuit capable of communicating with each of the first processing device 200B and the server 300. The communication device 530 is an interface for short-range wireless communication such as near field communication (NFC), Bluetooth low energy (BLE), Wi-Fi or Bluetooth, wireless or wired LAN, USB, or the like. NFC, BLE, Wi-Fi, and Bluetooth are registered trademarks.

The communication device 530 transmits the output information D1 and receives the input information D2 by communicating with the server 300. That is, the communication device 530 functions as a first coupling portion 531 that is communicably coupled to the server 300. In addition, the communication device 530 functions as a short-distance coupling portion 532 that is communicably coupled to the first processing device 200B by short-range wireless communication, and the input information D2 is transmitted to the first processing device 200B by the function. The communication device 530 may be integrated with the processing circuit 550.

The storage circuit 540 is a device that stores various programs executed by the processing circuit 550 and various data processed by the processing circuit 550. The storage circuit 540 has, for example, a semiconductor memory.

The storage circuit 540 of the present embodiment stores the program PG1, the output information D1, and the input information D2.

The processing circuit 550 is a device having a function of controlling each part of the second processing device 500 and a function of processing various data. The processing circuit 550 includes, for example, one or more processors such as a CPU. A part or all of the functions of the processing circuit 550 may be realized by hardware such as DSP, ASIC, PLD, and FPGA.

The processing circuit 550 functions as an acquisition portion 551, a first output portion 552, and a first input portion 553 by reading the program PG1 from the storage circuit 540 and executing the program PG1. In the present embodiment, the program PG1 stored in the storage circuit 540 does not realize the function corresponding to the determination portion 254 of the first embodiment in the processing circuit 550, but may realize the function corresponding to the determination portion 254 in the processing circuit 550. When the function corresponding to the determination portion 254 is realized in the processing circuit 550, the content of the image processing S10 may be determined by the second processing device 500 instead of the first processing device 200B.

The acquisition portion 551 acquires the output information D1, similarly to the acquisition portion 251 of the first embodiment. In the present embodiment, as will be described later with reference to FIGS. 22A to 23B, an image for a GUI for acquiring the output information D1 is displayed on the display device 510, and the acquisition portion 251 acquires the first output information D1a, the second output information D1b, and the third output information D1c based on the input result to the input device 520.

The first output portion 552 outputs the output information D1 via the first coupling portion 531. For example, the first output portion 552 causes the server 300 to output the output information D1 to the first coupling portion 531 using an instruction or the like by the user using the input device 520 as a trigger.

The input information D2 is input to the first input portion 553 via the first coupling portion 531. For example, the input information D2 is input from the server 300 to the first input portion 553 via the first coupling portion 531 using an instruction or the like by the user using the input device 520 as a trigger.

Figure 21:
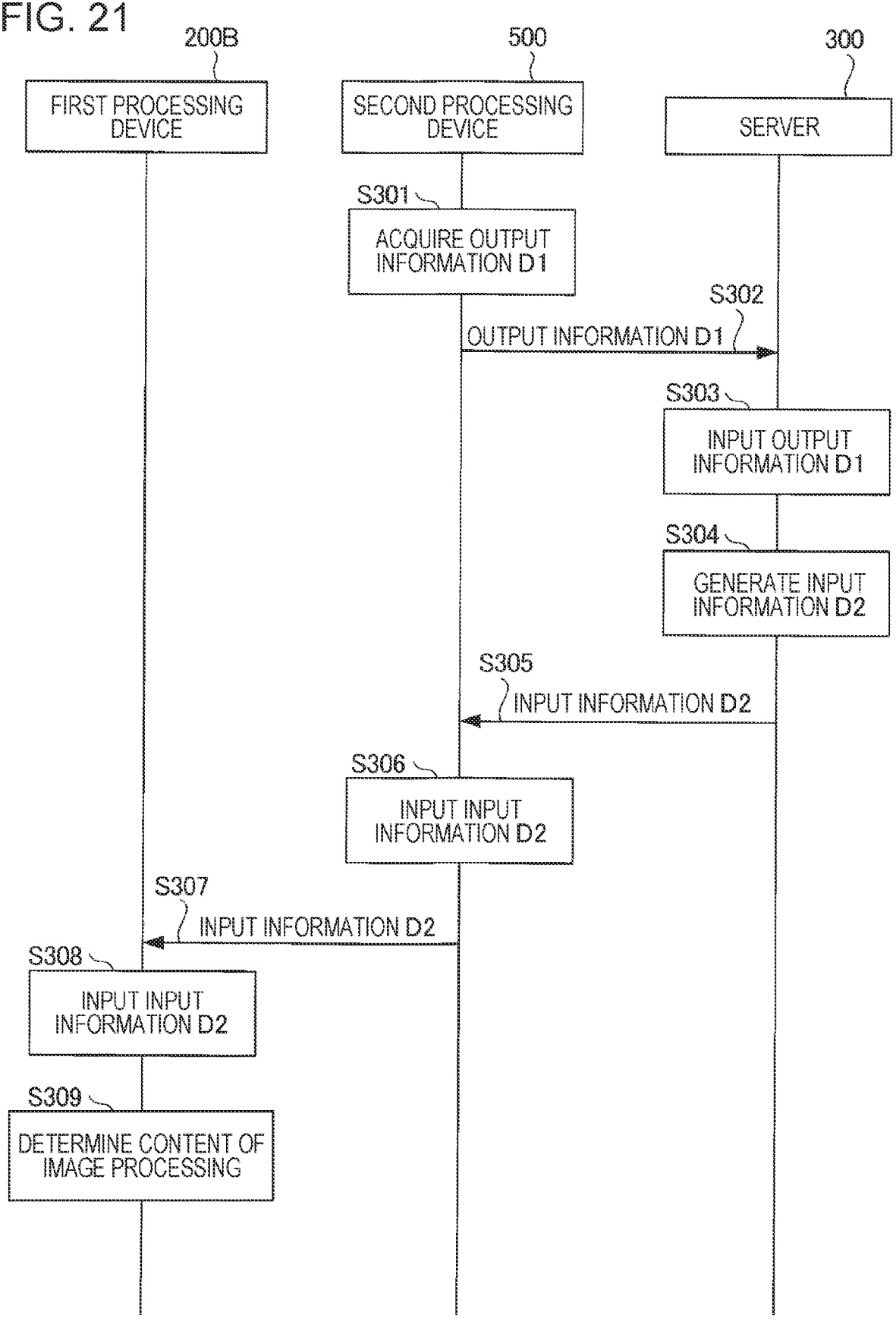
FIG. 21 is a flowchart illustrating processing of the ink jet system according to the third embodiment.

FIG. 21 is a flowchart illustrating the processing of the ink jet system 10B according to the third embodiment. In the ink jet system 10B, first, as illustrated in FIG. 21, in step S301, the second processing device 500 acquires the output information D1. In step S302, the second processing device 500 outputs the output information D1 to the server 300.

Next, in step S303, the server 300 inputs the output information D1. In step S304, the server 300 generates the input information D2 based on the output information D1. Thereafter, in step S305, the server 300 outputs the input information D2 to the second processing device 500.

Next, in step S306, the second processing device 500 inputs the input information D2. In step S307, the second processing device 500 outputs the input information D2 to the first processing device 200B.

Next, in step S308, the first processing device 200B inputs the input information D2. In step S309, the first processing device 200B determines the content of the image processing S10 based on the input information D2.

Hereinafter, the transition of the display of the second processing device 500 in the processing illustrated in FIG. 21 will be described with reference to FIGS. 22A to 23B. FIGS. 22A to 23B are diagrams for describing the transition of the display of the second processing device 500. In the example illustrated in FIGS. 22A to 23B, the input device 520 includes a touch panel 521, a selection button 522, and a determination button 523. The touch panel 521 is laminated on the display device 510, and receives input by, for example, a finger of the user of the second processing device 500 or an indicator such as a touch pen. The selection button 522 is, for example, a cross key, and receives an operation of selecting an item displayed on the display device 510. The determination button 523 receives, for example, an operation of confirming the input content.

Figure 22A:
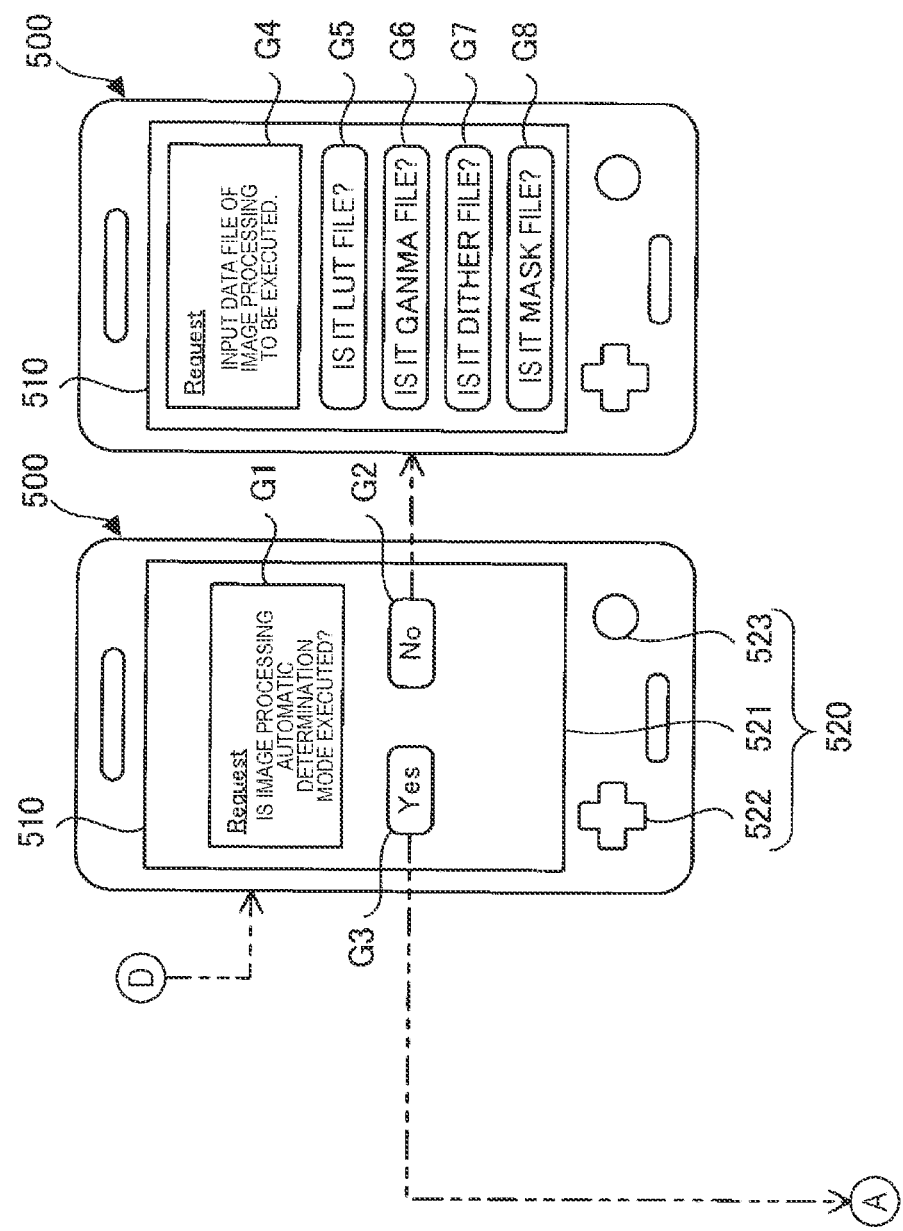

In step S301 described above, first, as illustrated on the upper left side in FIG. 22A, the images G1 to G3 are displayed on the display device 510. The image G1 displays the content inquiring whether or not to execute the processing of determining the content of the image processing S10. The image G2 is an image for receiving that the processing of determining the content of the image processing S10 is not executed. The image G3 is an image for receiving that the processing of determining the content of the image processing S10 is executed.

When the image G2 is selected by the operation of the selection button 522, and then the determination button 523 is pressed in the selected state, the images G4 to G8 are displayed on the display device 510 as illustrated on the upper right side in FIG. 22A. The image G4 displays the content prompting the input of data or the like possessed by the operator of the second processing device 500 as information necessary for the image processing S10. The image G5 is an image for receiving the input of the data file used for the color conversion processing S11. The image G6 is an image for receiving the input of the data file of the table used for the density correction processing S12. The image G7 is an image for receiving the input of the data file used for the quantization processing S13. The image G8 is an image for receiving the input of the data file for the distribution processing S14. By the above operations on the images G5 to G8, the data file of each processing is input. As a result, the content of the image processing S10 can be determined by using the data or the like possessed by the operator of the second processing device 500.

On the other hand, when the image G3 is selected by the operation of the selection button 522, and then the determination button 523 is pressed in the selected state, the images G9 to G11 are displayed on the display device 510 as illustrated on the lower left side in FIG. 22B. The image G9 displays the content prompting the input of the identification information of the head unit 110. In the example illustrated in FIG. 22B, the input of the product name is prompted as the identification information. The image G10 is an image for receiving the selection of one of the plurality of pieces of identification information. In the example illustrated in FIG. 22B, "Head A", "Head B", "Head C", and "Others" are displayed as the product names that are the plurality of pieces of identification information. The image G11 is an image for receiving an operation for determining the input of the identification information selected in the image G10.

When one of the plurality of pieces of identification information illustrated on the image G10 and the image G11 are selected by the operation of the selection button 522, and then the determination button 523 is pressed in the selected state, the selected identification information is acquired by the second processing device 500 as the first output information D1a. When the operation of the image G11 is performed in a state where "Others" illustrated in the image G10 is selected, processing of changing the plurality of product names illustrated in the image G10 to a plurality of product names other than "Head A", "Head B", and "Head C" may be performed. In this case, one of the plurality of product names can be selected.

Next, as illustrated in the lower center in FIG. 22B, the images G12 to G14 are displayed on the display device 510. The image G12 displays the content prompting the input of the ink manufacturer name. The image G13 is an image for receiving the selection of one of a plurality of ink manufacturers. In the example illustrated in FIG. 22B, "Company A", "Company B", "Company C", and "Others" are displayed as the plurality of ink manufacturers. Here, one of "Company A", "Company B" and "Company C", for example, "Company A" is a manufacturer of the head unit 110. The image G14 is an image for receiving an operation for determining the input of the manufacturer name selected in the image G13.

When one of the plurality of manufacturers illustrated on the image G13 and the image G14 are selected by the operation of the selection button 522, and then the determination button 523 is pressed in the selected state, the images G15 to G17 are displayed on the display device 510 as illustrated on the lower right side in FIG. 22B. When the operation of the image G14 is performed in a state where "Others" illustrated in the image G13 is selected, processing of changing the names of the plurality of manufacturers illustrated in the image G13 to a plurality of manufacturer names other than "Company A", "Company B", and "Company C" may be performed. In this case, one of the plurality of manufacturer names can be selected.

The image G15 displays the content prompting the input of the product name of the ink. The image G16 is an image for receiving the selection of one of the plurality of product names of the manufacturers selected from the plurality of manufacturers illustrated in the image G13. In the example illustrated in FIG. 22B, "Ink A", "Ink B", "Ink C" and "Others" are displayed as the plurality of product names. The image G17 is an image for receiving an operation for determining the input of the product name selected in the image G16.

When one of the plurality of product names illustrated on the image G16 and the image G17 are selected by the operation of the selection button 522, and then the determination button 523 is pressed in the selected state, the information on the selected product name is acquired by the second processing device 500 as the second output information D1b. When the operation of the image G17 is performed in a state where "Others" illustrated in the image G16 is selected, processing of changing the plurality of product names illustrated in the image G16 to a plurality of product names other than "Ink A", "Ink B", and "Ink C" may be performed. In this case, one of the plurality of product names can be selected.

Next, as illustrated on the upper left side in FIG. 23A, the images G18 to G20 are displayed on the display device 510. The image G18 displays the content prompting the input of the manufacturer name of the medium. The image G19 is an image for receiving the selection of one of a plurality of medium manufacturers. In the example illustrated in FIG. 23A, "Company A", "Company B", "Company C", and "Others" are displayed as the plurality of medium manufacturers. The image G20 is an image for receiving an operation for determining the input of the manufacturer name selected in the image G19.

When one of the plurality of manufacturers illustrated on the image G19 and the image G20 are selected by the operation of the selection button 522, and then the determination button 523 is pressed in the selected state, the images G21 to G23 are displayed on the display device 510 as illustrated on the upper center in FIG. 23A. When the operation of the image G20 is performed in a state where "Others" illustrated in the image G19 is selected, processing of changing the names of the plurality of manufacturers illustrated in the image G19 to a plurality of manufacturer names other than "Company A", "Company B", and "Company C" may be performed. In this case, one of the plurality of manufacturer names can be selected.

The image G21 displays the content prompting the input of the product name of the medium. The image G22 is an image for receiving the selection of one of the plurality of product names of the manufacturers selected from the plurality of manufacturers illustrated in the image G13. In the example illustrated in FIG. 23A, "Medium A", "Medium B", "Medium C" and "Others" are displayed as the plurality of product names. The image G23 is an image for receiving an operation for determining the input of the product name selected in the image G22.

When one of the plurality of product names illustrated on the image G22 and the image G23 are selected by the operation of the selection button 522, and then the determination button 523 is pressed in the selected state, the information on the selected product name is acquired by the second processing device 500 as the third output information D1c. When the operation of the image G23 is performed in a state where "Others" illustrated in the image G22 is selected, processing of changing the plurality of product names illustrated in the image G22 to a plurality of product names other than "Medium A", "Medium B", and "Medium C may be performed. In this case, one of the plurality of product names can be selected.

As described above, in the above-described step S301, the output information D1 including the first output information D1a, the second output information D1b, and the third output information D1c is acquired. The acquisition order of the first output information D1a, the second output information D1b, and the third output information D1c is not limited to the examples illustrated in FIGS. 22A to 23B, and is optional.

After the output information D1 is acquired, the images G24 to G26 are displayed on the display device 510 as illustrated on the upper right side in FIG. 23A. The image G24 displays the content inquiring whether or not to allow the output information D1 to be transmitted to the server 300. The image G25 is an image for receiving that the output information D1 is not permitted to be transmitted to the server 300. The image G26 is an image for receiving that the output information D1 is permitted to be transmitted to the server 300.

When the image G25 is selected by the operation of the selection button 522, and then the determination button 523 is pressed in the selected state, the display device 510 returns to the display state on the upper left side in FIG. 22A described above.

On the other hand, when the image G26 is selected by the operation of the selection button 522, and then the determination button 523 is pressed in the selected state, the output information D1 is transmitted to the server 300. As a result, the above-described step S302 is executed. Thereafter, as illustrated in the middle part of FIG. 23B, the image G27 is displayed on the display device 510. The image G27 indicates that the input information D2 is being calculated by the server 300.

Figure 23B:
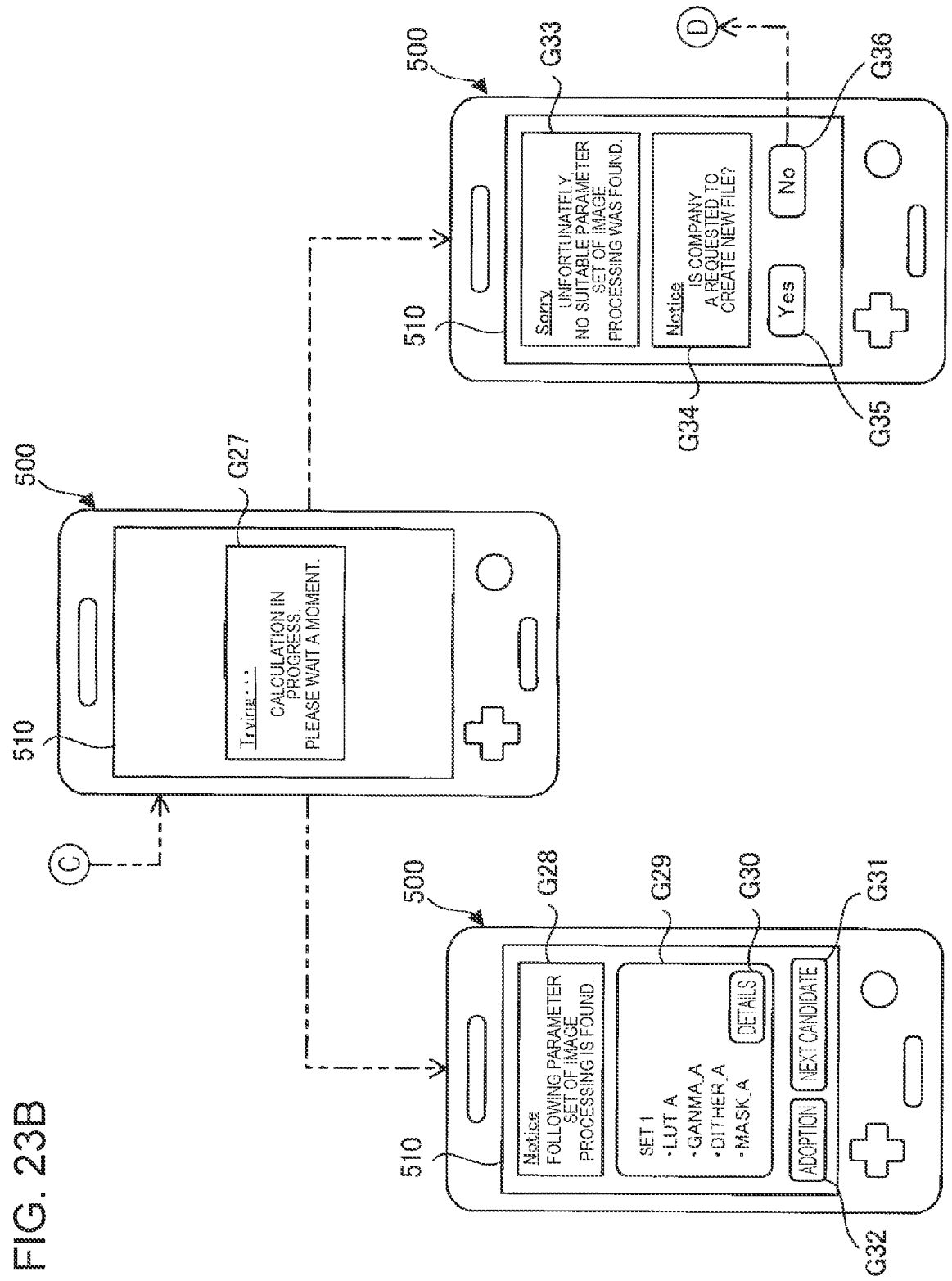

When the input information D2 can be generated by the server 300, the images G28 to G32 are displayed on the display device 510 as illustrated on the lower left side in FIG. 23B. The image G28 is an image illustrating that the input information D2 is input to the second processing device 500. The image G29 is an image illustrating an outline of the content of the input information D2 input to the second processing device 500. The image G30 is an image for receiving an instruction to display details (preview, predicted evaluation value, and the like) of the content of the input information D2 input to the second processing device 500. The image G31 is an image for receiving the change of the content of the image G29 to the content of the other input information D2. The image G32 is an image for receiving that the input information D2 input to the second processing device 500 is adopted as the information used for determining the content of the image processing S10.

When the image G32 is selected by the operation of the selection button 522, and then the determination button 523 is pressed in the selected state, the input information D2 displayed on the image G29 is transmitted to the first processing device 200B. As a result, the above-described step S307 is executed.

On the other hand, when the input information D2 cannot be generated by the server 300, the images G33 to G36 are displayed on the display device 510 as illustrated on the lower right side in FIG. 23B. The image G33 is an image illustrating that the input information D2 cannot be input to the second processing device 500. The image G34 is a display of the content inquiring the owner of the server 300 whether or not to request the generation of the input information D2. The image G35 is an image for receiving that the owner of the server 300 is requested to generate the input information D2. The image G36 is an image for receiving that the owner of the server 300 is not requested to generate the input information D2 again.

When the image G35 is selected by the operation of the selection button 522, and then the determination button 523 is pressed in the selected state, the display of the display device 510 transitions to a display for inputting various information (email address, name, and the like) necessary for requesting the owner of the server 300 to generate the input information D2. On the other hand, when the image G36 is selected by the operation of the selection button 522, and then the determination button 523 is pressed in the selected state, the display device 510 returns to the display state on the upper left side in FIG. 22A described above.

According to the third embodiment as described above, the content of the image processing S10 can be determined while reducing the burden on the printer manufacturer, similarly to the first embodiment or the second embodiment. In the present embodiment, as described above, the ink jet system 10B includes the second processing device 500. The second processing device 500 is communicably coupled to the first processing device 200. The first input portion 553 and the first coupling portion 531 are provided in the second processing device 500. Therefore, the input information D2 from the server 300 can be input to the second processing device 500. In addition, the determination portion 254 can be provided in the first processing device 200B. The image processing S10 determined by the determination portion 254 can be executed by the first processing device 200B. The second processing device 500 may be provided with a functional portion corresponding to the determination portion 254. In this case, the information regarding the content of the image processing S10 determined by the functional portion can be input from the second processing device 500 to the first processing device 200.

In addition, as described above, the first processing device 200 and the second processing device 500 are communicably coupled to each other by short-range wireless communication. Therefore, the input information D2 can be input from the second processing device 500 to the first processing device 200B in a simple communication environment. When the second processing device 500 is provided with a functional portion corresponding to the determination portion 254, information regarding the content of the image processing S10 determined by the functional portion can be input from the second processing device 500 to the first processing device 200B.

4. Fourth Embodiment

Hereinafter, the fourth embodiment of the present disclosure will be described. For the elements whose actions or functions are the same as those of the first embodiment in the aspects exemplified below, the reference numerals used in the description of the first embodiment will be diverted and detailed description of each will be omitted as appropriate.

Figure 24:
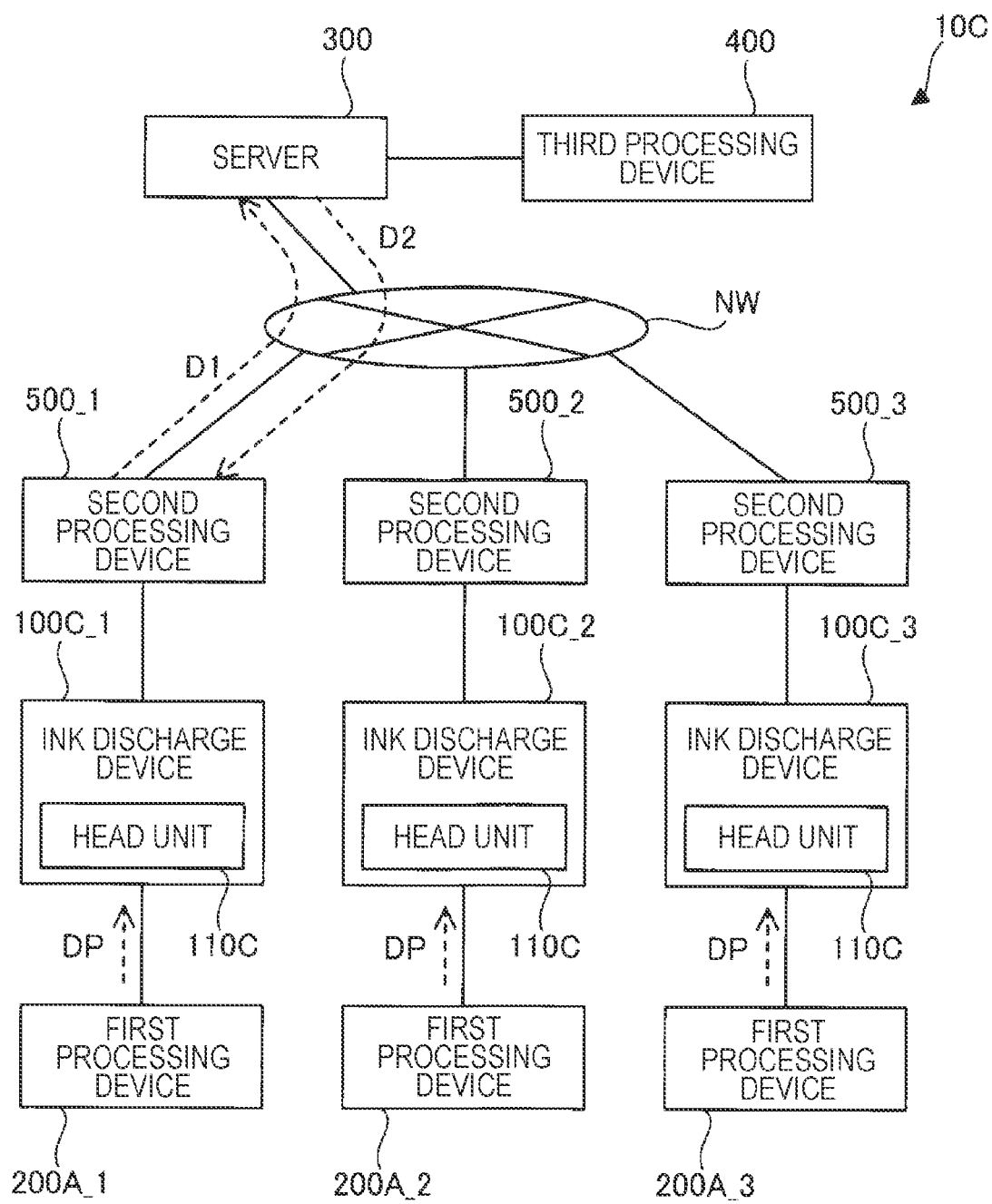
FIG. 24 is a schematic diagram illustrating a configuration example of an ink jet system according to a fourth embodiment.

FIG. 24 is a schematic diagram illustrating a configuration example of an ink jet system 10C according to a fourth embodiment. The ink jet system 10C is configured in the same manner as the first embodiment described above, except that the ink discharge devices 100C_1 to 100C_3 and the first processing devices 200A_1 to 200A_3 are provided in place of the ink discharge devices 100_1 to 100_3 and the first processing devices 200_1 to 200_3, and the second processing devices 500_1 to 500_3 are added. That is, the ink jet system 10C is configured in the same manner as the third embodiment described above except that the ink discharge devices 100C_1 to 100C_3 and the first processing devices 200A_1 to 200A_3 are provided in place of the ink discharge devices 100_1 to 100_3 and the first processing devices 200B_1 to 200B_3. The first processing device 200A is configured in the same manner as the first processing device 200A of the second embodiment.

In the present embodiment, the second processing device 500_1 is communicably coupled to the ink discharge device 100C_1 and is communicably coupled to the server 300 via the communication network NW. The second processing device 500_2 is communicably coupled to the ink discharge device 100C_2 and is communicably coupled to the server 300 via the communication network NW. The second processing device 500_3 is communicably coupled to the ink discharge device 100C_3 and is communicably coupled to the server 300 via the communication network NW. As described above, the second processing devices 500_1 to 500_3 correspond to each of the ink discharge devices 100C_1 to 100C_3, are communicably coupled to the ink discharge devices 100C_1 to 100C_3, and are communicably coupled to the server 300 via the communication network NW. In the following, each of the ink discharge devices 100C_1 to 100C_3 may be referred to as an ink discharge device 100C, without distinguishing the ink discharge devices 100C_1 to 100C_3.

In the example illustrated in FIG. 24, the number of each of the second processing device 500, the ink discharge device 100C, and the first processing device 200A included in the ink jet system 10C is three, but the number is not limited thereto, and may be one, two, or four or more. That is, the set of the second processing device 500, the ink discharge device 100C, and the first processing device 200A is not limited to three sets, and may be one set, two sets, or four sets or more.

The ink discharge device 100C is configured in the same manner as the ink discharge device 100A of the second embodiment except that the ink discharge device 100C can communicate with each of the server 300 and the first processing device 200A.

Figure 25:
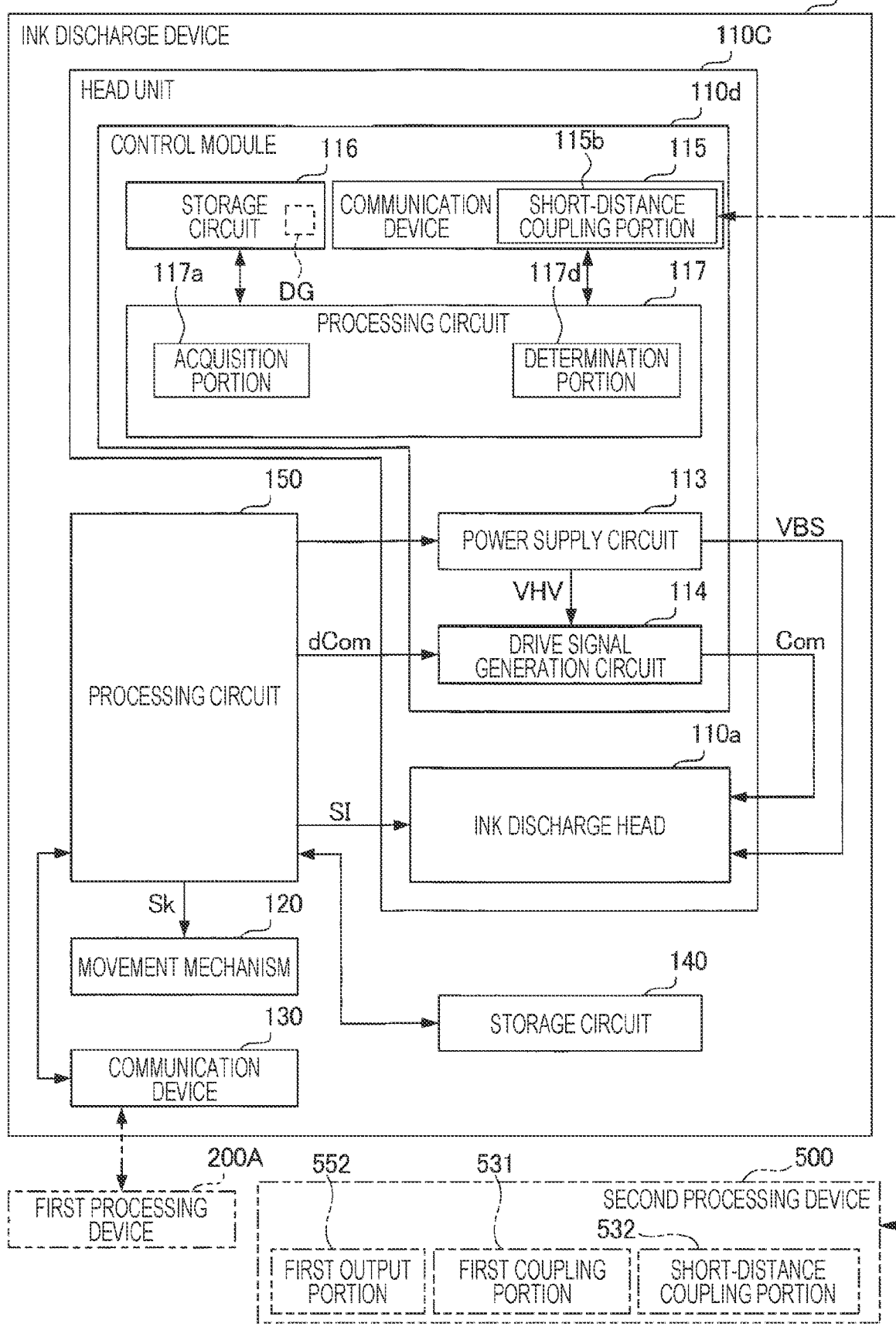
FIG. 25 is a schematic diagram illustrating a configuration example of an ink discharge device used in the ink jet system according to the fourth embodiment.

FIG. 25 is a schematic diagram illustrating a configuration example of an ink discharge device 100C used in the ink jet system 10C according to the fourth embodiment. As illustrated in FIG. 25, the ink discharge device 100C is configured in the same manner as the ink discharge device 100A of the second embodiment except that the head unit 110C is provided in place of the head unit 110A. The head unit 110C is configured in the same manner as the head unit 110A except that the control module 110d is provided in place of the control module 110c. The control module 110d is the same as the control module 110c except that the communication device 115 functions as a short-distance coupling portion 115b and the processing circuit 117 functions as the acquisition portion 117a and the determination portion 117d.

In the present embodiment, the communication device 115 is a circuit capable of communicating with the second processing device 500. For example, the communication device 115 is an interface for short-range wireless communication such as Wi-Fi or Bluetooth. That is, the communication device 115 functions as the short-distance coupling portion 115b that is communicably coupled to the short-distance coupling portion 532 of the second processing device 500 by short-range wireless communication, and outputs the output information D1 to the second processing device 500 or inputs the input information D2 from the second processing device 500 by the function.

Figure 26:
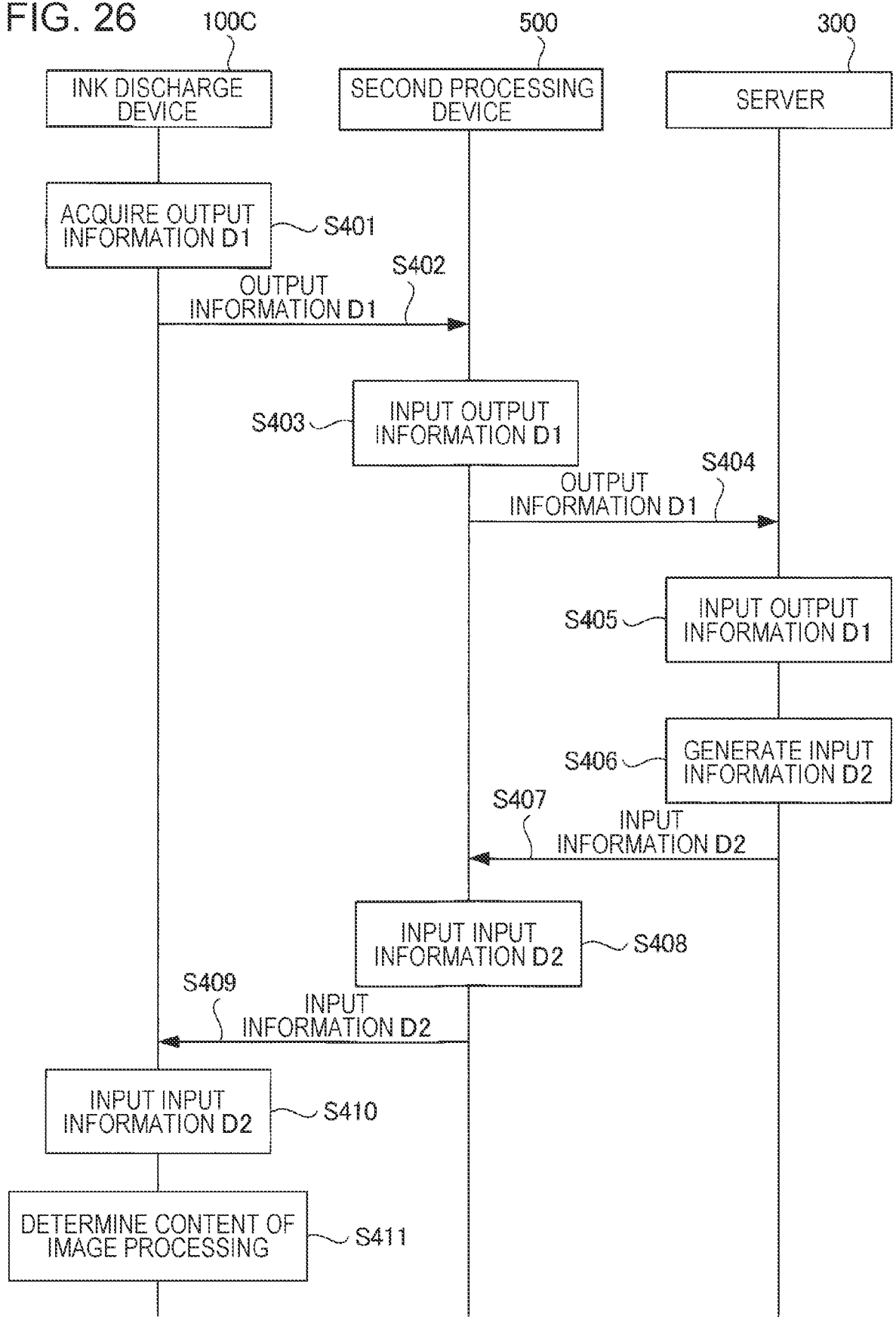
FIG. 26 is a flowchart illustrating processing of the ink jet system according to the fourth embodiment.

FIG. 26 is a flowchart illustrating the processing of the ink jet system 10C according to the fourth embodiment. In the ink jet system 10C, first, as illustrated in FIG. 26, the ink discharge device 100C acquires the output information D1 in step S401. In step S402, the ink discharge device 100C outputs the output information D1 to the second processing device 500.

Next, in step S403, the second processing device 500 inputs the output information D1. In step S404, the second processing device 500 outputs the output information D1 to the server 300.

Next, in step S405, the server 300 inputs the output information D1. In step S406, the server 300 generates the input information D2 based on the output information D1. Thereafter, in step S407, the server 300 outputs the input information D2 to the second processing device 500.

Next, in step S408, the second processing device 500 inputs the input information D2. In step S409, the second processing device 500 outputs the input information D2 to the ink discharge device 100C.

Next, in step S410, the ink discharge device 100C inputs the input information D2. In step S411, the ink discharge device 100C determines the content of the image processing S10 based on input information D2.

According to the fourth embodiment as described above, the content of the image processing S10 can be determined while reducing the burden on the printer manufacturer, similarly to the first to third embodiments. In the present embodiment, as described above, the ink jet system 10C includes the second processing device 500. The second processing device 500 is communicably coupled to the ink discharge device 100. The first input portion 553 and the first coupling portion 531 are provided in the second processing device 500. Therefore, the input information D2 from the server 300 can be input to the second processing device 500. In addition, the ink discharge device 100C can be provided with the determination portion 117*d*. The information regarding the content of the image processing S10 determined by the determination portion 117*d* can be used in the ink discharge device 100. The second processing device 500 may be provided with a functional portion corresponding to the determination portion 117*d*. In this case, the information regarding the content of the image processing S10 determined by the functional portion can be input from the second processing device 500 to the ink discharge device 100.

In addition, as described above, the ink discharge device 100 and the second processing device 500 are communicably coupled to each other by short-range wireless communication. Therefore, in a simple communication environment, the output information D1 can be output from the ink discharge device 100C to the second processing device 500, and the input information D2 from the second processing device 500 can be input to the ink discharge device 100C. When the second processing device 500 is provided with a functional portion corresponding to the determination portion 254, information regarding the content of the image processing S10 determined by the functional portion can be input from the second processing device 500 to the ink discharge device 100C.

5. Modification Example

The ink jet system of the present disclosure has been described above based on the illustrated embodiment, but the present disclosure is not limited thereto. In addition, the configuration of each part of the present disclosure can be replaced with a predetermined configuration that exhibits the same function as that of the above-described embodiment, or a predetermined configuration can be added.

5-1. Modification Example 1

In the above-described embodiment, the case where the output information D1 includes both the first output information D1*a* and the second output information D1*b* is exemplified, but the present disclosure is not limited thereto. For example, one of the first output information D1*a* and the second output information D1*b* may be omitted. In addition, when the type of the ink discharge head 110*a* or the head unit 110 is known on the server side, the first output information D1*a* may not be included in the output information D1.

5-2. Modification Example 2

In the above-described embodiment, the configuration in which the input information D2 includes the first input information D2*a*, the second input information D2*b*, the third input information D2*c*, and the fourth input information D2*d* is exemplified, but the present disclosure is not limited to the configuration. For example, among the first input information D2*a*, the second input information D2*b*, the third input information D2*c*, and the fourth input information D2*d*, the information already shared by both the printer manufacturer and the head manufacturer may be omitted.

5-3. Modification Example 3

In the above-described embodiment, a configuration in which the server 300 is a cloud server is exemplified, but the present disclosure is not limited to the configuration. For example, the server 300 may be a server other than a cloud server or a virtual server, or may be an on-premises server.

5-4. Modification Example 4

In the above-described embodiment, the configuration in which the drive element 111*f* is a piezoelectric element is exemplified, but the present disclosure is not limited thereto, and for example, the drive element 111*f* may be a heater that heats the ink in the pressure chamber C. That is, the drive method of the head chip 111 is not limited to the piezoelectric method, and may be, for example, a thermal method.

What is claimed is:

1. An ink jet system comprising:
    a head unit that includes a nozzle discharging ink, a pressure chamber communicating with the nozzle, and a drive element applying pressure fluctuation to the ink in the pressure chamber by supplying a drive pulse;
    an acquisition portion that acquires output information including one or both of first output information regarding the head unit and second output information regarding the ink used for the head unit;
    a first coupling portion that is communicably network-coupled to a server;
    a first output portion that outputs the output information to the server via the first coupling portion;
    a first input portion to which input information is input from the server via the first coupling portion; and
    a determination portion that determines a content of image processing for image data based on the input information, wherein
    the image processing includes quantization processing of generating quantization data by quantizing ink color data indicated by a density value for each ink color,
    the ink color data is N value data indicating a gradation value of a pixel group configured to include a plurality of pixels, N being a natural number,
    the quantization data is M value data indicating the gradation value of each of the plurality of pixels, M being a natural number satisfying $2 \leq M < N$,
    the input information includes third input information used for the quantization processing, and
    the third input information is information regarding a dither pattern that defines a threshold value for converting the gradation value of the pixel group into the gradation value of each of the plurality of pixels for each of the plurality of pixels.

2. The ink jet system according to claim 1, wherein
    the image processing includes color conversion processing of converting image data indicated by a luminance value into ink color data indicated by a density value for each ink color,
    the input information includes first input information used for the color conversion processing, and
    the first input information is information regarding a color conversion table that defines a correspondence relationship between the luminance value and the density value.

3. The ink jet system according to claim 2, wherein
    the output information includes information regarding a discharge characteristic of the head unit as the first output information, when the discharge characteristic indicated by the first output information is a first discharge characteristic, the color conversion table is a first color conversion table, when the discharge characteristic indicated by the first output information is a second discharge characteristic higher than the first discharge characteristic, the color conversion table is a second color conversion table, and when input values input to the first color conversion table and the second color conversion table as the luminance values are equal to each other, an output value output as the density value by the second color conversion table is smaller than an output value output as the density value by the first color conversion table.

4. The ink jet system according to claim 2, wherein the output information includes information regarding a color development property of the ink as the second output information, when the color development property indicated by the second output information is a first color development property, the color conversion table is a third color conversion table, when the color development property indicated by the second output information is a second color development property higher than the first color development property, the color conversion table is a fourth color conversion table, and when input values input to the third color conversion table and the fourth color conversion table as the luminance values are equal to each other, an output value output as the density value by the fourth color conversion table is smaller than an output value output as the density value by the third color conversion table.

5. The ink jet system according to claim 2, wherein the output information includes a third output information regarding a color development property of a medium printed by the ink discharged from the head unit, when the color development property indicated by the third output information is a third color development property, the color conversion table is a fifth color conversion table, when the color development property indicated by the third output information is a fourth color development property higher than the third color development property, the color conversion table is a sixth color conversion table, and when input values input to the fifth color conversion table and the sixth color conversion table as the luminance values are equal to each other, an output value output as the density value by the sixth color conversion table is smaller than an output value output as the density value by the fifth color conversion table.

6. The ink jet system according to claim 1, wherein the image processing includes density correction processing of correcting a density of the ink color data indicated by a density value for each ink color, the input information includes second input information used for the density correction processing, and the second input information is information regarding a density correction table that defines a correspondence relationship between before and after correction of the density value.

7. The ink jet system according to claim 6, wherein the output information includes information regarding a discharge characteristic of the head unit as the first output information, when the discharge characteristic indicated by the first output information is a first discharge characteristic, the density correction table is a first density correction table, when the discharge characteristic indicated by the first output information is a second discharge characteristic higher than the first discharge characteristic, the density correction table is a second density correction table, and when input values input to the first density correction table and the second density correction table as the density values before correction are equal to each other, an output value output as the density value after correction by the second density correction table is smaller than an output value output as the density value after correction by the first density correction table.

8. The ink jet system according to claim 6, wherein the output information includes information regarding a color development property of the ink as the second output information, when the color development property indicated by the second output information is a first color development property, the density correction table is a third density correction table, when the color development property indicated by the second output information is a second color development property higher than the first color development property, the density correction table is a fourth density correction table, and when input values input to the third density correction table and the fourth density correction table as the density values before correction are equal to each other, an output value output as the density value after correction by the fourth density correction table is smaller than an output value output as the density value after correction by the third density correction table.

9. The ink jet system according to claim 6, wherein the output information includes a third output information regarding a color development property of a medium printed by the ink discharged from the head unit, when the color development property indicated by the third output information is a third color development property, the density correction table is a fifth density correction table, when the color development property indicated by the third output information is a fourth color development property higher than the third color development property, the density correction table is a sixth density correction table, and when input values input to the fifth density correction table and the sixth density correction table as the density values before correction are equal to each other, an output value output as the density value after correction by the sixth density correction table is smaller than an output value output as the density value after correction by the fifth density correction table.

10. The ink jet system according to claim 1, wherein the output information includes information regarding a discharge characteristic of the head unit as the first output information, when the discharge characteristic indicated by the first output information is a first discharge characteristic, the dither pattern is a first dither pattern, when the discharge characteristic indicated by the first output information is a second discharge characteristic higher than the first discharge characteristic, the dither pattern is a second dither pattern, and when the gradation values of the pixel group indicated by the ink color data used for the first dither pattern and the second dither pattern are equal to each other, a sum of the gradation values of the plurality of pixels indicated by the quantization data generated by the second dither pattern is smaller than a sum of the gradation values of the plurality of pixels indicated by the quantization data generated by the first dither pattern.

11. The ink jet system according to claim 1, wherein the output information includes information regarding a color development property of the ink as the second output information,
when the color development property indicated by the second output information is a first color development property, the dither pattern is a third dither pattern,
when the color development property indicated by the second output information is a second color development property higher than the first color development property, the dither pattern is a fourth dither pattern, and
when the gradation values of the pixel group indicated by the ink color data used for the third dither pattern and the fourth dither pattern are equal to each other, a sum of the gradation values of the plurality of pixels indicated by the quantization data generated by the fourth dither pattern is smaller than a sum of the gradation values of the plurality of pixels indicated by the quantization data generated by the third dither pattern.

12. The ink jet system according to claim 1, wherein the output information includes a third output information regarding a color development property of a medium printed by the ink discharged from the head unit,
when the color development property indicated by the third output information is a third color development property, the dither pattern is a fifth dither pattern,
when the color development property indicated by the third output information is a fourth color development property higher than the third color development property, the dither pattern is a sixth dither pattern, and
when the gradation values of the pixel group indicated by the ink color data used for the fifth dither pattern and the sixth dither pattern are equal to each other, a sum of the gradation values of the plurality of pixels indicated by the quantization data generated by the sixth dither pattern is smaller than a sum of the gradation values of the plurality of pixels indicated by the quantization data generated by the fifth dither pattern.

13. The ink jet system according to claim 1, wherein the head unit records an image in a unit region on a medium by distributing and discharging the ink on the unit region in a plurality of scans,
the image processing includes distribution processing of generating recorded data by distributing quantization data to the plurality of scans,
the input information includes fourth input information used for the distribution processing, and
the fourth input information is information regarding a mask pattern that defines whether or not to distribute the quantization data to each of the plurality of scans.

14. The ink jet system according to claim 13, wherein the output information includes information regarding a discharge characteristic of the head unit as the first output information,
when the discharge characteristic indicated by the first output information is a first discharge characteristic, the mask pattern is a first mask pattern,
when the discharge characteristic indicated by the first output information is a second discharge characteristic higher than the first discharge characteristic, the mask pattern is a second mask pattern, and
when gradation values indicated by the quantization data used for the first mask pattern and the second mask pattern are equal to each other, a sum of distribution ratios for the plurality of scans by the second mask pattern is smaller than a sum of distribution ratios for the plurality of scans by the first mask pattern.

15. The ink jet system according to claim 13, wherein the output information includes information regarding a color development property of the ink as the second output information,
when the color development property indicated by the second output information is a first color development property, the mask pattern is a third mask pattern,
when the color development property indicated by the second output information is a second color development property higher than the first color development property, the mask pattern is a fourth mask pattern, and
when gradation values indicated by the quantization data used for the third mask pattern and the fourth mask pattern are equal to each other, a sum of distribution ratios for the plurality of scans by the fourth mask pattern is smaller than a sum of distribution ratios for the plurality of scans by the third mask pattern.

16. The ink jet system according to claim 13, wherein the output information includes a third output information regarding a color development property of a medium printed by the ink discharged from the head unit,
when the color development property indicated by the third output information is a third color development property, the mask pattern is a fifth mask pattern,
when the color development property indicated by the third output information is a fourth color development property higher than the third color development property, the mask pattern is a sixth mask pattern, and
when gradation values indicated by the quantization data used for the fifth mask pattern and the sixth mask pattern are equal to each other, a sum of distribution ratios for the plurality of scans by the sixth mask pattern is smaller than a sum of distribution ratios for the plurality of scans by the fifth mask pattern.

17. The ink jet system according to claim 1, further comprising:
a reception portion that receives an instruction by a user as to whether or not to execute the image processing based on the input information, wherein
the determination portion determines to execute the image processing based on the input information, when the reception portion receives an instruction to execute the image processing based on the input information, and determines to execute another image processing input from the user, when the reception portion receives an instruction not to execute the image processing based on the input information.

18. The ink jet system according to claim 1, further comprising:
an ink discharge device that includes the head unit;
a first processing device coupled to the ink discharge device, and that includes a display portion displaying information regarding the ink discharge device; and
the server.

19. The ink jet system according to claim 18, wherein the server includes
- a storage portion in which correspondence information regarding a correspondence relationship between the output information and the image processing to be executed is stored in advance, and
- a calculation portion that performs a calculation generating the input information based on the output information and the correspondence information.

* * * * *